(12) United States Patent
Nomura et al.

(10) Patent No.: US 7,742,101 B2
(45) Date of Patent: Jun. 22, 2010

(54) INSERTION MEMBER FIXING STRUCTURE

(75) Inventors: Hiroshi Nomura, Saitama (JP); Shinya Suzuka, Saitama (JP); Ken Endo, Saitama (JP)

(73) Assignee: Hoya Corporation, Tokyo (JP)

( * ) Notice: Subject to any disclaimer, the term of this patent is extended or adjusted under 35 U.S.C. 154(b) by 923 days.

(21) Appl. No.: 11/548,800

(22) Filed: Oct. 12, 2006

(65) Prior Publication Data

US 2007/0107343 A1     May 17, 2007

(30) Foreign Application Priority Data

Oct. 14, 2005     (JP)     ............... 2005-300701

(51) Int. Cl.
*H04N 5/225*     (2006.01)
*F16B 39/02*     (2006.01)
(52) U.S. Cl. ........................................ 348/374; 411/82
(58) Field of Classification Search ................ None
See application file for complete search history.

(56) References Cited

U.S. PATENT DOCUMENTS

| | | | | |
|---|---|---|---|---|
| 3,835,615 | A * | 9/1974 | King, Jr. ................... | 403/408.1 |
| 4,981,735 | A * | 1/1991 | Rickson .................... | 428/36.9 |
| 5,418,869 | A | 5/1995 | Seike et al. | |
| 5,910,056 | A | 6/1999 | Nagamoto et al. | |
| 6,546,689 | B1 * | 4/2003 | Kim ........................... | 52/698 |
| 6,742,258 | B2 * | 6/2004 | Tarbutton et al. ........ | 29/897 |
| 7,215,797 | B2 * | 5/2007 | Park .......................... | 382/117 |
| 7,443,445 | B2 * | 10/2008 | Kuchimaru ............... | 348/374 |
| 2004/0120789 | A1 * | 6/2004 | Masuda .................... | 411/178 |
| 2005/0213893 | A1 | 9/2005 | Hamasaki et al. | |

FOREIGN PATENT DOCUMENTS

| | | |
|---|---|---|
| JP | 5-21101 | 1/1993 |
| JP | 5-124662 | 5/1993 |
| JP | 5-248048 | 9/1993 |
| JP | 5-285918 | 11/1993 |
| JP | 5-90920 U | 12/1993 |
| JP | 6-121478 | 4/1994 |
| JP | 6-66724 U | 9/1994 |
| JP | 7-24090 | 1/1995 |
| JP | 2000-2213 | 1/2000 |

(Continued)

OTHER PUBLICATIONS

English language Abstract of JP 5-21101.

(Continued)

*Primary Examiner*—Justin P Misleh
(74) *Attorney, Agent, or Firm*—Greenblum & Bernstein, PLC

(57) ABSTRACT

An insertion member fixing structure includes an insertion member which is inserted into a support hole formed in a support member; and outer and inner adhesive-pouring recesses formed on an inner peripheral surface of the support hole at one end thereof and on an outer peripheral surface of the insertion member, respectively, in a manner so as to face each other and be communicatively connected to each other in a state where the insertion member is inserted into the support hole. The insertion member is fixed to the support member by pouring an adhesive into the outer and inner adhesive-pouring recesses so that the adhesive spreads into the outer and inner adhesive-pouring recess.

16 Claims, 38 Drawing Sheets

FOREIGN PATENT DOCUMENTS

JP          2004308679 A  *  11/2004

OTHER PUBLICATIONS

English language Abstract of JP5-248048.
English language Abstract of JP 5-124662.
English language Abstract of JP 5-285918.
English language Abstract of JP 6-121478.
English language Abstract of JP 7-24090.
English language Abstract of JP 2000-2213.
U.S. Appl. No. 11/548,033 to Nomura, filed Oct. 10, 2006.
U.S. Appl. No. 11/536,421 to Nomura et al., filed Sep. 28, 2006.
U.S. Appl. No. 11/558,130 to Ishizuka, filed Nov. 9, 2006.

* cited by examiner

INSERTION MEMBER FIXING STRUCTURE

BACKGROUND OF THE INVENTION

1. Field of the Invention

The present invention relates to an insertion member fixing structure which is inserted into a support hole made in a support member to be fixed to the support member.

2. Description of the Related Art

Various methods of fixing an insertion member to a support member after the insertion member is inserted into a support hole made in the support member are known in the art. As examples of conventional structures according to such methods, a structure in which the insertion member is press-fitted into the support hole, a structure in which the insertion member is prevented from coming out of the insertion hole by a lock washer or a lock nut after being inserted into the insertion hole and a structure in which the support member, which includes the support hole, and the insertion member are molded by insertion molding are known. However, these methods have drawbacks in structural miniaturization and reduction of production cost.

SUMMARY OF THE INVENTION

The present invention provides an insertion member fixing structure which can be inserted into a support hole of a support member and fixed thereto with reliability even though the fixing structure is compact and can be produced at a low cost.

According to an aspect of the present invention, an insertion member fixing structure is provided, including an insertion member which is inserted into a support hole formed in a support member; and outer and inner adhesive-pouring recesses formed on an inner peripheral surface of the support hole at one end thereof and on an outer peripheral surface of the insertion member, respectively, in a manner so as to face each other and be communicatively connected to each other in a state where the insertion member is inserted into the support hole. The insertion member is fixed to the support member by pouring an adhesive into the outer and inner adhesive-pouring recesses so that the adhesive spreads into the outer and inner adhesive-pouring recess.

It is desirable for each of the outer and inner adhesive-pouring recesses to include an annular recess.

It is desirable for the outer adhesive-pouring recess to include a chamfered opening formed on the one end of the support hole.

It is desirable for the outer adhesive-pouring recess to include an annular portion communicatively connected with the chamfered opening.

It is desirable for the insertion member to include a flange portion which determines an insertion position of the insertion member with respect to the support hole in an insertion direction of the insertion member.

It is desirable for the flange portion to be formed on an end of the insertion member which contacts the support member at the other end of the support hole.

It is desirable for the insertion member fixing structure to include a second outer adhesive-pouring recess and a second inner adhesive-pouring recess formed on a portion of the support member at the other end of the support hole and an outer peripheral surface of the insertion member, respectively, in a manner to face each other to be communicatively connected to each other in the state where the insertion member is inserted into the support hole. The insertion member is fixed to the support member by further pouring the adhesive into the second outer adhesive-pouring recess and the second inner adhesive-pouring recess.

It is desirable for the inner adhesive-pouring recess to have a V-shaped cross section.

It is desirable for the support hole to be formed as a cylindrical hole, and for the insertion member to include a hollow cylinder portion having an outer diameter allowing the insertion member to be inserted into the cylindrical hole.

It is desirable for the support hole to include a through-hole.

It is desirable for the insertion member to include a female screw hole serving as a screw bearing seat.

It is desirable for the insertion member fixing structure to include an adjustable element which is supported by the supported member; an adjustment screw which includes a screw shaft portion and a head portion, the screw shaft portion being inserted into a through-hole formed in the adjustable element to be screwed into the female screw hole of the insertion member, and the head portion being in contact with the adjustable element; and a biasing device which biases the adjustable element in a direction away from the support member to bring the adjustable element into contact with a back surface of the head portion of the adjustment screw. A position of the adjustable element relative to the support member varies by a variation in tightening amount of the adjustment screw.

It is desirable for the biasing device to be at least one compression coil spring installed between the support member and the adjustable element.

It is desirable for the adjustable element to hold an image pickup device.

It is desirable for the insertion member fixing structure to be incorporated in an inclination angle adjusting mechanism for changing an angle of the image pickup device.

In an embodiment, a hollow cylindrical-nut fixing structure is provided, including a hollow cylindrical nut including a screw hole, the hollow cylindrical nut being inserted into a cylindrical support hole formed in a support member to be fixed thereto; and outer and inner adhesive-pouring recesses which are formed on an inner peripheral surface of the cylindrical support hole at one end thereof and an outer peripheral surface of the hollow cylindrical nut, respectively, in a manner to be communicatively connected to each other to form a single groove in a state where the hollow cylindrical nut is inserted into the cylindrical support hole. The hollow cylindrical nut is fixed to the support member by pouring an adhesive into the single groove so that the adhesive spreads into the outer adhesive-pouring recess and the inner adhesive-pouring recess.

According to the present invention, an insertion member fixing structure which can be inserted into a support hole of a support member and fixed thereto with reliability even though the fixing structure is compact and can be produced at a low cost is achieved.

The present disclosure relates to subject matter contained in Japanese Patent Application No. 2005-300701 (filed on Oct. 14, 2005), which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
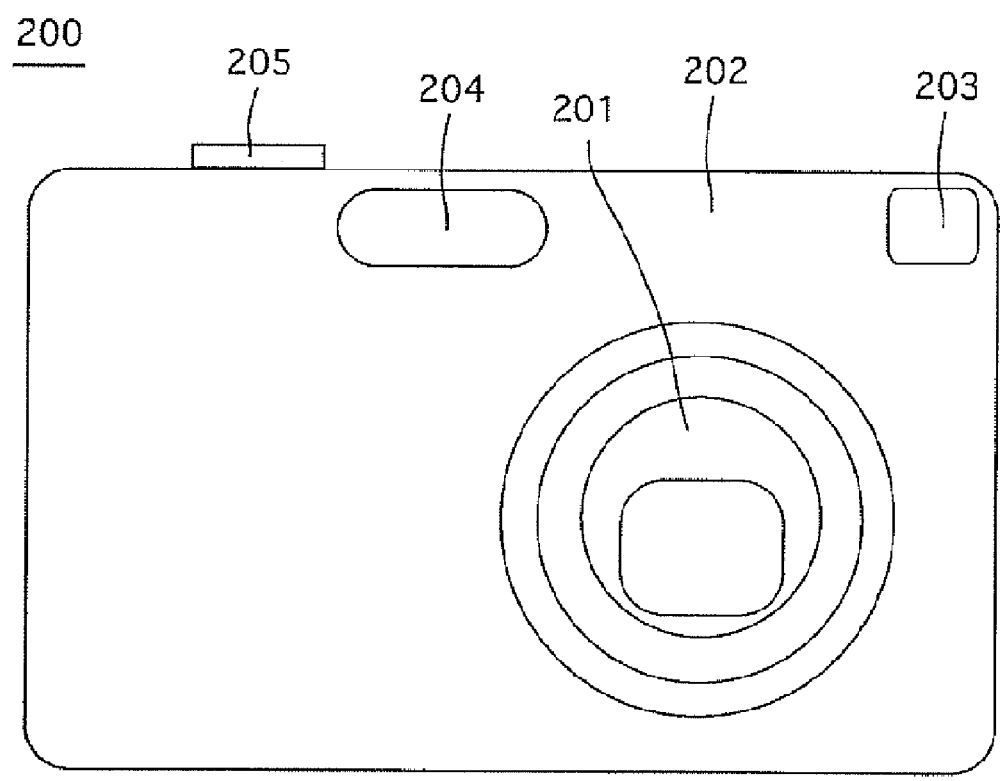
FIG. 1 is a front elevational view of an embodiment of a digital camera to which an insertion member fixing structure according to the present invention is applied.

An embodiment of an insertion member fixing structure according to the present invention which is applied to an inclination angle adjusting mechanism of a digital camera for changing the inclination angle of an image pickup device (CCD) will be discussed hereinafter. FIG. 1 shows an outward appearance of this embodiment of the digital camera 200. The digital camera 200 is provided on the front of a camera body 202 thereof with a zoom lens (zoom lens barrel) 201, an optical viewfinder 203 and a flash 204, and is provided on the top of the camera body 202 with a shutter button 205.

Figure 2:
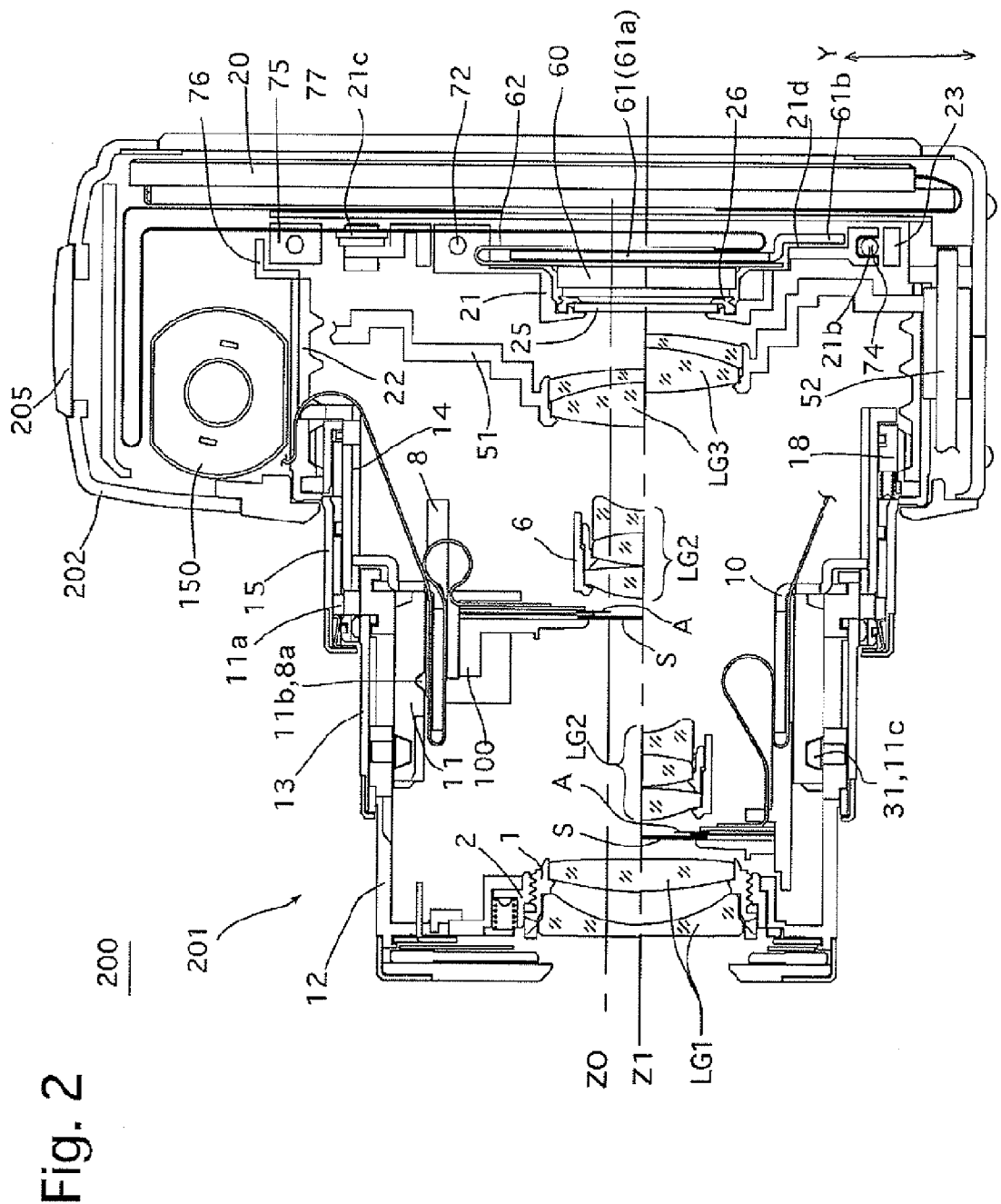
FIG. 2 is a longitudinal sectional view of the digital camera shown in FIG. 1 in a ready-to-photograph state of the zoom lens thereof.
Figure 3:
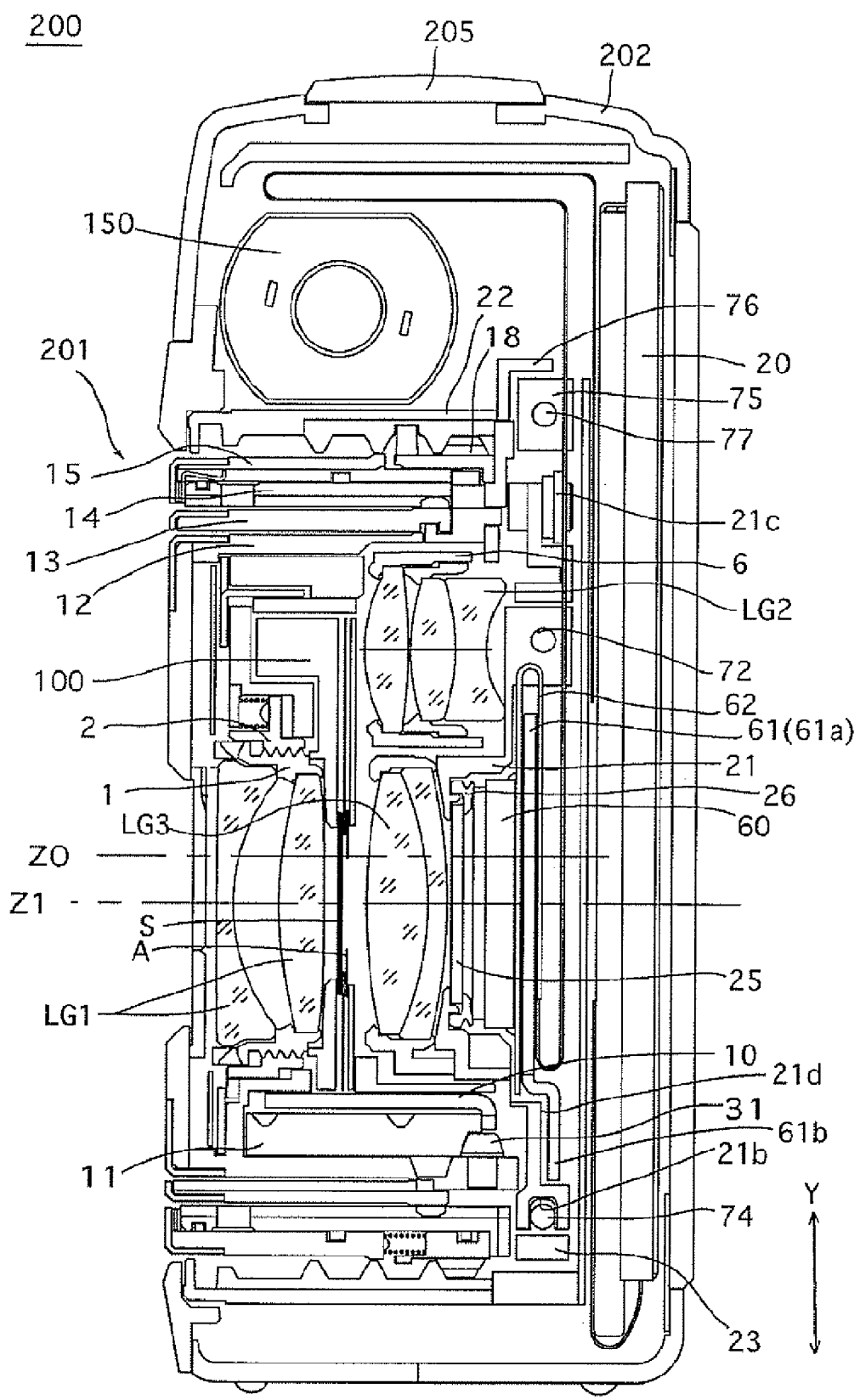
FIG. 3 is a longitudinal sectional view of the digital camera shown in FIG. 1 in the fully-retracted state of the zoom lens.
Figure 5:
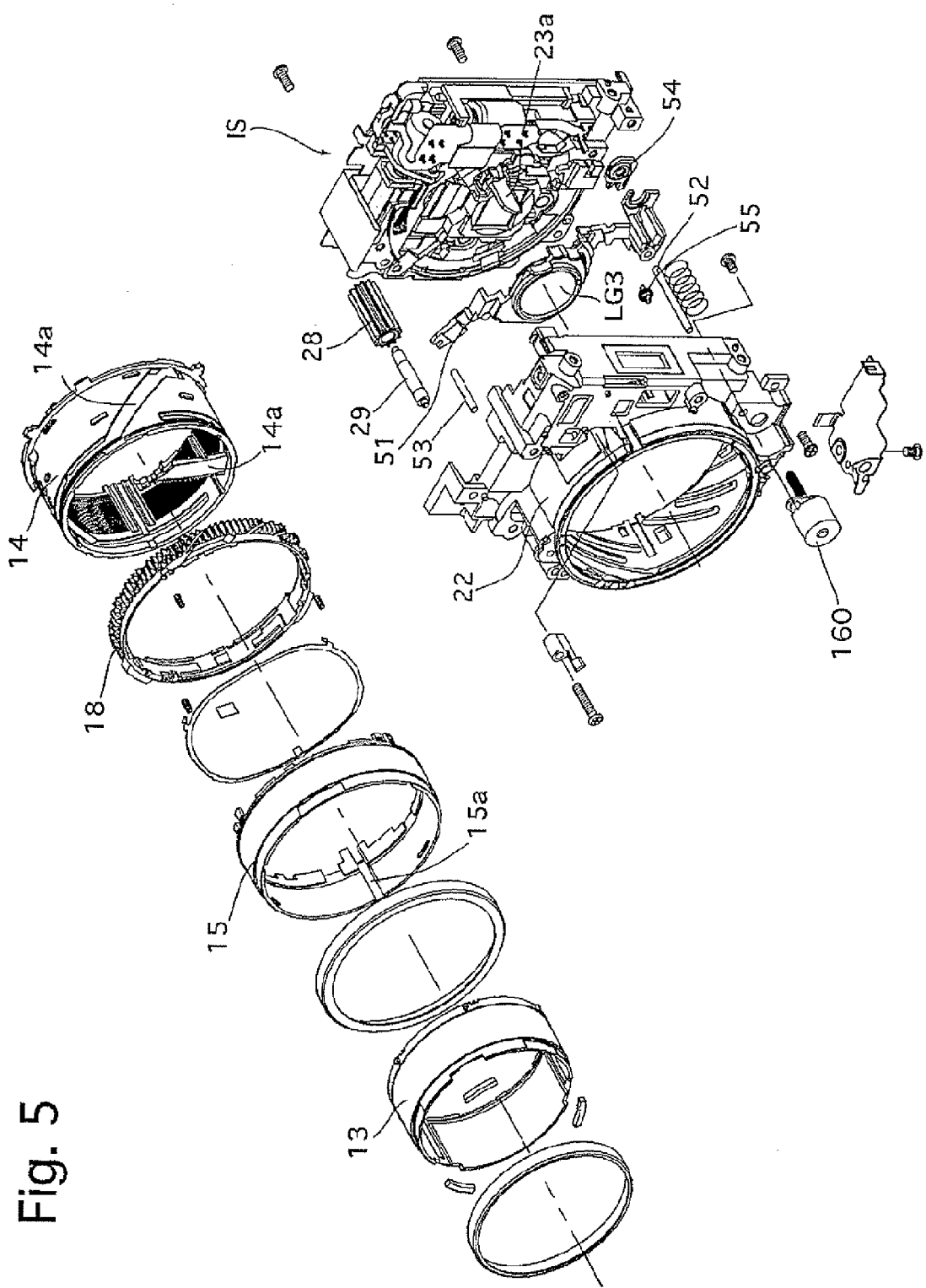
FIG. 5 is an exploded perspective view of a portion of the zoom lens shown in FIG. 4.
Figure 6:
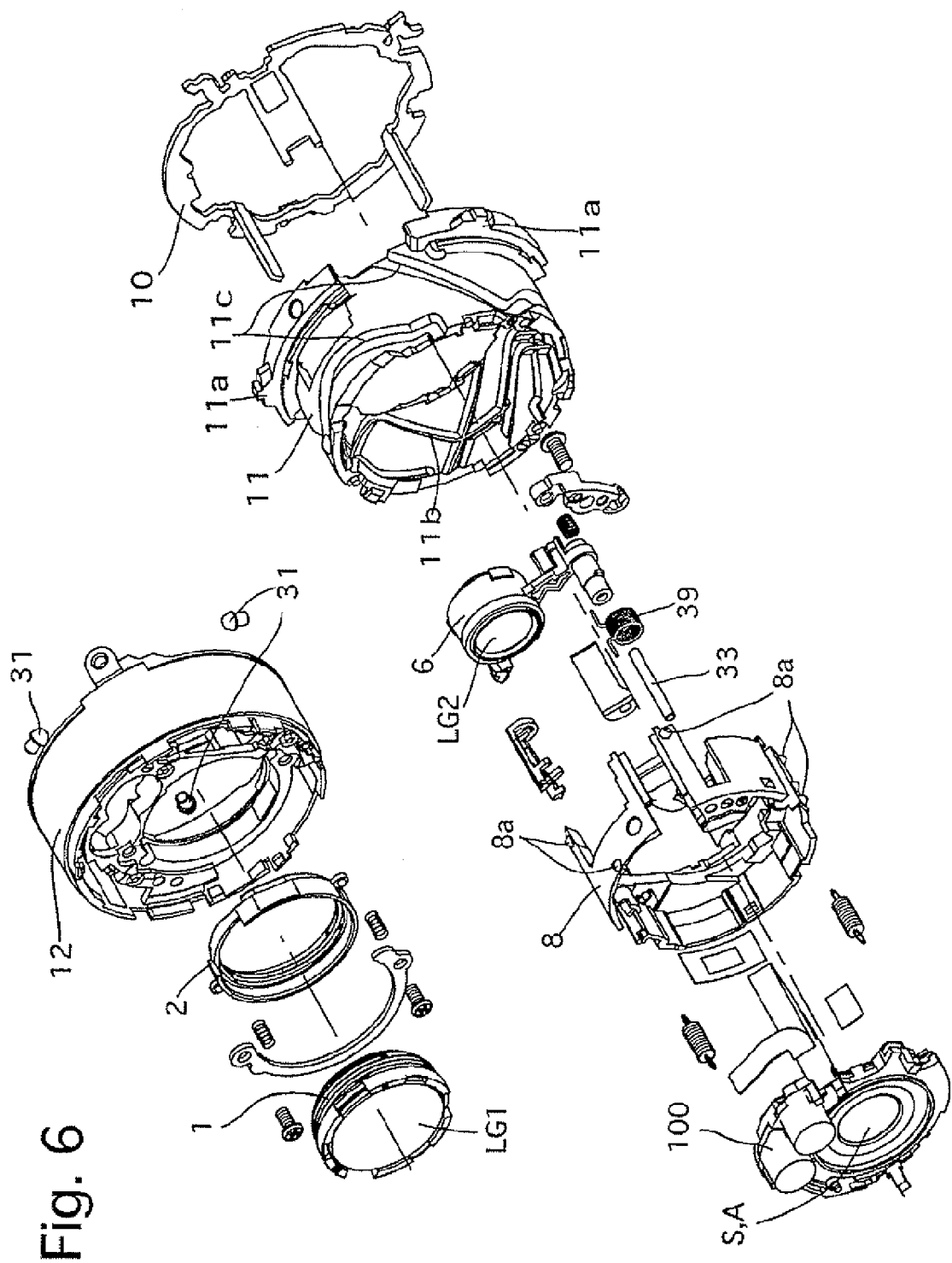
FIG. 6 is an exploded perspective view of another portion of the zoom lens shown in FIG. 4.

The zoom lens 201 of the digital camera 200, longitudinal sectional views of which are shown in FIGS. 2 and 3, is driven to advance toward the object side (leftward as viewed in FIGS. 2 and 3) from the camera body 202 as shown in FIG. 2 during a photographing operation. When photography is not being carried out, the digital camera 200 moves from a ready-to-photograph state shown in FIG. 2 to a fully-retracted state shown in FIG. 3 in which the zoom lens 201 is accommodated (fully retracted) in the camera body 202 as shown in FIG. 3. In FIG. 2, the upper half and the lower half of the zoom lens 201 from a photographing optical axis Z1 show a ready-to-photograph state of the zoom lens 201 at the wide-angle extremity and the telephoto extremity, respectively. As shown in FIGS. 5 and 6, the zoom lens 201 is provided with a plurality of ring members (hollow-cylindrical members): a second linear guide ring 10, a cam ring 11, a third movable barrel 12, a second movable barrel 13, a first linear guide ring 14, a first movable barrel 15, a helicoid ring 13 and a stationary barrel 22 which are substantially concentrically arranged about a common axis that is shown as a lens barrel axis Z0 in FIGS. 2 and 3.

The zoom lens 201 is provided with a photographing optical system including a first lens group LG1, a shutter S, an adjustable diaphragm A, a second lens group LG2, a third lens group LG3, a low-pass filter 25 and a CCD image sensor 60 that serves an image pickup device. Optical elements from the first lens group LG1 to the CCD image sensor 60 are positioned on the photographing optical axis (common optical axis) Z1 when the zoom lens 201 is in a ready-to-photograph state. The photographing optical axis Z1 is parallel to the lens barrel axis Z0 and positioned below the lens barrel axis Z0. The first lens group LG1 and the second lens group LG2 are moved along the photographing optical axis Z1 in a predetermined moving manner to perform a zooming operation, and the third lens group LG3 is moved along the photographing optical axis Z1 to perform a focusing operation. In the following description, the term "optical axis direction" refers to a direction parallel to the photographing optical axis Z1 and the terms "object side" and "image side" refer to forward and rearward of the digital camera 200, respectively. Additionally, in the following description, the vertical direction and the horizontal direction of the digital camera 200 in a plane orthogonal to the photographing optical axis Z1 refer to a Y-direction and an X-direction, respectively.

The stationary barrel 22 is positioned in the camera body 202 and fixed thereto, while a stationary holder 23 is fixed to a rear portion of the stationary barrel 22. The CCD image sensor 60 and the low-pass filter 25 are supported by the stationary holder 23 via a Y-direction moving stage 71 and an X-direction moving stage 21 to be movable in the X-direction and the Y-direction. The digital camera 200 is provided behind the stationary holder 23 with an LCD panel 20 which indicates visual images and various photographic information.

The zoom lens 201 is provided in the stationary barrel 22 with a third lens frame 51 which supports and holds the third lens group LG3. The zoom lens 201 is provided between the stationary holder 23 and the stationary barrel 22 with a pair of guide shafts 52 and 53 which extend parallel to the photographing optical axis Z1 to guide the third lens frame 51 in the optical axis direction without rotating the third lens frame 51 about the lens barrel axis Z0. The third lens frame 51 is biased forward by a third lens frame biasing spring (extension coil spring) 55 (see FIG. 5). The digital camera 200 is provided with a focusing motor 160 having a rotary drive shaft which is threaded to serve as a feed screw, and the rotary drive shaft is screwed through a screw hole formed on an AF nut 54. If the AF nut 54 is moved rearward by a rotation of the rotary drive shaft of the focusing motor 160, the third lens frame 51 is pressed by the AF nut 54 to move rearward. Conversely, if the AF nut 54 is moved forward, the third lens frame 51 follows the AF nut 54 to move forward by the biasing force of the third lens frame biasing spring 55. Due to this structure, the third lens frame 51 can be moved forward and rearward in the optical axis direction.

Figure 4:
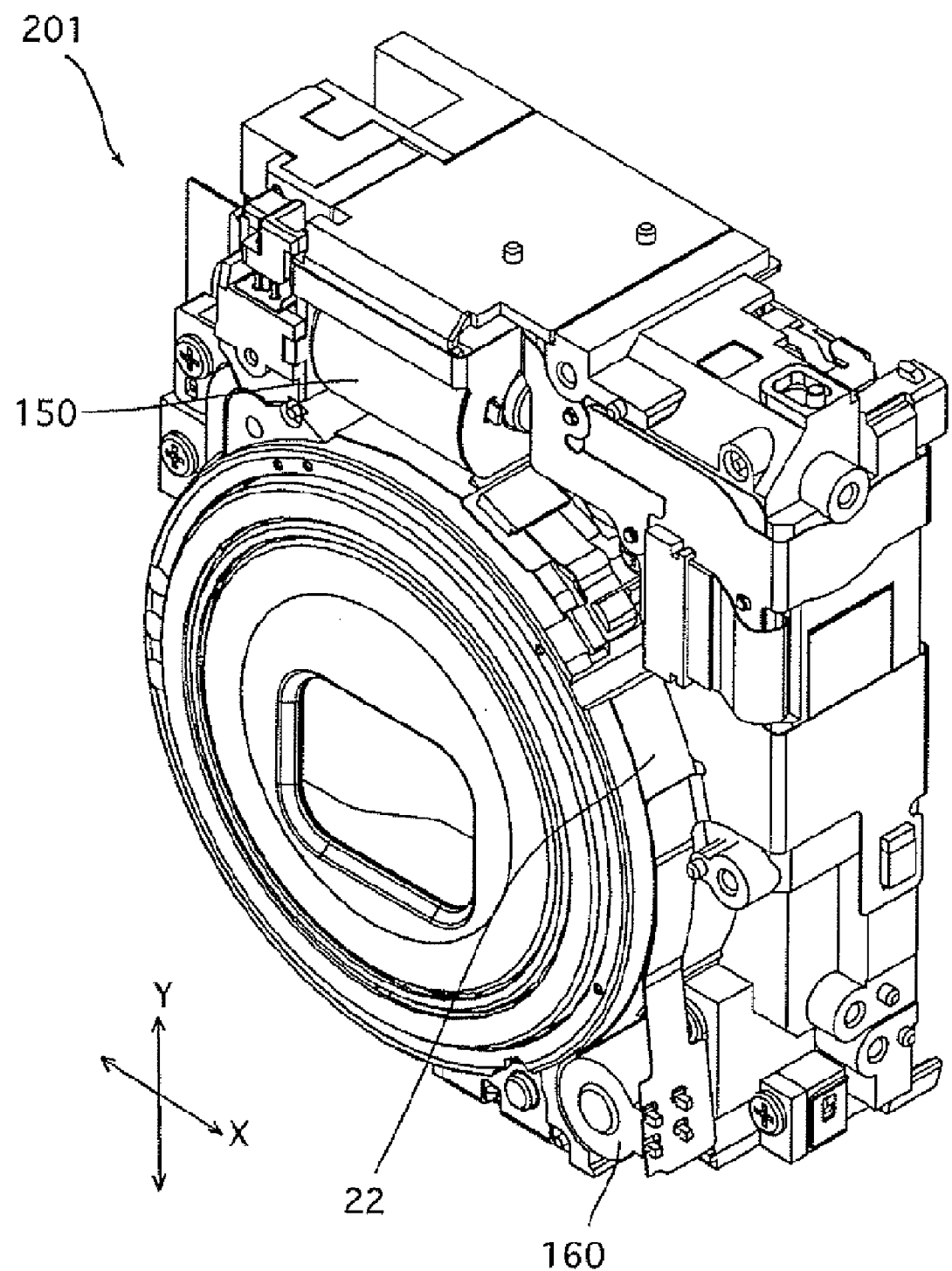
FIG. 4 is a perspective view of the zoom lens of the digital camera shown in FIG. 1 in the fully-retracted state of the zoom lens.

As shown in FIG. 4, the digital camera 200 is provided on the stationary barrel 22 with a zoom motor 150 which is supported by the stationary barrel 22. The driving force of the zoom motor 150 is transferred to a zoom gear 28 (see FIG. 5) via a reduction gear train (not shown). The zoom gear 28 is rotatably fitted on a zoom gear shaft 29 extending parallel to the photographing optical axis Z1. Front and rear ends of the zoom gear shaft 29 are fixed to the stationary barrel 22 and the stationary holder 23, respectively.

The helicoid ring 18 is positioned inside the stationary barrel 22 and supported thereby. The helicoid ring 18 is rotated by rotation of the zoom gear 28. The helicoid ring 18 is moved forward and rearward in the optical axis direction while being rotated about the lens barrel axis Z0 via a helicoid structure (provided between the helicoid ring 18 and the stationary barrel 22) within a predetermined range in the optical axis direction between the position in the fully-retracted state of the zoom lens 201 shown in FIG. 3 and the position in the state of the zoom lens 201 immediately before the zoom lens 201 enters the ready-to-photograph state thereof at the wide-angle extremity shown by the upper half of the zoom lens 201 in FIG. 2. In a ready-to-photograph state of the zoom lens 201 shown in FIG. 2 (between the wide-angle extremity and the telephoto extremity), the helicoid ring 18 is rotated at a fixed position without moving in the optical axis direction. The first movable barrel 15 is coupled to the helicoid ring 18 to be rotatable together with the helicoid ring 18 about the lens barrel axis Z0 and to be movable together with the helicoid ring 18 in the optical axis direction.

The first linear guide ring 14 is positioned inside the first movable barrel 15 and the helicoid ring 18 and supported thereby. The first linear guide ring 14 is guided linearly in the optical axis direction via linear guide grooves formed on the stationary barrel 22, and is engaged with the first movable barrel 15 and the helicoid ring 18 to be rotatable about the lens barrel axis Z0 relative to the first movable barrel 15 and the helicoid ring 18, and to be movable in the optical axis direction together with the first movable barrel 15 and the helicoid ring 18.

As shown in FIG. 5, the first linear guide ring 14 is provided with a set of three through-slots 14a (only two of which appear in FIG. 5) which radially penetrate the first linear guide ring 14. Each through-slot 14a includes a circumferential slot portion and an inclined lead slot portion which extends obliquely rearward from one end of the circumferential slot portion. The inclined lead slot portion is inclined to the optical axis direction, while the circumferential slot portion extends circumferentially about the lens barrel axis Z0. A set of three followers 11a (only two of which appear in FIG. 6) which project radially outward from an outer peripheral surface of the cam ring 11 are engaged in the set of three through-slots 14a, respectively. The set of three followers 11a are further engaged in a set of three rotation transfer grooves 15a which are formed on an inner peripheral surface of the first movable barrel 15 and extend parallel to the photographing optical axis Z1 so that the cam ring 11 rotates with the first movable barrel 15. When the set of three followers 11a are engaged in the lead slot portions of the set of three through-slots 14a, respectively, the cam ring 11 is moved forward and rearward in the optical axis direction while being rotated about the lens barrel axis Z0 and guided by the set of three through-slots 14a. On the other hand, when the set of three followers 11a are engaged in the circumferential slot portions of the set of three through-slots 14a, respectively, the cam ring 11 is rotated at a fixed position without moving in the optical axis direction. Similar to the helicoid ring 18, the cam ring 11 is moved forward and rearward in the optical axis direction while being rotated about the lens barrel axis Z0 within a predetermined range in the optical axis direction between the position in the fully-retracted state of the zoom lens 201 shown in FIG. 3 and the position in the state of the zoom lens 201 immediately before the zoom lens 201 enters the ready-to-photograph state thereof at the wide-angle extremity (shown by the upper half of the zoom lens 201 in FIG. 2), and the cam ring 11 is rotated at a fixed position without moving in the optical axis direction in a ready-to-photograph state of the zoom lens 201 shown in FIG. 2 (between the wide-angle extremity and the telephoto extremity).

The first linear guide ring 14 guides the second linear guide ring 10 and the second movable ring 13 linearly in the optical axis direction by linear guide grooves which are formed on an inner peripheral surface of the first linear guide ring 14 extending parallel to the photographing optical axis Z1. The second linear guide ring 10 guides a second lens group moving frame 8, which indirectly supports the second lens group LG2, linearly in the optical axis direction, while the second movable barrel 13 guides the third movable barrel 12, which indirectly supports the first lens group LG1, linearly in the optical axis direction. Each of the second linear guide ring 10 and the second movable barrel 13 is supported by the cam ring 11 to be rotatable relative to the cam ring 11 about the lens barrel axis Z0 and to be movable together with the cam ring 11 in the optical axis direction.

The cam ring 11 is provided on an inner peripheral surface thereof with a plurality of inner cam grooves 11b for moving the second lens group LG2, and the second lens group moving frame 8 is provided on an outer peripheral surface thereof with a plurality of cam followers 8a which are engaged in the plurality of inner cam grooves 11b, respectively. Since the second lens group moving frame 8 is guided linearly in the optical axis direction without rotating via the second linear guide ring 10, a rotation of the cam ring 11 causes the second lens group moving frame 8 to move in the optical axis direction in a predetermined moving manner in accordance with contours of the plurality of inner cam grooves 11b.

As shown in FIG. 6, the zoom lens 201 is provided inside the second lens group moving frame 8 with a second lens frame 6 which supports and holds the second lens group LG2.

The second lens frame 6 is supported by the second lens group moving frame 8 to be rotatable (swingable) about a pivot shaft 33. The pivot shaft 33 extends parallel to the photographing optical axis Z1. The second lens frame 6 is swingable about the pivot shaft 33 between a photographing position (shown in FIG. 2) where the second lens group LG2 is positioned on the photographing optical axis Z1, and a radially retracted position (shown in FIG. 3) where the optical axis of the second lens group LG2 is retracted away from the photographing optical axis Z1 to be positioned above the photographing optical axis Z1. The second lens frame 6 is biased to rotate in a direction toward the aforementioned photographing position of the second lens frame 6 by a torsion spring 39. The stationary holder 23 is provided with a position-control cam bar 23a (see FIG. 5) which projects forward from the stationary holder 23 to be engageable with the second lens frame 6 so that the position-control cam bar 23a comes into pressing contact with the second lens frame 6 to rotate the second lens frame 6 to the radially retracted position thereof against the biasing force of the torsion spring 39 when the second lens group moving frame 8 moves rearward in a retracting direction to approach the stationary holder 23.

The second movable barrel 13, which is guided linearly in the optical axis direction without rotating by the second linear guide ring 10, guides the third movable barrel 12 linearly in the optical axis direction. The third movable barrel 12 is provided on an inner peripheral surface thereof with a set of three cam followers 31 (see FIG. 6) which project radially inwards and the cam ring 11 is provided on an outer peripheral surface thereof with a set of three outer cam grooves 11c (cam grooves for moving the first lens group LG1; only two of them appear in FIG. 6) in which the set of three cam followers 31 are slidably engaged, respectively. The zoom lens 201 is provided inside the third movable barrel 12 with a first lens frame 1 which is supported by the third movable barrel 12 via a first lens group adjustment ring 2.

The zoom lens 201 is provided between the first and second lens groups LG1 and LG2 with a shutter unit 100 including the shutter S and the adjustable diaphragm A. The shutter unit 100 is positioned inside the second lens group moving frame 8 and fixed thereto.

Operations of the zoom lens 201 that has the above described structure will be discussed hereinafter. In the state shown in FIG. 3, in which the zoom lens 201 is in the fully-retracted state, the zoom lens 201 is fully accommodated in the camera body 202. Upon a main switch 101 (see FIG. 25) provided on an outer surface of the camera body 2C2 being turned ON in the fully-retracted state of the zoom lens 201 shown in FIG. 3, the zoom motor 150 is driven to rotate in a lens barrel advancing direction by control of a control circuit 102 (see FIG. 25) provided in the camera body 202. This rotation of the zoom motor 150 rotates the zoom gear 28. The rotation of the zoom gear 28 causes a combination of the first movable barrel 15 and the helicoid ring 18 to move forward while rotating about the lens barrel axis Z0 due to the aforementioned helicoid structure, and further causes the first linear guide ring 14 to move forward linearly together with the first movable barrel 15 and the helicoid ring 18. During this movement, the cam ring 11 which rotates by rotation of the first movable barrel 15 moves forward in the optical axis direction by an amount of movement corresponding to the sum of the amount of the forward movement of the first linear guide ring 14 and the amount of the forward movement of the cam ring 11 by a leading structure between the first linear guide ring 14 and the cam ring 11, i.e., by the engagement of the inclined lead slot portions of the set of three through-slots 14a with the set of three followers 11a of the cam ring 11, respectively. Once the helicoid ring 18 and the cam ring 11 advance to respective predetermined positions, the functions of a rotating/advancing mechanism (the aforementioned helicoid structure between the helicoid ring 18 and the stationary barrel 22) and another rotating/advancing mechanism (the aforementioned leading structure) between the cam ring 11 and the first linear guide ring 14 are canceled, so that each of the helicoid ring 18 and the cam ring 11 rotates about the lens barrel axis Z0 without moving in the optical axis direction.

A rotation of the cam ring 11 causes the second lens group moving frame 8, which is positioned inside the cam ring 11 and guided linearly in the optical axis direction via the second linear guide ring 10, to move in the optical axis direction with respect to the cam ring 11 in a predetermined moving manner due to the engagement of the set of three cam followers 8a with the set of three inner cam grooves 11b, respectively. In the state shown in FIG. 3, in which the zoom lens 201 is in the fully-retracted state, the second lens frame 6, which is positioned inside the second lens group moving frame 8, is held in the radially retracted position off the photographing optical axis Z1 by the action of the position-control cam bar 23a, which projects forward from the stationary holder 23. During the course of movement of the second lens group moving frame 8 from the retracted position to a position in the zooming range, the second lens frame 6 is disengaged from the position-control cam bar 23a to rotate about the pivot shaft 33 from the radially retracted position to the photographing position shown in FIG. 2, so that the optical axis of the second lens group LG2 coincides with the photographing optical axis Z1, by the spring force of the torsion spring 39. Thereafter, the second lens frame 6 remains held in the photographing position until the zoom lens 201 is retracted into the camera body 201.

In addition, a rotation of the cam ring 11 causes the third movable barrel 12, which is positioned around the cam ring 11 and guided linearly in the optical axis direction via the second movable barrel 13, to move in the optical axis direction relative to the cam ring 11 in a predetermined moving manner due to the engagement of the set of three cam followers 31 with the set of three outer cam grooves 11c of the cam ring 11, respectively.

Accordingly, an axial position of the first lens group LG1 relative to a picture plane (imaging surface/light receiving surface of the CCD image sensor 60) when the first lens group LG1 is moved forward from the fully-retracted position is determined by the sum of the amount of forward movement of the cam ring 11 relative to the stationary barrel 22 and the amount of movement of the third external barrel 12 relative to the cam ring 11, and an axial position of the second lens group LG2 relative to the picture plane when the second lens group LG2 is moved forward from the fully-retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 on the photographing optical axis Z1 while changing the air distance therebetween. When the zoom lens 201 is driven to advance from the fully-retracted position shown in FIG. 3, the zoom lens 201 firstly moves to a position shown above the photographing lens axis Z1 in FIG. 2 in which the zoom lens 201 is at the wide-angle extremity. Subsequently, the zoom lens 201 moves a position state shown below the photographing lens axis Z1 in FIG. 2 in which the zoom lens 201 is at the telephoto extremity by a further rotation of the zoom motor 150 in a lens barrel advancing direction thereof. As can be seen from FIG. 2, the space between the first and second lens groups LG1 and LG2 when the zoom lens 201 is at the wide-angle extremity is greater than when the zoom lens 201 is at the telephoto extremity. When the zoom lens 201 is at the telephoto extremity as shown below the photographing lens axis Z1 in FIG. 2, the first and second lens groups LG1 and LG2 have moved to approach each other to have some space therebetween which is smaller than the space in the zoom lens 201 at the wide-angle extremity. This variation of the air distance between the first and second lens groups LG1 and LG2 for the zooming operation is achieved by contours of the plurality of inner cam grooves 11b (for moving the second lens group LG2) and the set of three outer cam grooves 11c (for moving the first lens group LG1) of the cam ring 11. In the zooming range between the wide-angle extremity and the telephoto extremity, the cam ring 11, the first movable barrel 15 and the helicoid ring 18 rotate at their respective axial fixed positions, i.e., without moving in the optical axis direction.

In a ready-to-photograph state of the zoom lens 201 between the wide-angle extremity and the telephoto extremity, a focusing operation is carried out by moving the third lens group LG3 (the third lens frame 51) along the photographing optical axis Z1 by driving the AF motor 160 in accordance with object distance information obtained by a distance measuring device of the digital camera 200.

Upon the main switch 101 being turned OFF, the zoom motor 150 is driven to rotate in a lens barrel retracting direction so that the zoom lens 201 operates in the reverse manner to the above described advancing operation to fully retract the zoom lens 201 into the camera body 202 as shown in FIG. 3. During this retracting movement of the zoom lens 201, the second lens frame 6 rotates about the pivot shaft 33 to the radially retracted position by the position-control cam bar 23a while moving rearward together with the second lens group moving frame 8. When the zoom lens 201 is fully retracted into the camera body 202, the second lens group LG2 is retracted into the space radially outside the space in which the third lens group LG3, the low-pass filter LG4 and the CCD image sensor 60 are retracted as shown in FIG. 3, i.e., the second lens group LG2 is radially retracted into an axial range substantially identical to an axial range in the optical axis direction in which the third lens group LG3, the low-pass filter LG4 and the CCD image sensor 60 are positioned. This structure of the digital camera 200 for retracting the second lens group LG2 in this manner reduces the length of the zoom lens 201 when the zoom lens 201 is fully retracted, thus making it possible to reduce the thickness of the camera body 202 in the optical axis direction, i.e., in the horizontal direction as viewed in FIG. 3.

Figure 7:
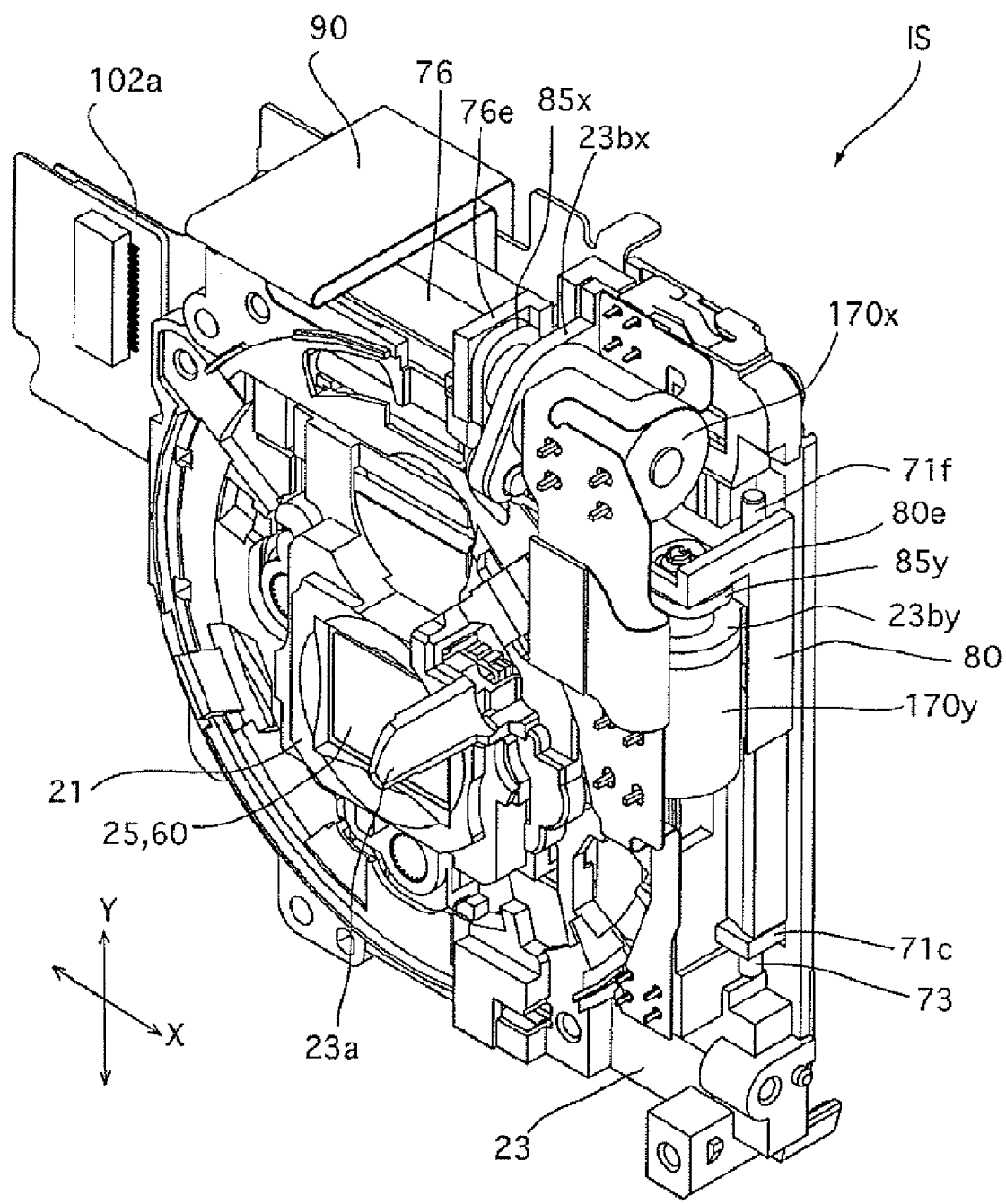
FIG. 7 is a front perspective view of an image stabilizing unit (image stabilizing mechanism) shown in FIG. 5.
Figure 8:
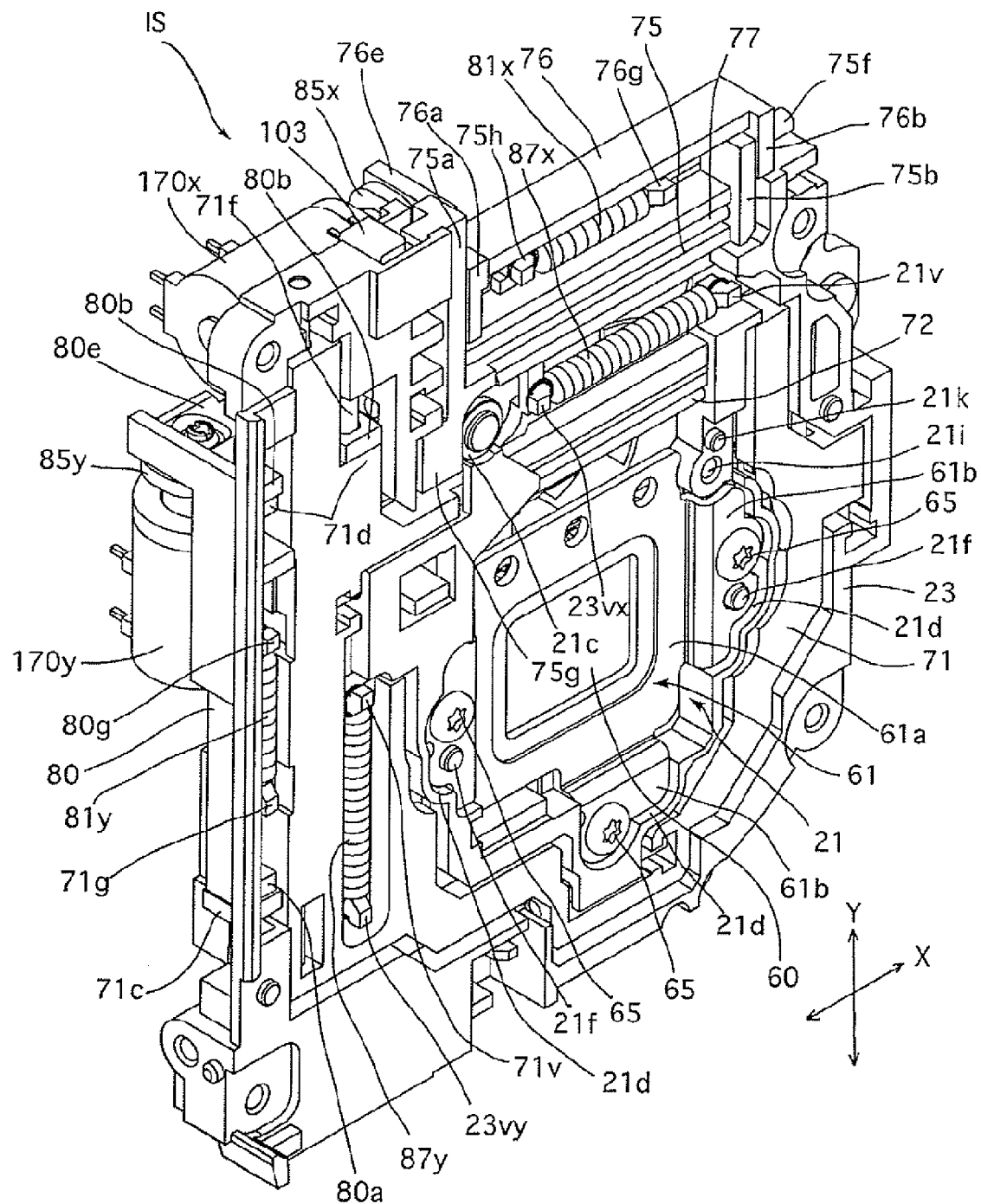
FIG. 8 is a rear perspective view of the image stabilizing unit shown in FIG. 5.
Figure 9:
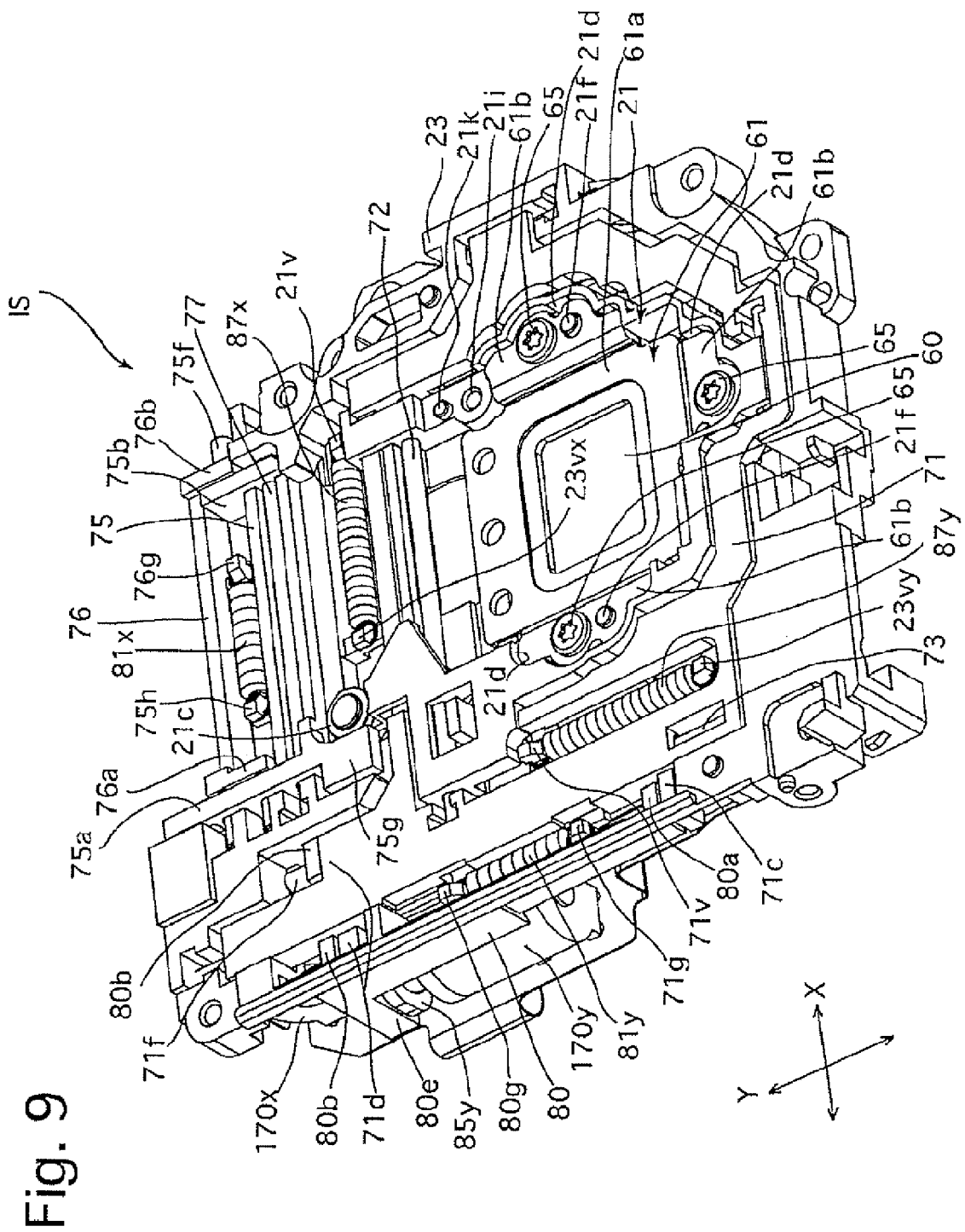
FIG. 9 is a rear perspective view of the image stabilizing unit shown in FIG. 5, viewed from an angle different from the angle of FIG. 8.
Figure 10:
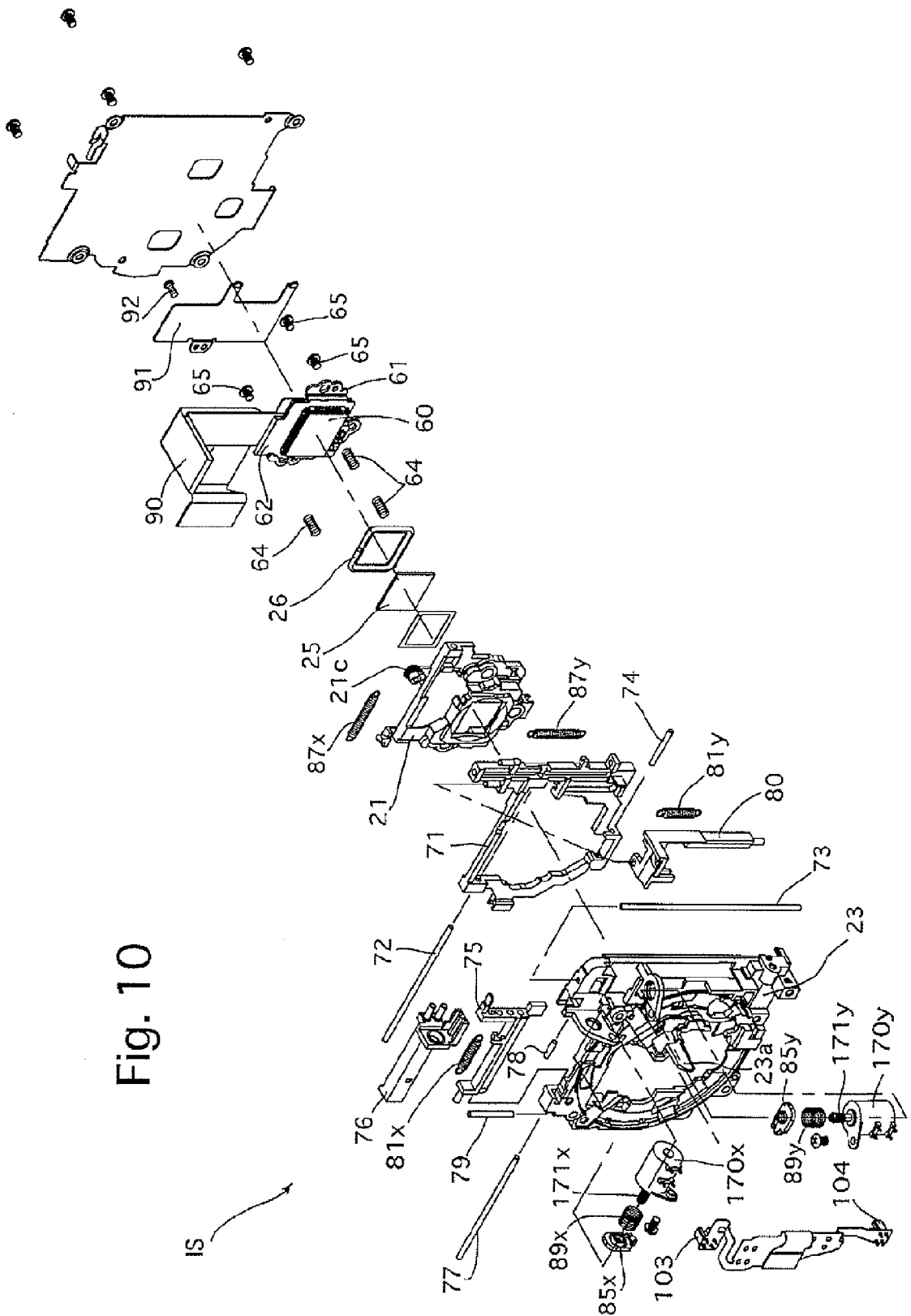
FIG. 10 is an exploded perspective view of the image stabilizing unit.
Figure 25:
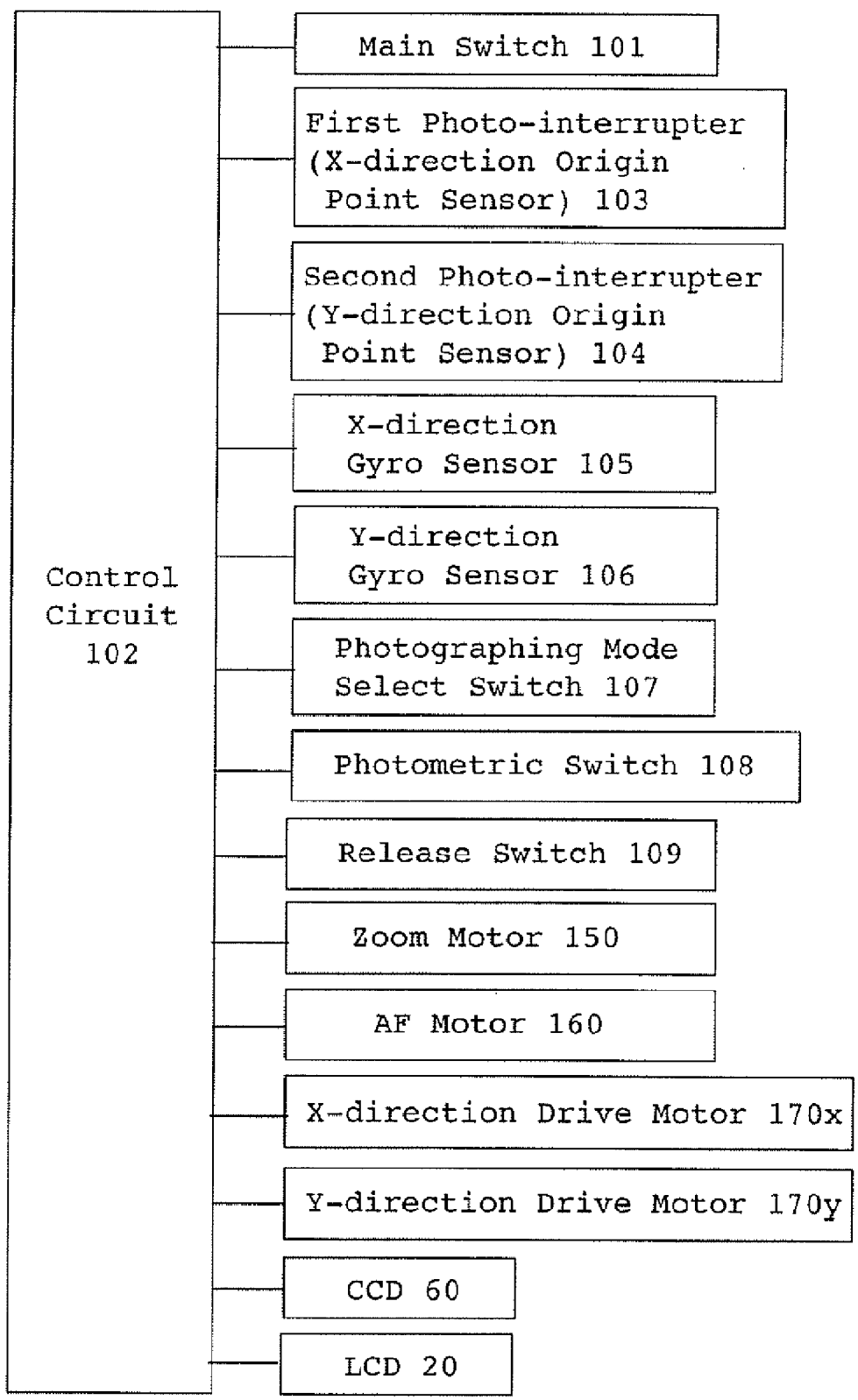
FIG. 25 is a block diagram illustrating a configuration of electrical circuits of the digital camera shown in FIGS. 1 through 3.

The digital camera 200 is provided with an image stabilizer (optical image stabilizer). This image stabilizer moves the CCD image sensor 60 in a plane orthogonal to the photographing optical axis Z1 to counteract image shake of an object image captured by the CCD image sensor 60 in accordance with the direction and the magnitude of vibration (hand shake) applied to the digital camera 200. This control is performed by the control circuit 102 (FIG. 25). FIGS. 7 through 9 show an image stabilizing unit IS including the CCD image sensor 60. FIG. 10 is an exploded perspective view of the entire image stabilizing unit IS and FIGS. 11 through 23 are perspective views or exploded perspective views of various portions of the image stabilizing unit IS.

The stationary holder 23 is provided with a pair of Y-direction guide rods (guide device) 73 and 79 which extend in the Y-direction (the vertical direction of the digital camera 200). The Y-direction moving stage 71 is provided with a guide hole 71a and a guide groove 71b (see FIG. 16) in which the pair of Y-direction guide rods 73 and 79 are engaged so that the Y-direction moving stage 71 is supported by the pair of Y-direction guide rods 73 and 79 to be freely slidable thereon, respectively. A pair of X-direction guide rods (guide device) 72 and 74 are fixed to the Y-direction moving stage 71 to extend in the X-direction (the horizontal direction of the digital camera 200) that is perpendicular to the Y-direction. The X-direction moving stage 21 is provided with a guide hole 21a and a guide groove 21b (see FIGS. 12 and 13) in which the pair of X-direction guide rods 72 and 74 are engaged so that the X-direction moving stage 21 is freely slidable thereon, respectively. Accordingly, the CCD image sensor 60 is supported by the stationary holder 23 via the Y-direction moving stage 71 and the X-direction moving stage 21 to be movable in two axial directions orthogonal to each other in a plane orthogonal to the photographing optical axis Z1. The range of movement of the X-direction moving stage 21 is defined by inner peripheral surfaces of the Y-direction moving stage 71, while the range of movement of the Y-direction moving stage 71 is defined by inner peripheral surfaces of the stationary holder 23.

The image stabilizing unit IS is provided with an X-direction stage biasing spring 87x which is extended so as to be installed between a spring hook 21v formed on the X-direction moving stage 21 and a spring hook 23vx formed on the stationary holder 23. The X-direction stage biasing spring 87x is an extension coil spring and biases the X-direction moving stage 21 rightward as viewed from the front of the zoom lens 201 (leftward as viewed from the rear of the zoom lens 201). The image stabilizing unit IS is provided with a Y-direction stage biasing spring 87y which is extended so as to be installed between a spring hook 71v formed on the Y-direction moving stage 71 and a spring hook 23vy formed on the stationary holder 23. The Y-direction stage biasing spring 87y is an extension coil spring and biases the Y-direction moving stage 71 downward.

Figure 16:
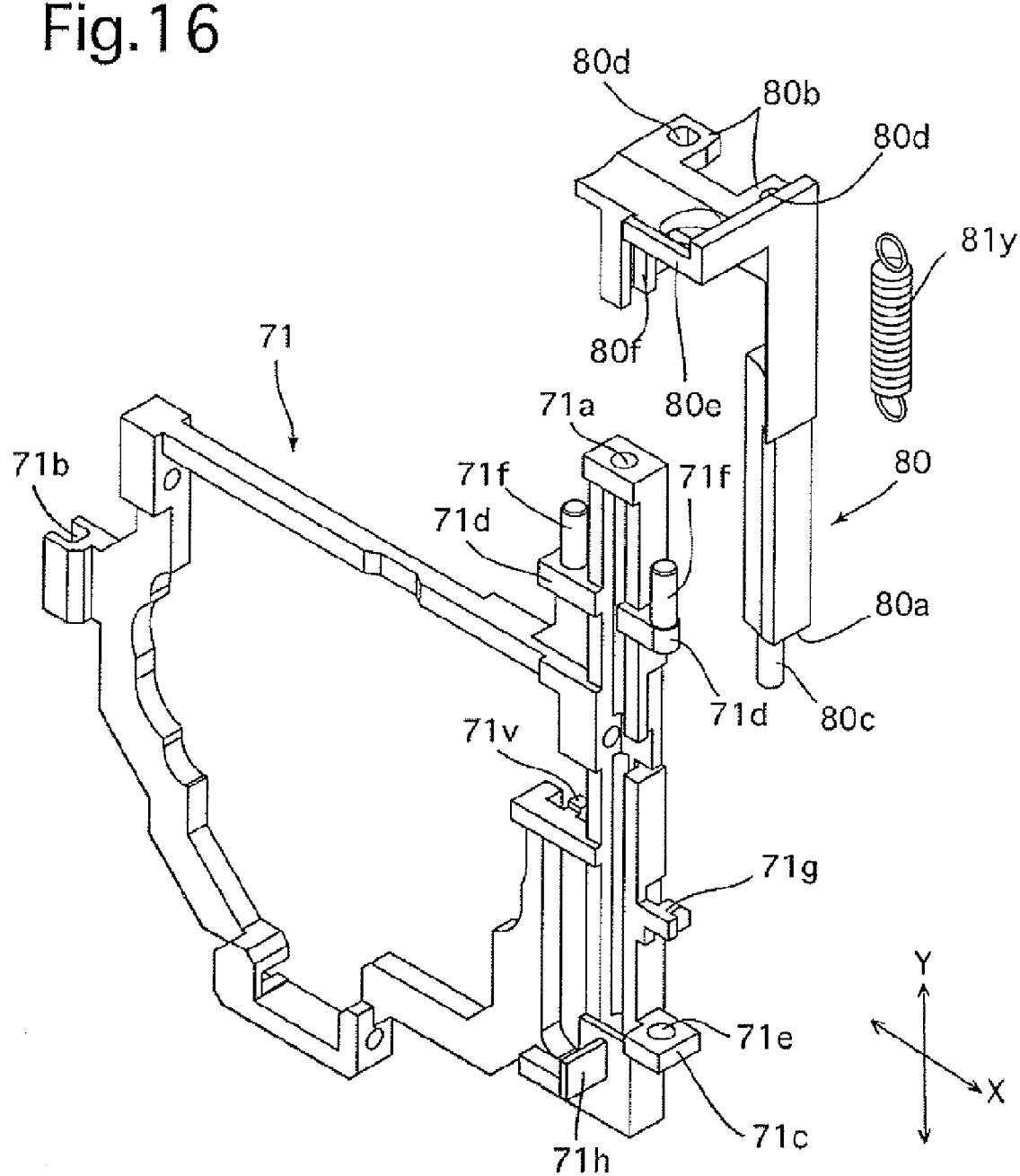
FIG. 16 is an exploded perspective view of a Y-direction moving member, a Y-direction moving stage and an associated extension joining spring of the image stabilizing unit.
Figure 17:
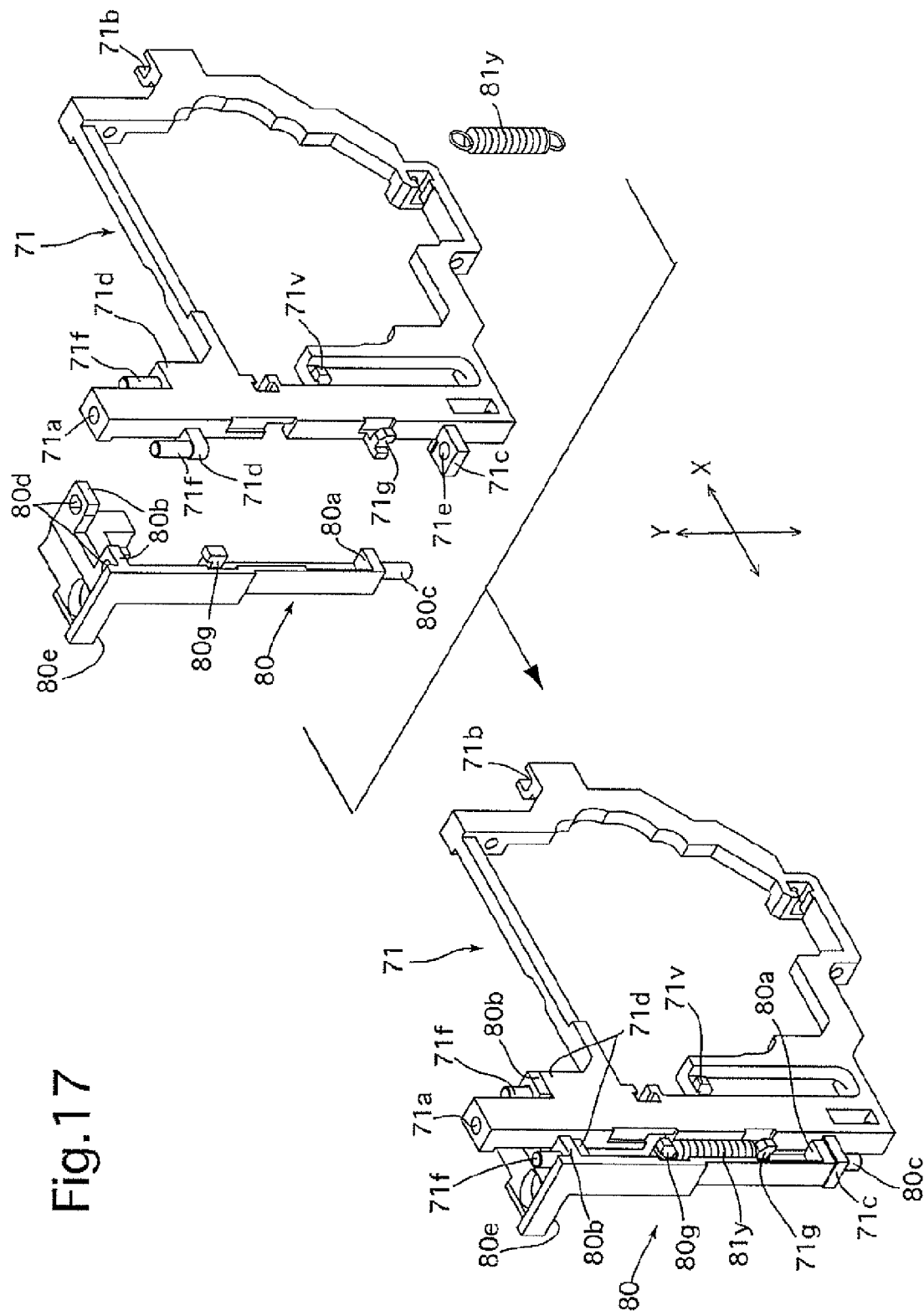
FIG. 17 is a rear perspective view of the Y-direction moving member, the Y-direction moving stage and the associated extension joining spring that are shown in FIG. 16, showing an exploded state and an assembled state thereof.

As shown in FIGS. 16 and 17, the image stabilizing unit IS is provided on one side of the Y-direction moving stage 71 with a Y-direction moving member 80 which is supported by the Y-direction moving stage 71. The Y-direction moving member 80 is elongated in the Y-direction and provided in the vicinity of upper and lower ends of the Y-direction moving member 80 with movement limit lugs 80b and a movement limit lug 80a, respectively. The Y-direction moving member 80 is provided at a lower end thereof with a guide pin 80c which extends downward from the movement limit lug 80a. The movement limit lugs 80b are provided with a pair of guide holes 80d. The Y-direction moving member 80 is further provided in the vicinity of the pair of guide holes 80d with a nut contacting portion 80e and a linear groove 80f (see FIG. 16), and is further provided, on a vertically straight portion of the Y-direction moving member 80 between the movement limit lug 80a and the movement limit lug 80b, with a spring hook 80g (see FIG. 17). The linear groove 80f is elongated in the Y-direction.

The Y-direction moving stage 71 is provided with a movement limit lug 71c and a movement limit lug 71d which face the movement limit lug 80a and the movement limit lug 80b of the Y-direction moving member 80r, respectively. The movement limit lug 71c is provided with a guide hole 71e in which the guide pin 80c is slidably engaged, and the movement limit lug 71d is provided with a pair of guide pins 71f which extend upward to be slidably engaged in the pair of guide holes 80d, respectively. The Y-direction moving stage 71 is provided on a vertically straight portion thereof between the movement limit lug 71c and a movement limit lug 71d, with a spring hook 71g.

The Y-direction moving stage 71 and the Y-direction moving member 80 are guided to be movable relative to each other in the Y-direction by the engagement of the guide hole 71e with the guide pin 80c and the engagement of the pair of guide pins 71f with the pair of guide holes 80d. The image stabilizing unit IS is provided with an extension joining spring 81y which is extended so as to be installed between the spring hook 71g of the Y-direction moving stage 71 and the spring hook 80g of the Y-direction moving member 80. The extension joining spring 81y biases the Y-direction moving stage 71 and the Y-direction moving member 80 in opposite directions to bring the movement limit lug 80a and the movement limit lug 71c into contact with each other and to bring the movement limit lugs 80b and the movement limit lugs 71d into contact with each other, i.e., in opposite directions to move the Y-direction moving stage 71 and the Y-direction moving member 80 upward and downward, respectively.

Figure 14:
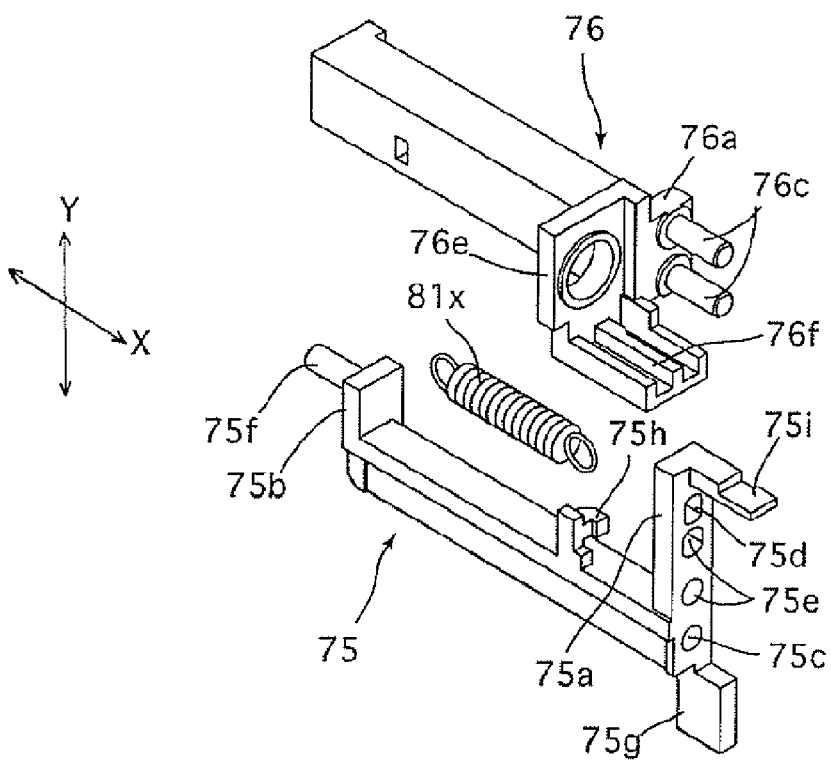
FIG. 14 is a front perspective view of a first X-direction moving member, a second X-direction moving member and an associated extension joining spring of the image stabilizing unit, showing an exploded state thereof.
Figure 15:
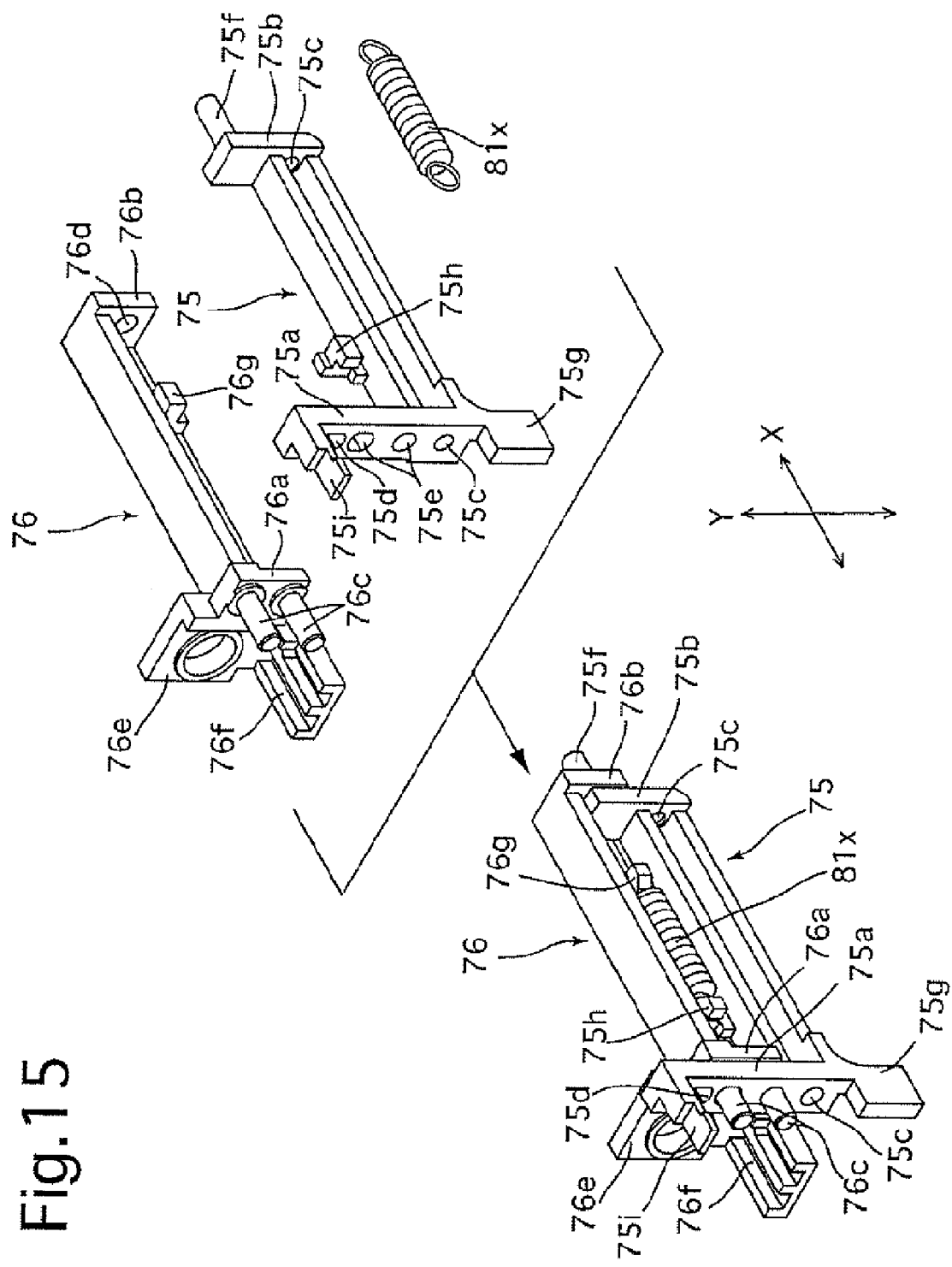
FIG. 15 is a rear perspective view of the first X-direction moving member, the second X-direction moving member and the associated extension joining spring that are shown in FIG. 14, showing an exploded state and an assembled state thereof.

Another pair of X-direction guide rods 77 and 78 that are different from the pair of X-direction guide rods 72 and 74 are fixed to the stationary holder 23 to extend in the X-direction. The image stabilizing unit IS is provided with a first X-direction moving member 75 which is supported by the stationary holder 23 via the pair of X-direction guide rods 77 and 78 to be freely slidable thereon. As shown in FIGS. 14 and 15, the first X-direction moving member 75 is elongated in the X-direction, and is provided, in the vicinity of opposite ends of the first X-direction moving member 75 in the X-direction, with a movement limit lug 75a and a movement limit lug 75b, respectively. A pair of guide holes 75c in which the X-direction guide rod 77 is inserted are formed on the movement limit lugs 75a and 75b, respectively, and are aligned in the X-direction. A guide hole 75d in which the X-direction guide rod 78 is inserted is formed on the movement limit lug 75a. No guide hole corresponding to the guide hole 75d is formed on the movement limit lug 75b. The movement limit lug 75a is provided between the associated guide hole 75c and the guide hole 75d with a pair of guide holes 75e. The movement limit lug 75b is provided, above the associated guide hole 75c in the Y-direction (see FIG. 15), with a guide pin 75f which extends in the X-direction in a direction away from the movement limit lug 75a. The first X-direction moving member 75 is further provided at the bottom of the movement limit lug 75a with a linkage projection 75g, and is further provided, on a horizontally straight portion of the first X-direction moving member 75 between the movement limit lug 75a and a movement limit lug 75b, with a spring hook 75h.

The image stabilizing unit IS is provided on the first X-direction moving member 75 with a second X-direction moving member 76. The second X-direction moving member 76 is provided with a movement limit lug 76a and a movement limit lug 76b which are separate from each other in the X-direction. The movement limit lug 76a is provided with a pair of guide pins 76c which extend in the X-direction to be slidably engaged with the pair of guide holes 75e of the first X-direction moving member 75, respectively, and the movement limit lug 76b is provided with a guide hole 76d in which the guide pin 75f of the first X-direction moving member 75 is slidably engaged. The second X-direction moving member 76 is further provided in the vicinity of the movement limit lug 76a with a nut contacting portion 76e and a linear groove 76f (see FIG. 15), and is further provided, on a horizontally straight portion of the second X-direction moving member 76 between the movement limit lug 76a and the movement limit lug 76b, with a spring book 76g. The linear groove 76f is elongated in the X-direction.

The first X-direction moving member 75 and the second X-direction moving member 76 are guided to be movable relative to each other in the X-direction by the engagement of the pair of guide pins 76c with the pair of guide holes 75e and the engagement of the guide pin 75f with the guide hole 76d. The image stabilizing unit IS is provided with an extension joining spring 81x which is extended so as to be installed between the spring hook 75h of the first X-direction moving member 75 and the spring hook 76g of the second X-direction moving member 76. The extension joining spring 81x biases the first X-direction moving member 75 and the second X-direction moving member 76 in opposite directions to bring the movement limit lug 75a and the movement limit lug 76a into contact with each other and to bring the movement limit lug 75b and the movement limit lug 76b into contact with each other.

The linkage projection 75g of the first X-direction moving member 75 is in contact with a transfer roller 21c (see FIGS. 12, 13 and 24) mounted to the X-direction moving stage 21 so that a moving force in the X-direction is transferred from the first X-direction moving member 75 to the X-direction moving stage 21 via the contacting engagement between the linkage projection 75g and the transfer roller 21c. The transfer roller 21c is supported by a rotation pin parallel to the photographing optical axis Z1 so as to be freely rotatable on the rotation pin. When the X-direction moving stage 21 moves with the Y-direction moving stage 71 in the Y-direction, the transfer roller 21c rolls on a contacting surface of the linkage projection 75g. This contacting surface of the linkage projection 75g is a flat surface elongated in the Y-direction, and accordingly, the structure allowing the transfer roller 21c to roll on the contacting surface of the linkage projection 75g makes it possible for the X-direction moving stage 21 to move in the Y-direction without exerting any driving force in the Y-direction to the first X-direction moving member 75.

Figure 11:
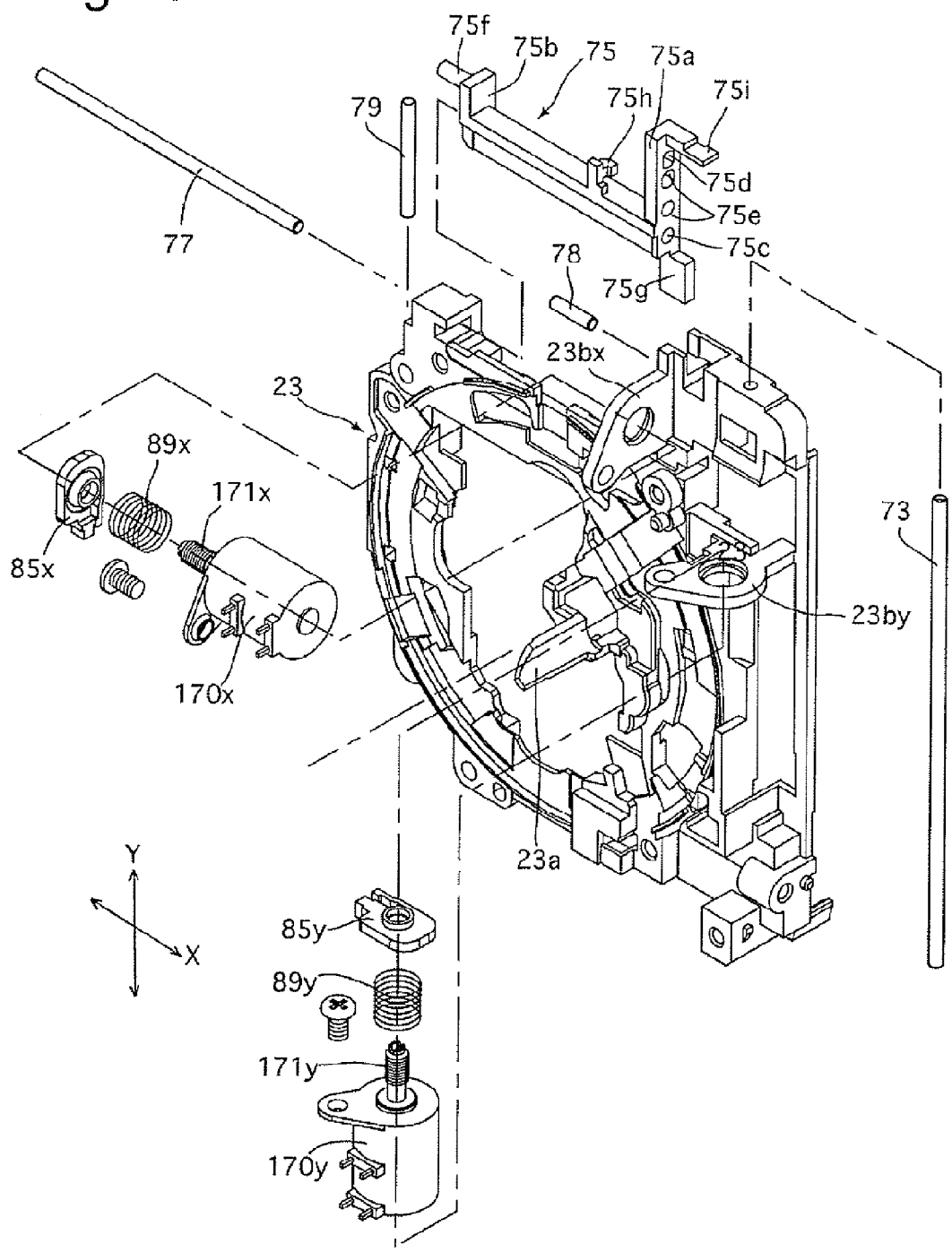
FIG. 11 is an exploded perspective view of a portion of the image stabilizing unit in the vicinity of a stationary holder thereof.

As shown in FIG. 11, the image stabilizing unit IS is provided with an X-direction drive motor 170x serving as a drive source for driving the CCD image sensor 60 in the X-direction and a Y-direction drive motor 170y serving as a drive source for driving the CCD image sensor 60 in the Y-direction. The X-direction drive motor 170x and the Y-direction drive motor 170y are fixed to a motor bracket 23bx and a motor bracket 23by, respectively, which are integrally formed on the stationary holder 23. Each of the X-direction drive motor 170x and the Y-direction drive motor 170y is a stepping motor. A drive shaft (rotary shaft) of the X-direction drive motor 170x is threaded to serve as a feed screw 171x, and a drive shaft (rotary shaft) of the Y-direction drive motor 170y is threaded to serve as a feed screw 171y. The feed screw 171x is screwed into a female screw hole of an X-direction driven nut member 85x and the feed screw 171y is screwed into a female screw hole of a Y-direction driven nut member 85y. The X-direction driven nut member 85x is guided linearly in the X-direction by the linear groove 76f, and is in contact with the nut contacting portion 76e. The Y-direction driven nut member 85y is guided linearly in the Y-direction by the linear groove 80f, and is in contact with the nut contacting portion 80e. The X-direction driven nut member 85x can be screw-disengaged from either end of the feed screw 171x, and the Y-direction driven nut member 85y can be screw-disengaged from either end of the feed screw 171y. A nut-member biasing spring 89x is positioned between the x-direction driven nut member 85x and the X-direction drive motor 170x, and a nut-member biasing spring 89y is positioned between the Y-direction driven nut member 85x and the X-direction drive motor 170y. Each of the nut-member biasing springs 89x and 89y is a compression coil spring which is loosely fitted on the associated feed screw 171x and 171y, respectively, in a compressed state. The nut-member biasing spring 89x biases the X-direction driven nut member 85x in a direction to bring the X-direction driven nut member 85x back into screw engagement with the X-direction drive motor 170x in the case where the X-direction driven nut member 85x is disengaged from the X-direction drive motor 170x toward the X-direction drive motor 170x side. Likewise, the nut-member biasing spring 89y biases the Y-direction driven nut member 85y in a direction to bring the Y-direction driven nut member 85y back into screw engagement with the Y-direction drive motor 170y in the case where the Y-direction driven nut member 85y is disengaged from the Y-direction drive motor 170y toward the Y-direction drive motor 170y side.

Figure 24:
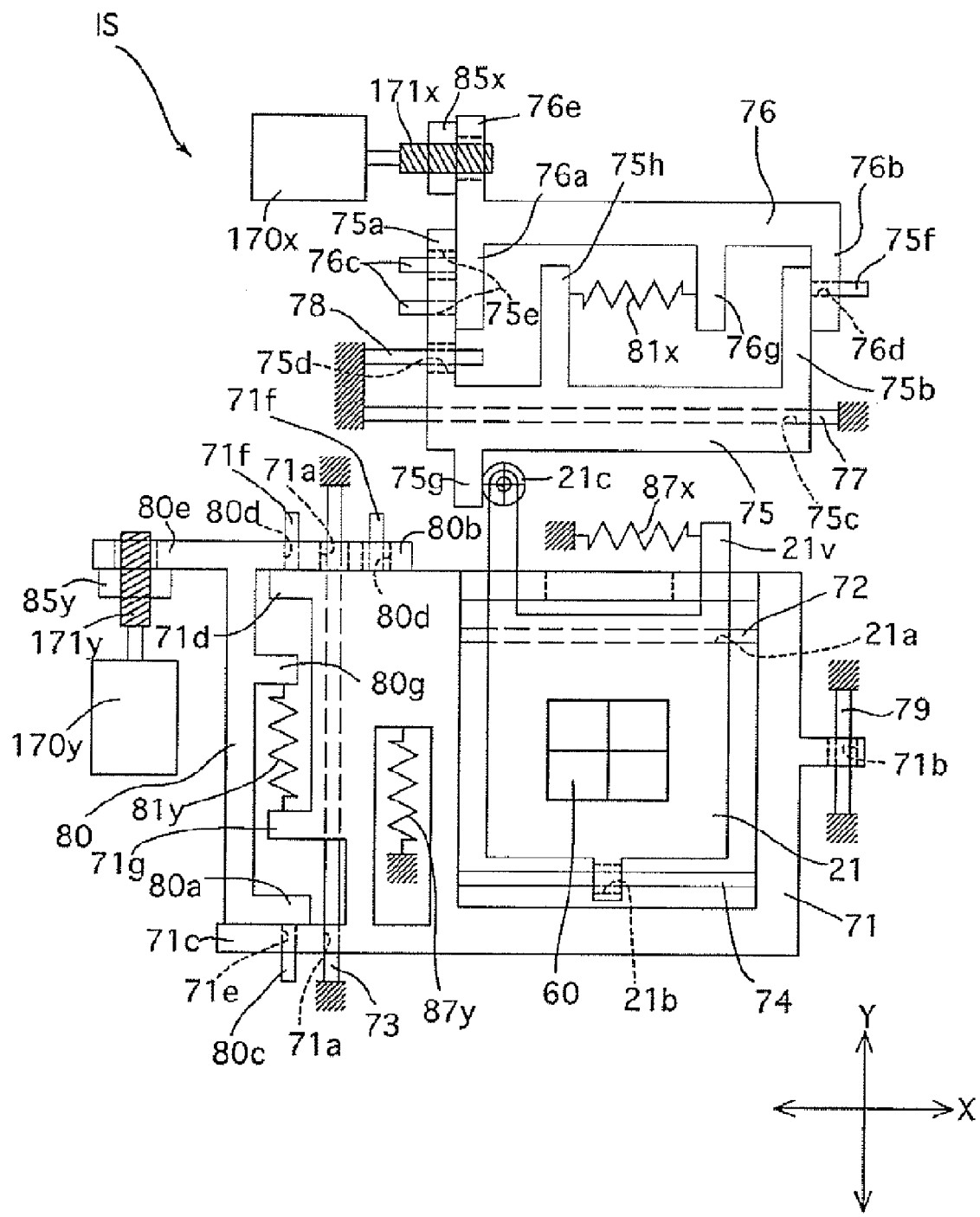
FIG. 24 is a diagrammatic illustration of the image stabilizing unit, showing the structure thereof.

FIG. 24 schematically shows the structure of the image stabilizing unit IS, viewed from the rear of the digital camera 200. Note that the relative position between the X-direction guide rod 78 and the pair of guide pins 76c, etc., are different from those shown in FIGS. 7 through 23 for the purpose of illustration. As can be understood from FIG. 24, in the driving mechanism for driving the CCD image sensor 60 in the X-direction, the first X-direction moving member 75 and the second X-direction moving member 76 are coupled to each other resiliently by the biasing force of the extension joining spring 81x with the movement limit lug 75a and the movement limit lug 75b in contact with the movement limit lug 76a and the movement limit lug 76b, respectively. The biasing force of the X-direction stage biasing spring 87x is exerted on the first X-direction moving member 75 via the transfer roller 21c, which is in contact with the linkage projection 75g. Although the biasing force of the X-direction stage biasing spring 87x is exerted on the first X-direction moving member 75 leftward as viewed in FIG. 24, i.e., in a direction to disengage the movement limit lugs 75a and 75b from the movement limit lugs 76a and 76b, respectively, the biasing force (spring force) of the extension joining spring 81x is predetermined to be greater than that of the X-direction stage biasing spring 87x. Therefore, the first X-direction moving member 75 and the second x-direction moving member 76 are collectively biased leftward as viewed in FIG. 24 while maintaining the movement limit lugs 75a and 75b in resilient contact with the movement limit lugs 76a and 76b, respectively. Since the leftward movement of the second X-direction moving member 76 is limited by the engagement of the nut contacting portion 76e with the X-direction driven nut member 85x, the position of the X-direction driven nut member 85x serves as a reference position for each of the first X-direction moving member 75 and the second X-direction moving member 76 in the X-direction. As can be seen in FIG. 24, the end of the feed screw 171x extends through a through-hole (see FIGS. 14 and 15) formed on the nut contacting portion 76e so as not to interfere therewith.

Driving the X-direction drive motor 170x to rotate the drive shaft thereof (the feed screw 171x) causes the X-direction driven nut member 85x, that is screw-engaged with the feed screw 171x, to move linearly in the X-direction, thus causing the relative position between the first X-direction moving member 75 and the second X-direction moving member 76 in the X-direction to vary. For instance, if the X-direction driven nut member 85x is moved rightward with respect to the view shown in FIG. 24, the X-direction driven nut member 85x presses the nut contacting portion 76e in the rightward direction to thereby integrally move the first X-direction moving member 75 and the second X-direction moving member 76 rightward as viewed in FIG. 24 against the spring force of the X-direction stage biasing spring 87x. If the first X-direction moving member 75 is moved rightward with respect to the view shown in FIG. 24, the linkage projection 75g presses the transfer roller 21c in the rightward direction to thereby move the X-direction moving stage 21 rightward with respect to the view shown in FIG. 24. Conversely, if the X-direction driven nut member 85x is moved leftward with respect to the view shown in FIG. 24, the first X-direction moving member 75 and the second X-direction moving member 76 follow the X-direction driven nut member 85x to integrally move leftward with respect to the view shown in FIG. 24 by the biasing force of the X-direction stage biasing spring 87x. At this time, the X-direction moving stage 21 follows the first X-direction moving member 75 to move leftward as viewed in FIG. 24 due to the biasing force of the X-direction stage biasing spring 87x. The linkage projection 75g and the transfer roller 21c are maintained in contact with each other at all times by the biasing force of the X-direction stage biasing spring 87x.

In the driving mechanism for driving the CCD image sensor 60 in the Y-direction, the Y-direction moving stage 71 and the Y-direction moving member 80 are resiliently coupled to each other via the extension joining spring 81y with the movement limit lugs 71c and 71d being in contact with the movement limit lugs 80a and 80b, respectively. Although the Y-direction moving stage 71 is biased downward as viewed in FIG. 24 by the spring force of the Y-direction stage biasing spring 87y, i.e., in a direction to disengage the movement limit lugs 71c and 71d from the movement limit lugs 80a and 80b, respectively, the biasing force (spring force) of the extension joining spring 81y is predetermined to be greater than that of the Y-direction stage biasing spring 87y. Therefore, the Y-direction moving stage 71 and the Y-direction moving member 80 are collectively biased downward while maintaining the movement limit lugs 71c and 71d in resilient contact with the movement limit lugs 80a and 80b, respectively. Since the downward movement of the Y-direction moving member 80 is limited by the engagement of the nut contacting portion 80e with the Y-direction driven nut member 85y, the position of the Y-direction driven nut member 85y serves as a reference position for each of the Y-direction moving stage 71 and the Y-direction moving member 80 in the Y-direction. As can be seen in FIG. 24, the end of the feed screw 171y extends through a through-hole (see FIGS. 16 and 17) formed on the nut contacting portion 80e so as not to interfere therewith.

Driving the Y-direction drive motor 170y to rotate the drive shaft thereof (the feed screw 171y) causes the Y-direction driven nut member 85y, that is screw-engaged with the feed screw 171y, to move linearly in the Y-direction, thus causing the relative position between the Y-direction moving stage 71 and the Y-direction moving member 80 in the Y-direction to vary. For instance, if the Y-direction driven nut member 85y is moved upward with respect to the view shown in FIG. 24, the Y-direction driven nut member 85y presses the nut contacting portion 80e in the upward direction to thereby integrally move the Y-direction moving stage 71 and the Y-direction moving member 80 upward with respect to the view shown in FIG. 24 against the spring force of the Y-direction stage biasing spring 87y. Conversely, if the Y-direction driven nut member 85y is moved downward with respect to the view shown in FIG. 24, the Y-direction moving stage 71 and the Y-direction moving member 80 follow the Y-direction driven nut member 85y to integrally move downward by the biasing force of the Y-direction stage biasing spring 87y.

When the Y-direction moving stage 71 moves in the Y-direction, the X-direction moving stage 21 that is supported by the Y-direction moving stage 71 thereon moves together with the Y-direction moving stage 71. On the other hand, when the X-direction moving stage 21 moves together with the Y-direction moving stage 71 vertically in the Y-direction, the contacting point between the transfer roller 21c and the contacting surface of the linkage projection 75g varies because the first X-direction moving member 75, with which the transfer roller 21c is in contact, does not move in the Y-direction. During this movement, the transfer roller 21c rolls on the contacting surface of the linkage projection 75g so that the X-direction moving stage 21 can be moved in the Y-direction without exerting any driving force on the first X-direction moving member 75 in the Y-direction.

According to the above described structure of the image stabilizing unit IS, the X-direction moving stage 21 can be moved forward and reverse in the x-direction by driving the X-direction drive motor 170x forward and reverse, respectively, and the Y-direction moving stage 71, together with the X-direction moving stage 21 that is supported by the Y-direction moving stage 71, can be moved forward and reverse in the Y-direction by driving the Y-direction drive motor 170y forward and reverse, respectively.

Figure 19:
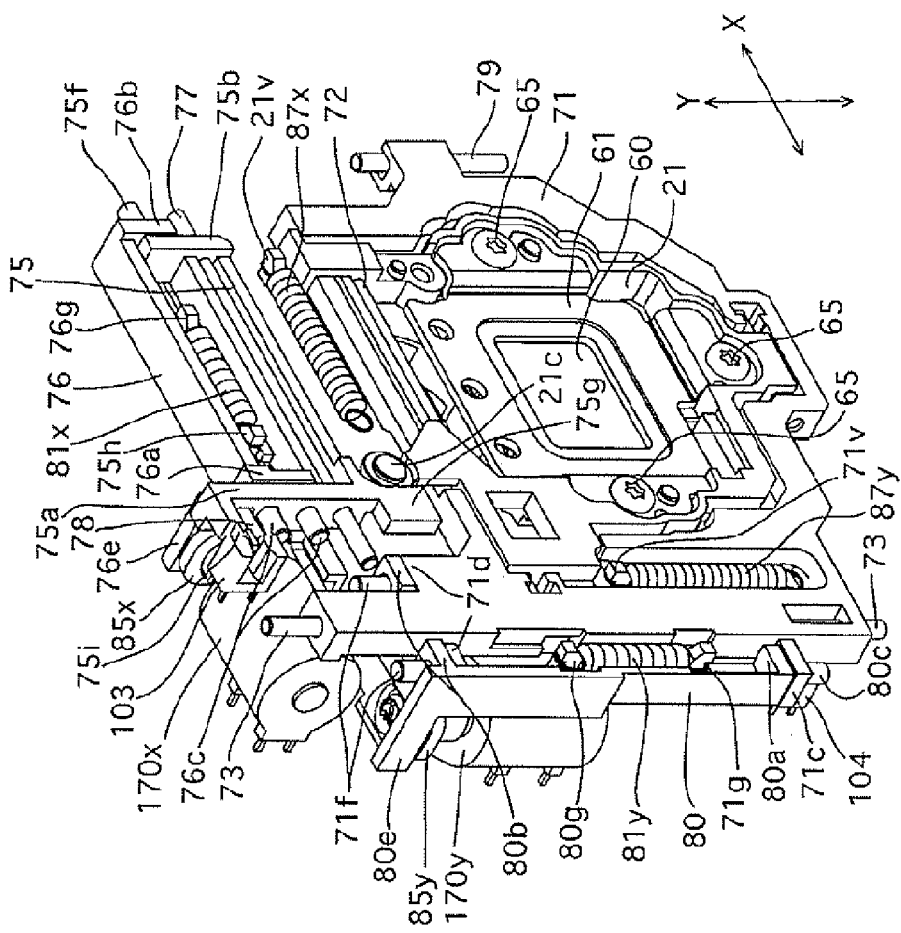
FIG. 19 is a rear perspective view of the elements of the image stabilizing unit shown in FIG. 18.
Figure 18:
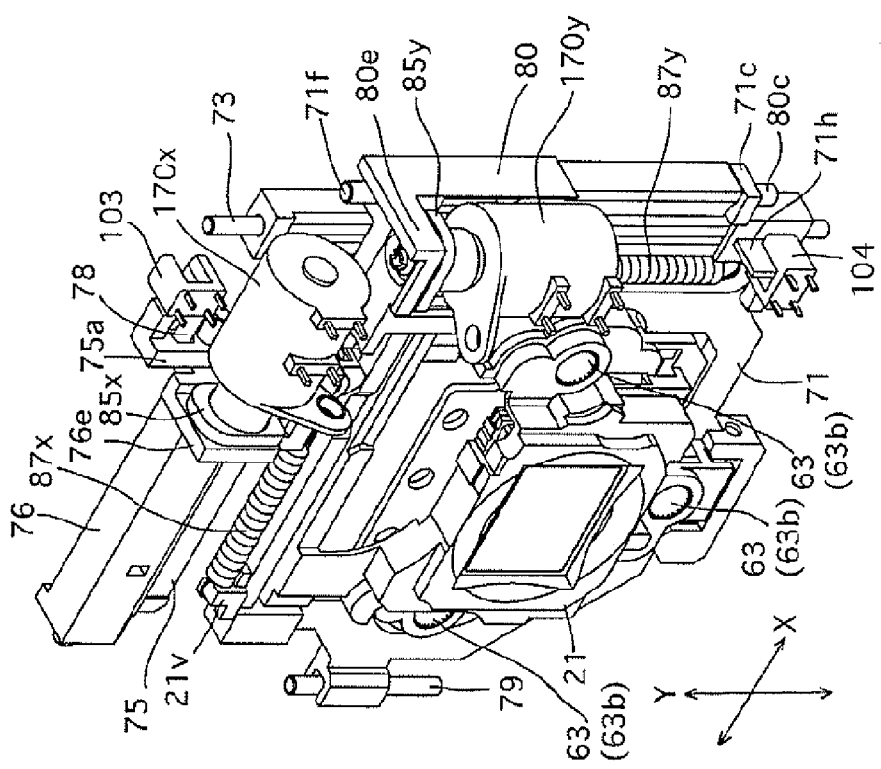
FIG. 18 is a front perspective view of the image stabilizing unit from which the stationary holder is removed.
Figure 21:
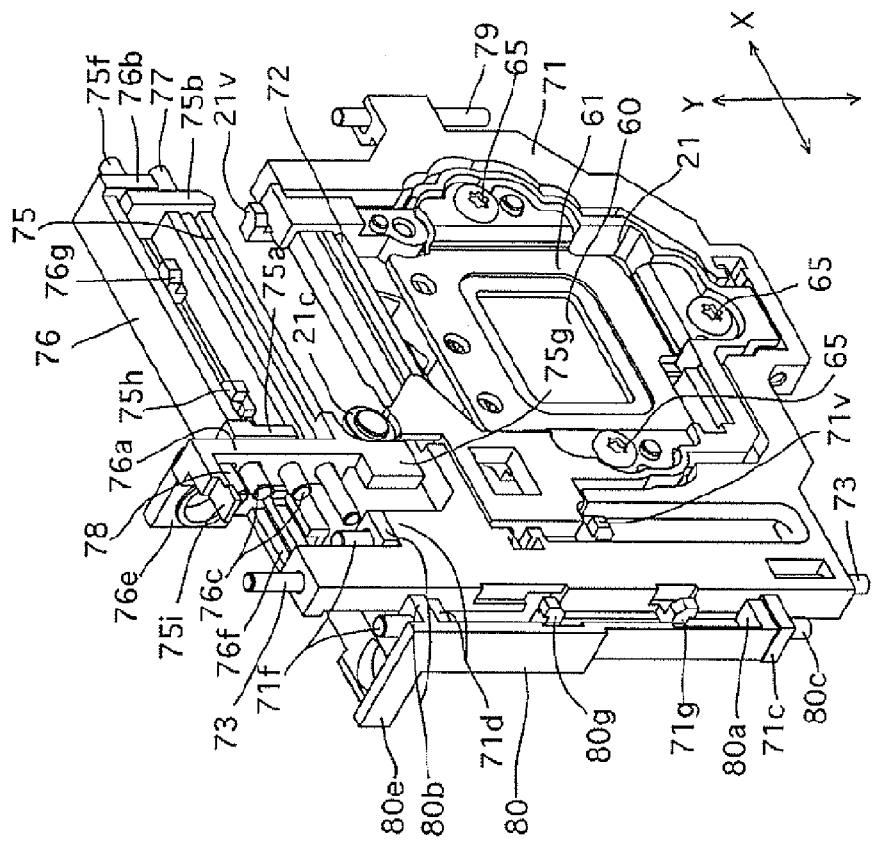
FIG. 21 is a rear perspective view of the elements of the image stabilizing unit shown in FIG. 20.
Figure 20:
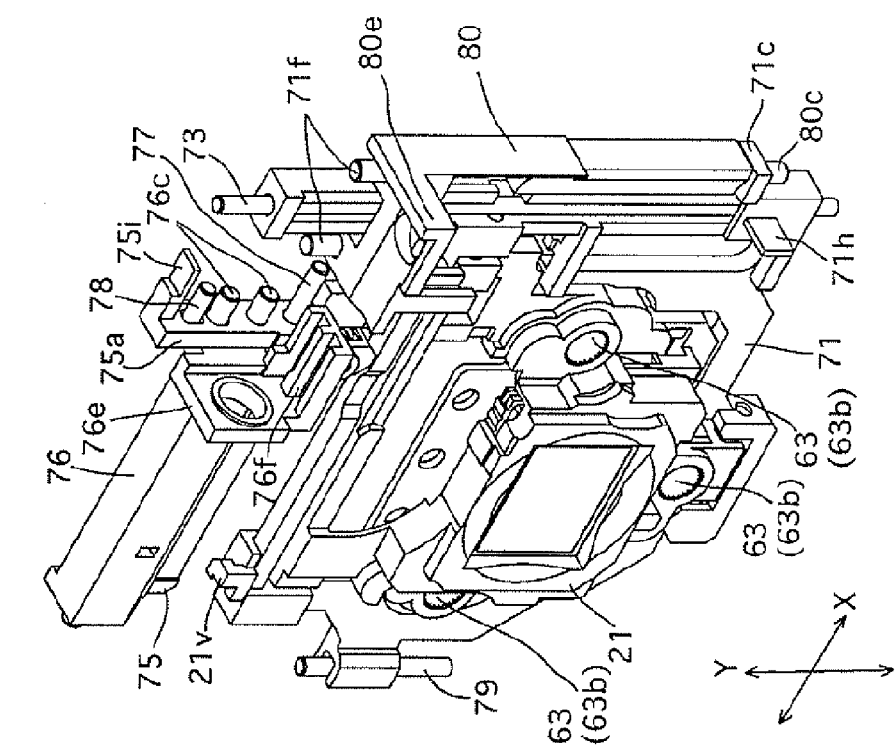
FIG. 20 is a front perspective view of the elements of the image stabilizing unit shown in FIGS. 18 and 19 from which drive motors, photo-interrupters and biasing springs are further removed.
Figure 22:
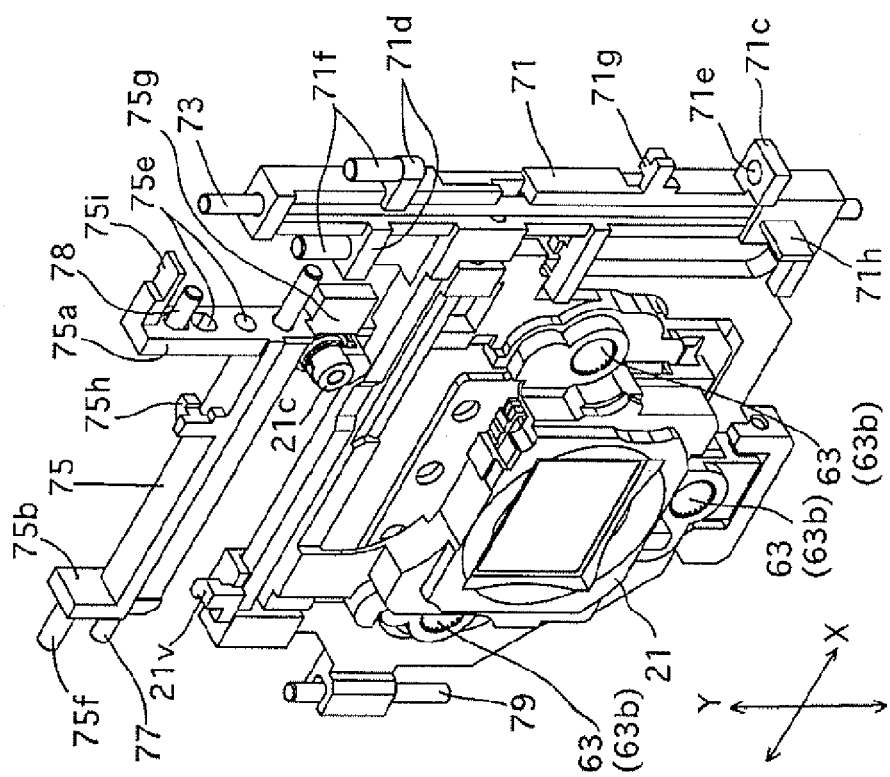
FIG. 22 is a front perspective view of the elements of the image stabilizing unit shown in FIGS. 20 and 21 from which the second X-direction moving member and the Y-direction moving member are further removed.
Figure 23:
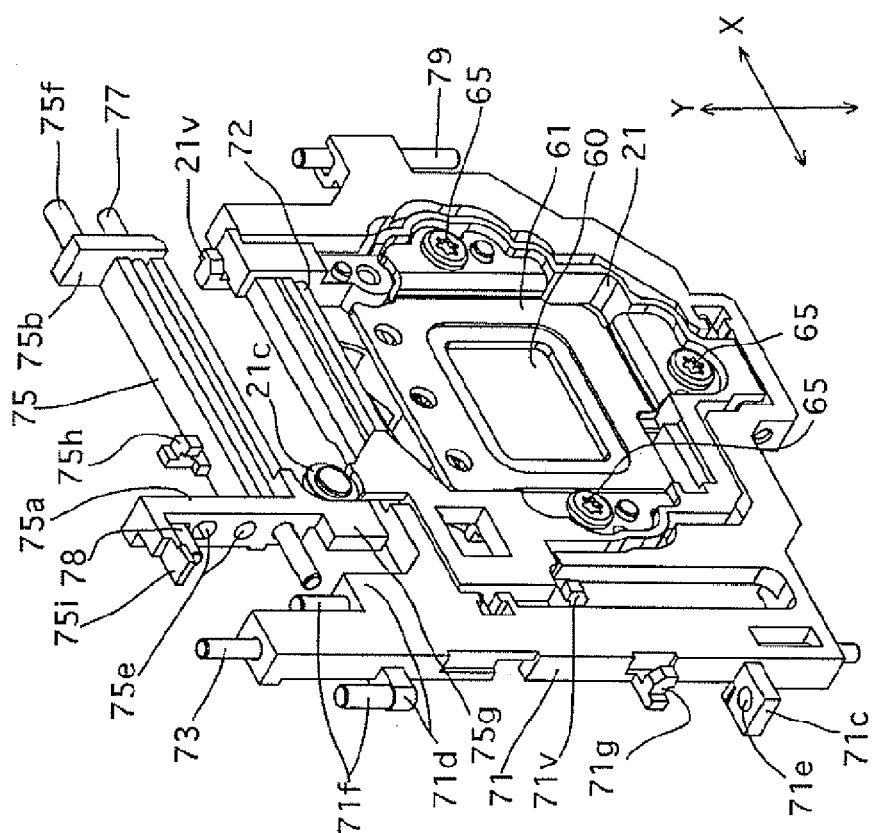
FIG. 23 is a rear perspective view of the elements of the image stabilizing unit shown in FIG. 22.

As shown in FIGS. 14 and 15, the first X-direction moving member 75 is provided in the vicinity of the movement limit lug 75a with a position detection lug 75i in the shape of a small thin plate. As shown in FIG. 16, the Y-direction moving stage 71 is provided in the vicinity of the movement limit lug 71c with a position detection lug 71h in the shape of a small thin plate. As shown in FIGS. 18 and 19, the image stabilizing unit IS is provided with a first photo-interrupter 103 and a second photo-interrupter 104. The first photo-interrupter 103 detects the presence of the position detection lug 75i of the first X-direction moving member 75 that passes between mutually facing emitter/receiver elements when the light beam is blocked by the position detection lug 75i. Likewise, the second photo-interrupter 104 detects the presence of the position detection lug 71h of the Y-direction moving stage 71 that passes between mutually facing emitter/receiver elements when the light beam is blocked by the position detection lug 71h. The initial position of the first X-direction moving member 75 (the X-direction moving stage 21) in the X-direction can be detected by detecting the presence of the position detection lug 75i by the first photo-interrupter 103, and the initial position of the Y-direction moving stage 71 in the Y-direction can be detected by detecting the presence of the position detection lug 71h by the second photo-interrupter 104.

As shown in the block diagram in FIG. 25, the digital camera 200 is provided with an X-direction gyro sensor (angular velocity sensor) 105 and a Y-direction gyro sensor (angular velocity sensor) 106 which detect the angular velocity (angular speed) about two axes (the X-axis and the Y-axis) orthogonal to each other. The magnitude and the direction of camera shake (vibrations) applied to the digital camera 200 are detected by these two gyro sensors 105 and 106. Subsequently, the control circuit 102 determines a moving angle by time-integrating the angular velocity of the camera shake in the two axial directions, detected by the two gyro sensors 105 and 106. Subsequently, the control circuit 102 calculates from the moving angle the moving amounts of the image on a focal plane (imaging surface of the CCD image sensor 60) in the X-direction and in the Y-direction. The control circuit 102 further calculates the driving amounts and the driving directions of the X-direction moving stage 21 (the first X-direction moving member 75 and the second x-direction moving member 76) and the Y-direction moving stage 71 (the Y-direction moving member 80) for the respective axial directions (driving pulses for the X-direction drive motor 170x and the Y-direction drive motor 170y) in order to counteract camera shake.

Thereupon, the X-direction drive motor 170x and the Y-direction drive motor 170y are actuated and the operations thereof are controlled in accordance with the calculated values, which counteracts image shake of an object image captured by the CCD image sensor 60. The digital camera 200 can be put into this image stabilization mode by turning on a photographing mode select switch 107 (see FIG. 25). If the photographing mode select switch 107 is in an off-state, the image stabilizing capability is deactivated so that a normal photographing operation is performed. Additionally, by operating the photographing mode select switch 107, either a first tracking mode or a second tracking mode can be selected in the image stabilization mode. The image stabilizing capability remains activated by driving the X-direction drive motor 170x and the Y-direction drive motor 170y in the first tracking mode, while the image stabilizing capability is activated by driving the X-direction drive motor 170x and the Y-direction drive motor 170y only when a photometric switch 108 or a release switch 109 (see FIG. 25) provided in the digital camera 200 is turned ON in the second tracking mode. The photometric switch 108 is turned ON by depressing the shutter button 205 half way, and the release switch 109 is turned ON by fully depressing the shutter button 205.

The above illustrated image stabilizer of the digital camera 200 is provided with a damage-protection structure which absorbs loads and impacts on a driving force transfer mechanism from each of the X-direction drive motor 170x and the Y-direction drive motor 170y to the CCD image sensor 60 (the X-direction moving stage 21) to prevent damage to the feed screws 171x and 171y and other associated elements. This damage-protection structure is composed of two major components: a first component composed of the first X-direction moving member 75 and the second X-direction moving member 76 (which are resiliently coupled to each other by the extension joining spring 81x) in the driving mechanism for driving the CCD image sensor 60 in the X-direction and a second component composed of the Y-direction moving stage 71 and the Y-direction moving member 80 (which are resiliently coupled to each other by the extension joining spring 81y) in the driving mechanism for driving the CCD image sensor 60 in the Y-direction.

The driving mechanism for driving the CCD image sensor 60 in the X-direction has the capability of protecting itself from damage. This capability will be discussed hereinafter.

For instance, when the X-direction driven nut member 85x is moved rightward with respect to the view shown in FIG. 24 by the X-direction drive motor 170x, the first X-direction moving member 75 and the second X-direction moving member 76, which move integrally in a normal state, move relative to each other in the X-direction so as to disengage the movement limit lug 75a and the movement limit lug 76a (and also the movement limit lug 75b and the movement limit lug 76b) from each other against the biasing force of the extension joining spring 81x in the event of the X-direction moving stage 21 abutting against the Y-direction moving stage 71 upon reaching a mechanical limit of movement of the X-direction moving stage 21 or other causes which interfere with movement of the X-direction moving stage 21. Specifically, the second X-direction moving member 76 can solely move rightward in the X-direction relative to the first X-direction moving member 75 in the case where movement of the first X-direction moving member 75, together with the X-direction moving stage 21, is prevented for some reason. This structure makes it possible for the X-direction driven nut member 85x to move along the feed screw 171x even if the X-direction moving stage 21 becomes immobilized. This prevents excessive loads on the aforementioned driving force transfer mechanism, thus preventing thread jamming between the feed screw 171x and the X-direction driven nut member 85x and further preventing damage to other associated parts of the driving force transfer mechanism. When the X-direction driven nut member 85x is moved leftward with respect to the view shown in FIG. 24 by the X-direction drive motor 170x, the X-direction driven nut member 85x moves in a direction away from the nut contacting portion 76e, and accordingly, the driving force of the X-direction drive motor 170x does not act on either the first X-direction moving member 75 or the second X-direction moving member 76; hence, no undue loads are exerted on the driving force transfer mechanism even if movement of the X-direction moving stage 21 is prevented for some reason.

Similar to the driving mechanism for driving the CCD image sensor 60 in the X-direction, the driving mechanism for driving the CCD image sensor 60 in the Y-direction also has the capability of protecting itself from damage. This capability will be discussed hereinafter. For instance, when the Y-direction driven nut member 85y is moved upward with respect to the view shown in FIG. 24 by the Y-direction drive motor 170y, the Y-direction moving member 80 and the Y-direction moving stage 71, which move integrally in a normal state, move relative to each other in the Y-direction to disengage the movement limit lug 71c and the movement limit lug 80a (and also the movement limit lug 71d and the movement limit lug 80b) away from each other against the biasing force of the extension joining spring 81y in the event of the Y-direction moving stage 71 abutting against the stationary holder 23 upon reaching a mechanical limit of movement of the Y-direction moving stage 71 or other causes which interfere with movement of the Y-direction moving stage 71 (or the X-direction moving stage 21). Specifically, the Y-direction moving member 80 can solely move upward in the Y-direction relative to the Y-direction moving stage 71 in the case where movement of the Y-direction moving stage 71 is prevented for some reason. This structure makes it possible for the Y-direction driven nut member 85y to move along the feed screw 171y even it the Y-direction moving stage 71 becomes immobilized. This prevents excessive loads on the aforementioned driving force transfer mechanism, thus preventing thread jamming between the feed screw 171y and the Y-direction driven nut member 85y and further preventing damage to other associated parts of the driving force transfer mechanism. When the Y-direction driven nut member 85y is moved downward with respect to the view shown in FIG. 24 by the Y-direction drive motor 170y, the Y-direction driven nut member 85y moves in a direction away from the nut contacting portion 80e, and accordingly, the driving force of the Y-direction drive motor 170y does not act on either the Y-direction moving member 80 or the Y-direction moving stage 71; hence no undue loads are exerted on the driving force transfer mechanism even if movement of the Y-direction moving stage 71 is prevented for some reason.

As mentioned above, the range of movement of the X-direction moving stage 21 is defined by inner peripheral surfaces of the Y-direction moving stage 71, while the range of movement of the Y-direction moving stage 71 is defined by inner peripheral surfaces of the stationary holder 23. Namely, the mechanical limits of movement of the X-direction moving stage 21 in the X-direction are defined by inner peripheral surfaces of the Y-direction moving stage 71, while the mechanical limits of movement of the Y-direction moving stage 71 in the Y-direction are defined by inner peripheral surfaces of the stationary holder 23. It is desirable that the driving force of the X-direction drive motor 170x be stopped being transferred from the feed screw 171x to the X-direction driven nut member 85x upon the X-direction moving stage 21 reaching either of the right and left limits of movement thereof, and that the driving force of the Y-direction drive motor 170y be stopped being transferred from the feed screw 171y to the Y-direction driven nut member 85y upon the Y-direction moving stage 71 reaching either of the upper and lower limits of movement thereof. However, taking manufacturing tolerances of the associated components into consideration, such an ideal correlation cannot be always achieved. For instance, if the X-direction driven nut member 85x and the feed screw 171x (or the Y-direction driven nut member 85y and the feed screw 171y) are still screw-engaged with each other by a sufficient axial length in a state where the X-direction moving stage 21 (or the Y-direction moving stage 71) has reached a mechanical limit of movement thereof, there will be a possibility of jamming occurring between the feed screw 171x and the X-direction driven nut member 85x (or the feed screw 171y and the Y-direction driven nut member 85y) due to loads placed on each of the X-direction driven nut member 85x and the feed screw 171x (or the Y-direction driven nut member 85y and the feed screw 171y) by a further rotation of the X-direction drive motor 170x (or the Y-direction drive motor 170y) if the image stabilizer of the digital camera 200 incorporates no damage-protection structure such as the above described damage-protection structure. To prevent this problem from occurring, the image stabilizing mechanism can be constructed so that the X-direction driven nut member 85x (the Y-direction driven nut member 85y) is disengaged from the feed screw 171x (171y) to come off upon reaching either end of the feed screw 171x (171y) after giving the X-direction driven nut member 85x (the Y-direction driven nut member 85y) a sufficient range of movement on the feed screw 171x (171y) so that the X-direction moving stage 21 (the Y-direction moving stage 71) cannot reach a mechanical limit of movement thereof easily. However, according to this structure, the range of movement of each of the X-direction moving stage 21 and the Y-direction moving stage 71 is required to be increased more than necessary, which may undesirably increase the size of the whole image stabilizer. Additionally, if the X-direction moving stage 21 or the Y-direction moving stage 71 is jammed accidentally at some middle point in the range of movement thereof (i.e., not at either end of the range of movement thereof), heavy loads are put on the screw-engaged portion between the X-direction driven nut member 85x (or the Y-direction driven nut member 85y) and the feed screw 171x (or 171y), regardless of the range of movement of the X-direction moving stage 21 or the Y-direction moving stage 71. Conversely, according to the above illustrated embodiment of the image stabilizer, a difference in amount of movement in the X-direction between the X-direction driven nut member 85x and the X-direction moving stage 21 is absorbed by intermediate members (i.e., the first X-direction moving member 75 and the second X-direction moving member 76), while a difference in amount of movement in the Y-direction between the Y-direction driven nut member 85y and the X-direction moving stage 21 is absorbed by intermediate members (i.e., the Y-direction moving stage 71 and the Y-direction moving member 80), and therefore, the range of movement of each of the X-direction moving stage 21 and the Y-direction moving stage 71 does not need to be increased more than necessary.

Moreover, even if the X-direction moving stage 21 or the Y-direction moving stage 71 is jammed accidentally at some middle point in the range of movement thereof (i.e., not at either end of the range of movement thereof), no heavy loads are applied on the screw-engaged portion between the X-direction driven nut member 85x (or the Y-direction driven nut member 85y) and the feed screw 171x (or 171y) because a difference in amount of movement in the X-direction between the X-direction driven nut member 85x and the X-direction moving stage 21 (or a difference in amount of movement in the Y-direction between the X-direction driven nut member 85y and the Y-direction moving stage 21) is absorbed by the aforementioned intermediate members (the first X-direction moving member 75 and the second X-direction moving member 76, or the Y-direction moving stage 71 and the Y-direction moving member 80). In the present embodiment of the image stabilizer, the maximum amount of relative movement between the first X-direction moving member 75 and the second X-direction moving member 76 is predetermined to be capable of absorbing any difference in amount of movement between the X-direction driven nut member 85x and the X-direction moving stage 21 wherever each of the X-direction driven nut member 85x and the X-direction moving stage 21 may be positioned in the range of movement thereof. Likewise, the maximum amount of relative movement between the Y-direction moving stage 71 and the Y-direction moving member 80 is predetermined to be capable of absorbing any difference in amount of movement between the Y-direction driven nut member 85y and the Y-direction moving stage 71 wherever each of the Y-direction driven nut member 85y and the Y-direction moving stage 71 may be positioned in the range of movement thereof.

A restriction on movement on the X-direction moving stage 21 or the Y-direction moving stage 71 is not the only cause of imposing loads on the driving force transfer mechanism. Since the CCD image sensor 60, that serves as an optical element for counteracting image shake, is supported to be freely movable in the X-direction and the Y-direction, there is a possibility of the X-direction moving stage 21 (which holds the CCD image sensor 60) or the Y-direction moving stage 71 (which holds the X-direction moving stage 21) being subjected to a force which forces the X-direction moving stage 21 or the Y-direction moving stage 71 to move even though no driving force is applied thereto by the X-direction drive motor 170x or the Y-direction drive motor 170y, respectively, in the case where a shock or sudden impact is applied to the digital camera 200 when the digital camera 200 is, e.g., dropped to the ground. Even in such a case, such loads, shock or sudden impact can be reliably absorbed in the present embodiment of the image stabilizer.

For instance, if the X-direction moving stage 21 is moved leftward with respect to the view shown in FIG. 24 by an external force other than the driving force of the X-direction drive motor 170x, the first X-direction moving member 75 is pressed in the same direction via the transfer roller 21c. Since this direction of pressing the first X-direction moving member 75 is a direction which disengages the movement limit lugs 75a and 75b from the movement limit lugs 76a and 76b, respectively, the first X-direction moving member 75 can solely move leftward relative to the second X-direction moving member 76 against the biasing force of the extension joining spring 81x. During this movement, the first X-direction moving member 75 does not mechanically press the second X-direction moving member 76, so that only a resilient tensile force of the extension joining spring 81x acts on the second X-direction moving member 76r and accordingly, no excessive force is applied to the X-direction driven nut member 85x from the second X-direction moving member 76. If the X-direction moving stage 21 is moved rightward with respect to the view shown in FIG. 24 by an external force other than the driving force of the X-direction drive motor 170x, the X-direction moving stage 21 moves in a direction to disengage the transfer roller 21c from the linkage projection 75g, and either the first X-direction moving member 75 or the second X-direction moving member 76 is subjected to the moving force of the X-direction moving stage 21. Namely, even if the X-direction moving stage 21 is forced to move forward or reverse in the X-direction by an external force or the like when the X-direction drive motor 170x is not in operation, no undue loads are exerted on the screw-engaged portion between the X-direction driven nut member 85x and the feed screw 171x.

On the other hand, if the Y-direction moving stage 71 is moved downward with respect to the view shown in FIG. 24 by an external force other than the driving force of the Y-direction drive motor 170y, this moving direction of the Y-direction moving stage 71 is a direction which disengages the movement limit lugs 80a and 80b from the movement limit lugs 71c and 71d, respectively, and accordingly, the Y-direction moving stage 71 can solely move downward relative to the Y-direction moving member 80 against the biasing force of the extension joining spring 81y. During this movement, the Y-direction moving stage 71 does not mechanically press the Y-direction moving member 80, so that only a resilient tensile force of the extension joining spring 81y acts on the Y-direction moving member 80, and accordingly, no excessive force is applied to the Y-direction driven nut member 85y from the Y-direction moving member 80. If the X-direction moving stage 21 is moved upward with respect to the view shown in FIG. 24 by an external force other than the driving force of the X-direction drive motor 170x, the Y-direction moving member 80 is pressed upward via the engagement between the movement limit lug 80a and the movement limit lug 71c and the engagement between the movement limit lug 80b and the movement limit lug 71d. During this movement, the moving force of the Y-direction moving member 80 does not act on the Y-direction driven nut member 85y because this direction of movement of the Y-direction moving member 80 is a direction to disengage the nut contacting portion 80e from the Y-direction driven nut member 85y. Namely, even if the Y-direction moving stage 71 is forced to move forward or reverse in the Y-direction by an external force, or the like, when the Y-direction drive motor 170y is not in operation, no undue loads are exerted on the screw-engaged portion between the X-direction driven nut member 85y and the feed screw 71y.

As can be understood from the above description, according to the above illustrated embodiment of the image stabilizer, in either of the following two cases, i.e., the case where a malfunction occurs in the moving operation of the X-direction moving stage 21 and/or the Y-direction moving stage 71 when driven by the X-direction drive motor 170x or the Y-direction drive motor 170y; and the case where the X-direction moving stage 21 and/or the Y-direction moving stage 71 is forced to move unexpectedly by an external force or the like, such an accidental movement can be absorbed to thereby prevent the driving mechanism for the image-stabilizing optical element from being damaged. Specifically, the image stabilizer is designed so that no heavy loads are applied on either of the two screw-engaged portions between the X-direction driven nut member 85x and the feed screw 171x and between the Y-direction driven nut member 85y and the feed screw 171y, which produces a high degree of effectiveness of preventing each of these two screw-engaged portions from being damaged. Although it is possible to drive the X-direction moving stage 21 and the Y-direction moving stage 71 with a high degree of precision by narrowing the lead angles of the feed screws 171x and 171y, respectively, a narrowing of the lead angle of either feed screw disadvantageously reduces the strength of the feed screw mechanism. However, according to the above illustrated embodiment of the image stabilizer, the lead angle of each feed screw can be narrowed since no heavy loads are applied on either of the aforementioned two screw-engaged portions.

Figure 27:
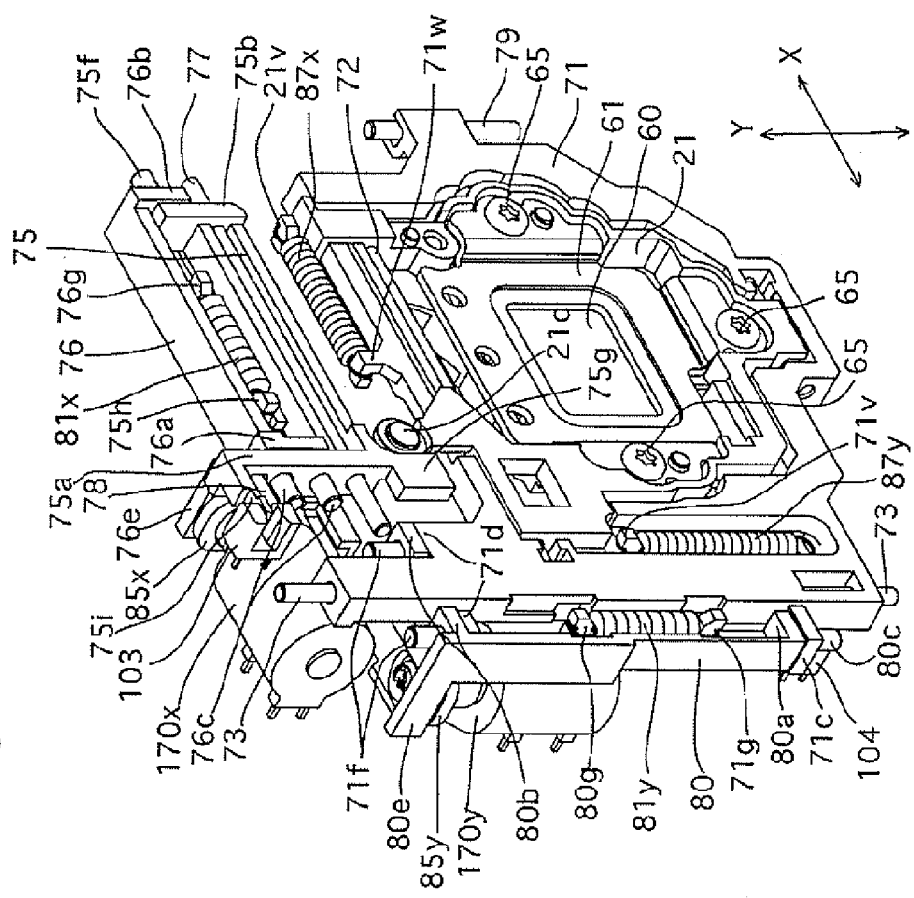
FIG. 27 is a rear perspective view of the elements of the image stabilizing unit shown in FIG. 26.
Figure 26:
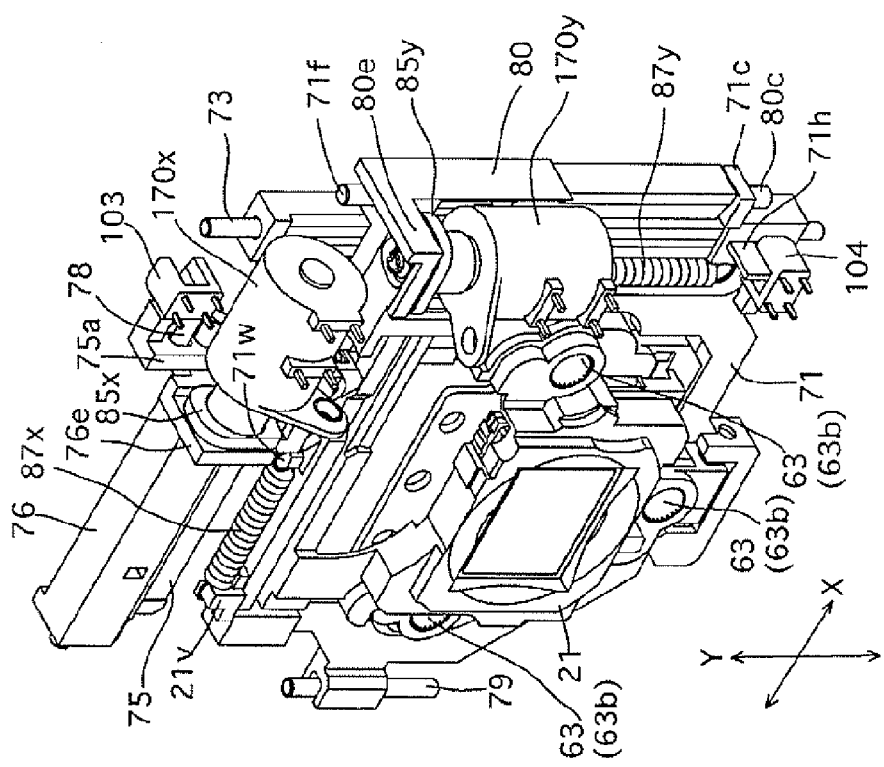
FIG. 26 is a view similar to that of FIG. 18, showing another embodiment (second embodiment) of the image stabilizing unit from which the stationary holder is removed.
Figure 28:
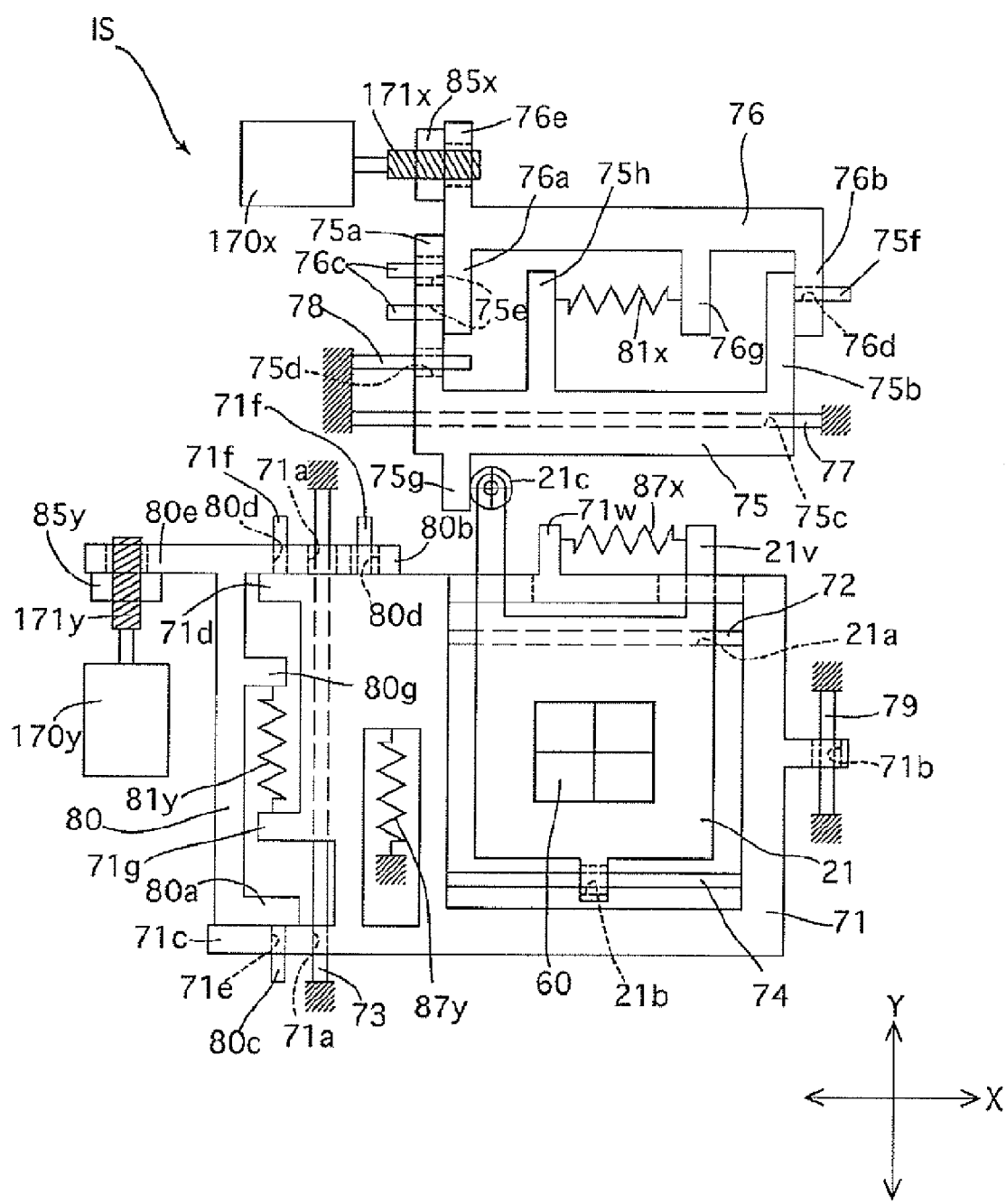
FIG. 28 is a diagrammatic illustration of the second embodiment of the image stabilizing unit, showing the structure thereof.
Figure 29:
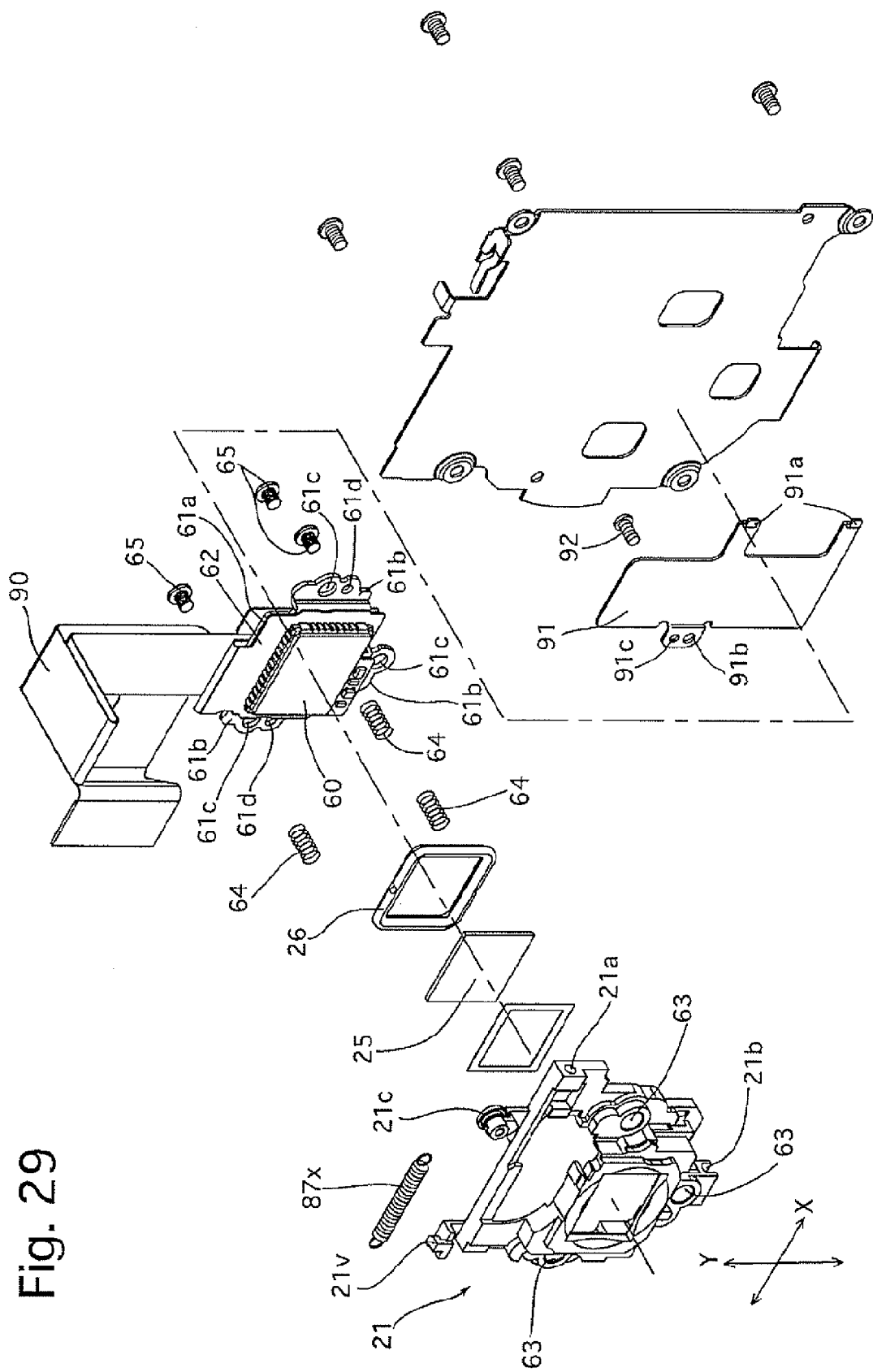
FIG. 29 is an exploded front perspective view of the CCD unit and a stationary cover shown in FIG. 10.
Figure 30:
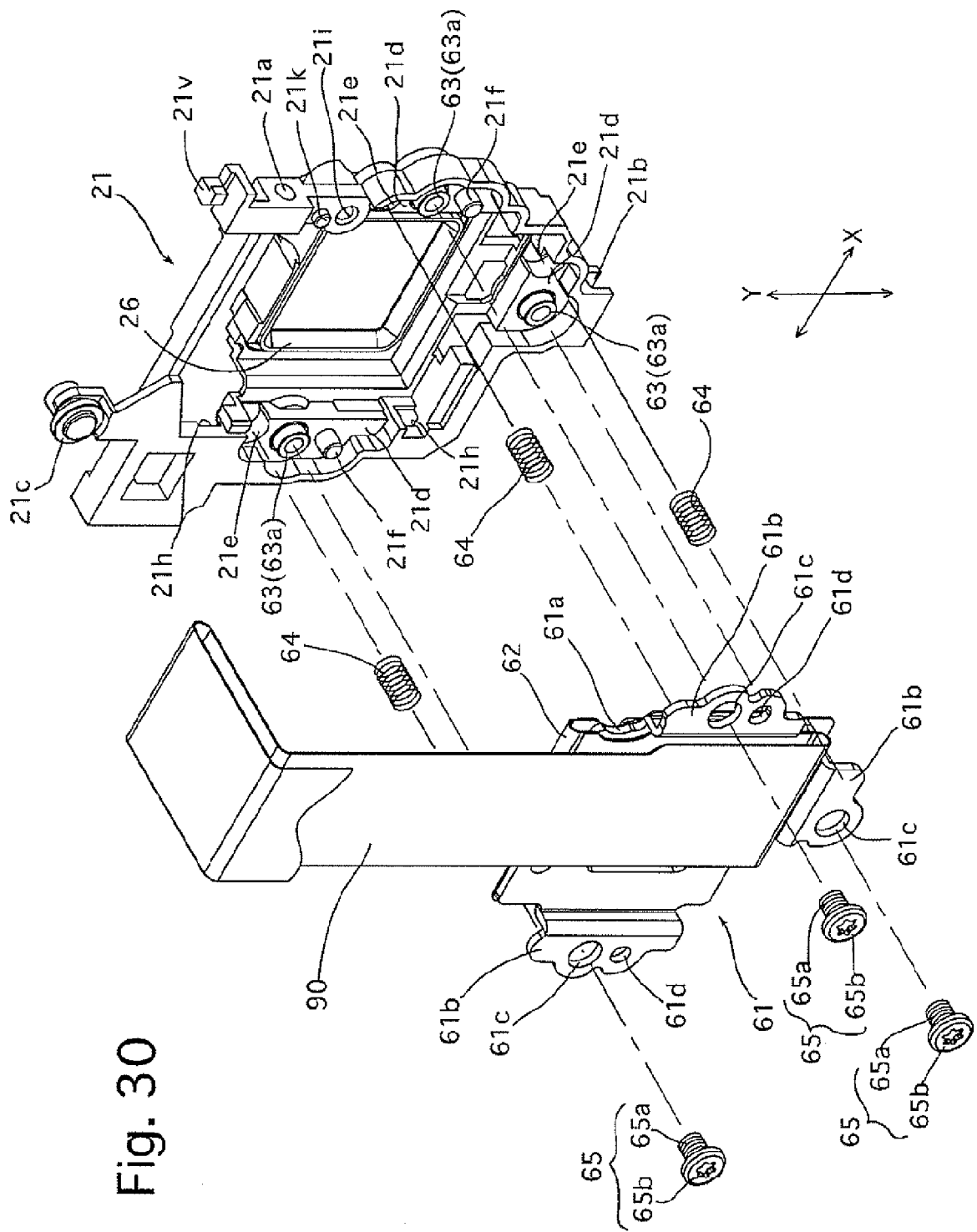
FIG. 30 is an exploded rear perspective view of the CCD unit.

FIGS. 26 through 28 show second embodiment of the image stabilizing unit IS. In the second embodiment, the elements corresponding to those in the first embodiment of the image stabilizer IS are designated with like reference numerals. The second embodiment of the image stabilizing unit is the same as the first embodiment of the image stabilizing unit except that one end (left end as viewed in FIG. 28) of the X-direction stage biasing spring 87x is hooked on the Y-direction moving stage 71, not on the stationary holder 23. More specifically, the X-direction stage biasing spring 87x is extended so as to be installed between a spring hook 71w formed on the Y-direction moving stage 71 and the spring hook 21v of the X-direction moving stage 21. The same effect as that of the first embodiment of the image stabilizing unit can be obtained in the second embodiment of the image stabilizing unit.

In each of the above illustrated embodiments, the CCD image sensor 60, the low-pass filter 25 and other associated elements are unitized and this unit (CCD unit) is driven when image shake is counteracted. The structure of this CCD unit will be discussed in detail with reference to FIGS. 29 through 40.

As shown in FIGS. 29 through 34, the low-pass filter 25 and the CCD image sensor (image pickup device) 60 are held between the X-direction moving stage 21 and a CCD retaining plate (adjustable element) 61. More specifically, the low-pass filter 25 is in contact with an inner surface of the X-direction moving stage 21 at the front opening thereof and the imaging surface of the CCD image sensor 60 is positioned behind the low-pass filter 25 with an annular sealing member 26 held between the low-pass filter 25 and the CCD image sensor 60. The sealing member 26 is made of a resilient material. The CCD image sensor 60, together with a CCD substrate 62, is fixed to a front surface of the CCD retaining plate 61. The CCD substrate 62 is extended to the back of the CCD retaining plate 61 to be connected to one end of a flexible printed wiring board (hereinafter referred to as a flexible PWB) 90 adopted for image signal transmission. Another end of the flexible PWB 90 is connected to a stationary circuit board 102a (shown in FIG. 7) on which the control circuit 102 is mounted.

The CCD retaining plate 61 is provided with a front flat portion 61a and three support lugs 61b. The front flat portion 61a is configured to support the CCD image sensor 60 and the CCD substrate 62. Two of the three support lugs 61b project horizontally in opposite directions while the remaining support lug 61b projects downwards. The X-direction moving stage 21 is provided with three recesses 21d which are shaped to allow the three support lugs 61b to be fitted therein, respectively. The three support lugs 61b are provided with three circular through-holes 61c which extend through the three support lugs 61b in a forward/rearward direction, respectively. Three nuts (insertion members) 63 are fixed to the X-direction moving stage 21 inside the three recesses 21d to face the through-holes 61c, respectively. The X-direction moving stage 21 is provided in the vicinity of the three nuts 63 with three spring accommodation recesses 21e in which three compression coil springs (biasing device) 64 are accommodated, respectively. The two side support lugs 61b of the front flat portion 61a are provided below the associated two through-holes 61c with two positioning holes 61d, respectively. The X-direction moving stage 21 is provided in two of the three recesses 21*d* with two positioning projections 21*f* which can be engaged in the two positioning holes 61*d*, respectively.

Figure 12:
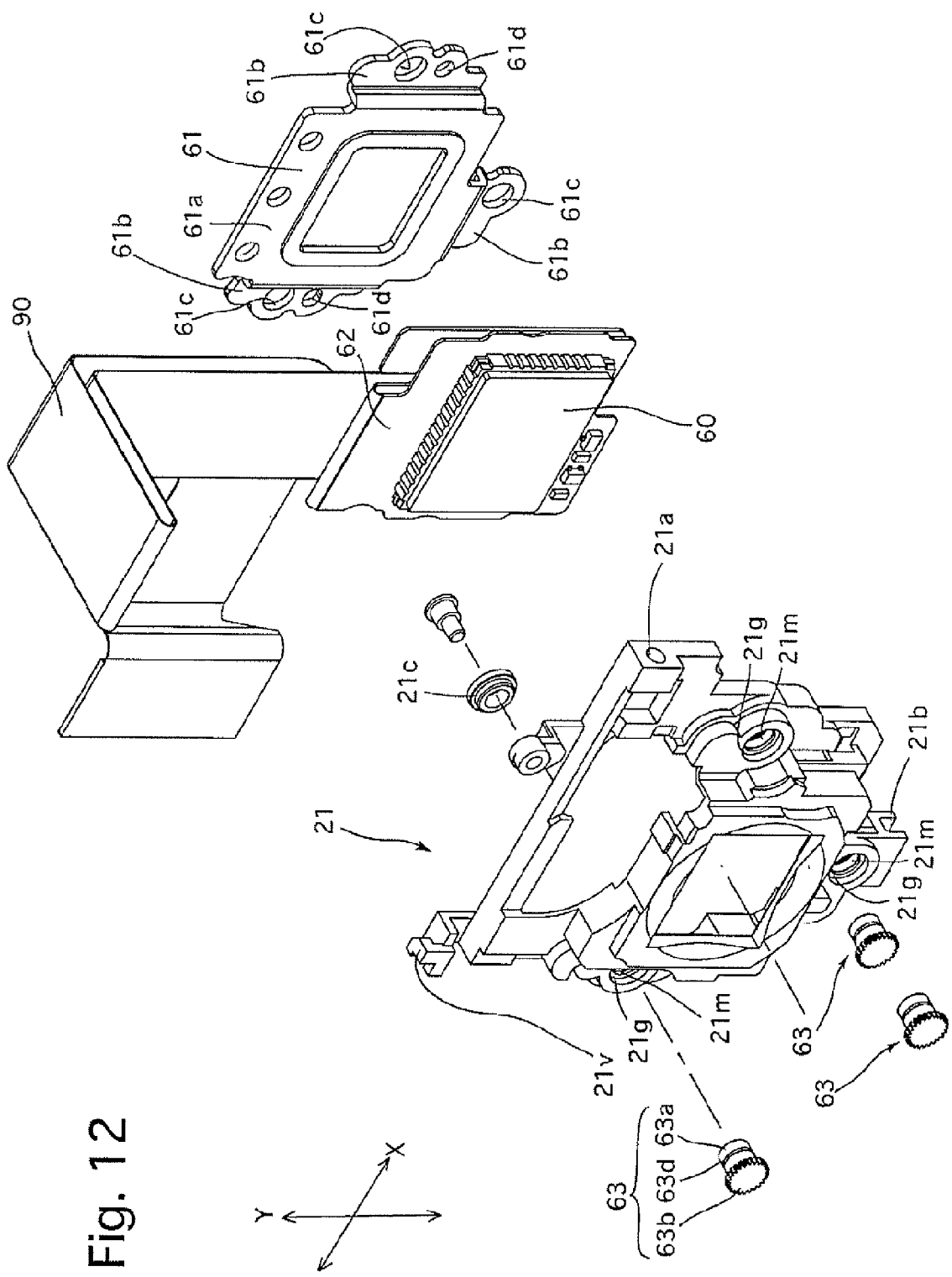
FIG. 12 is a front perspective view of a CCD unit shown in FIG. 10 that includes an X-direction moving stage.
Figure 13:
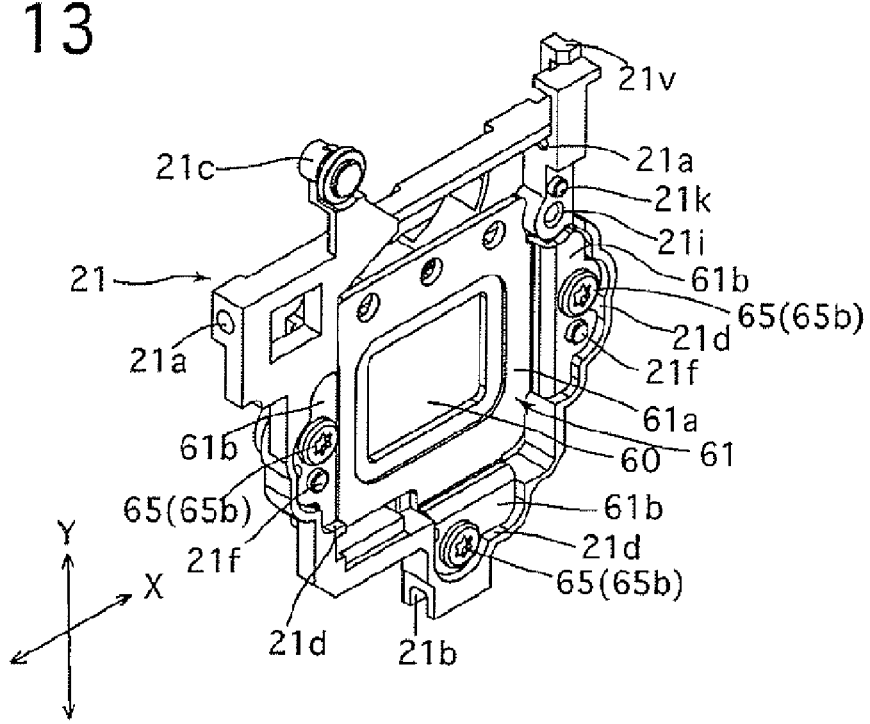
FIG. 13 is a rear perspective view of the CCD unit from which a flexible printed wiring board and a movable plate are removed.
Figure 35:
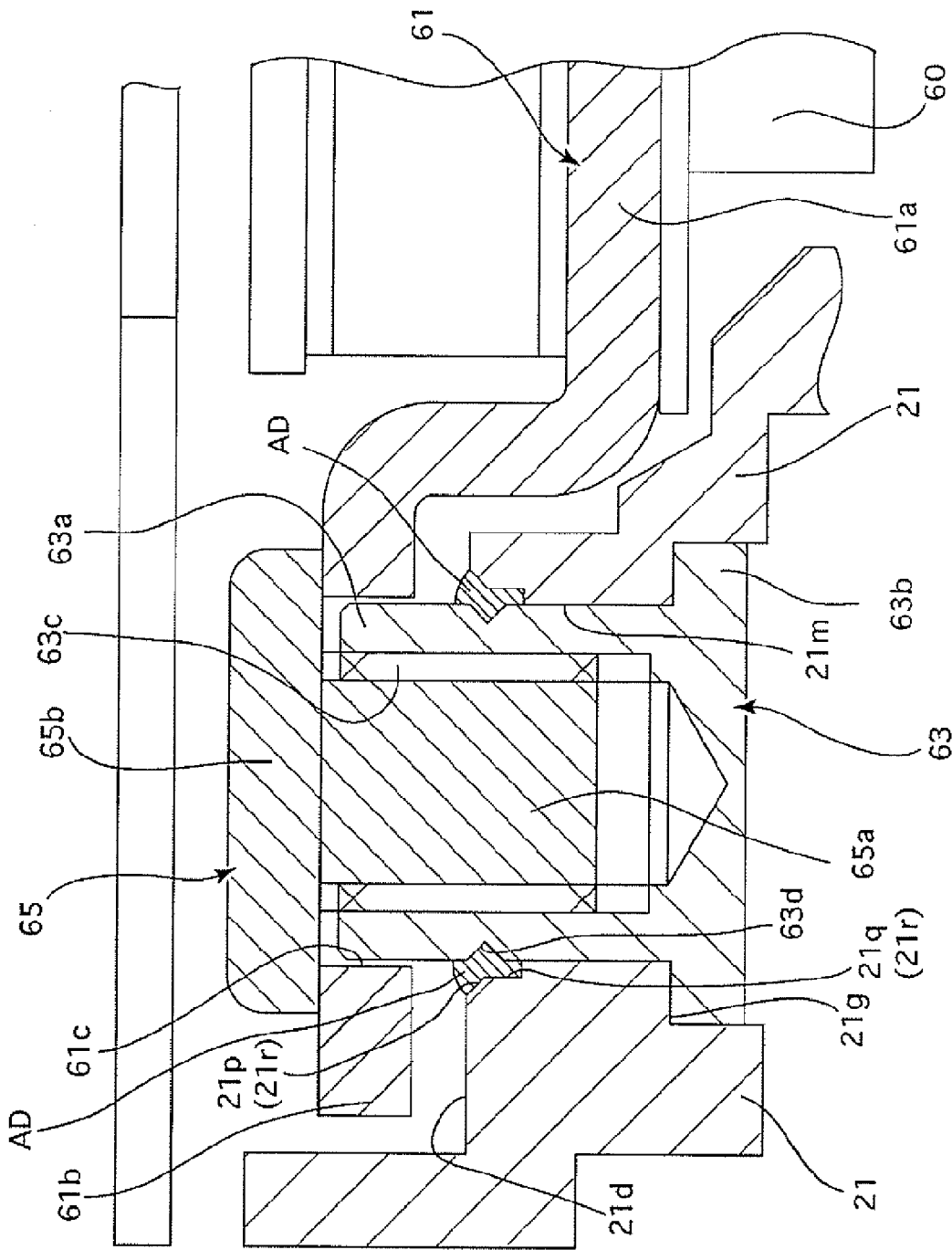
FIG. 35 is an enlarged cross sectional view of a portion of the image stabilizing unit in the vicinity of one of the two adjusting screws shown in FIG. 33.
Figure 36:
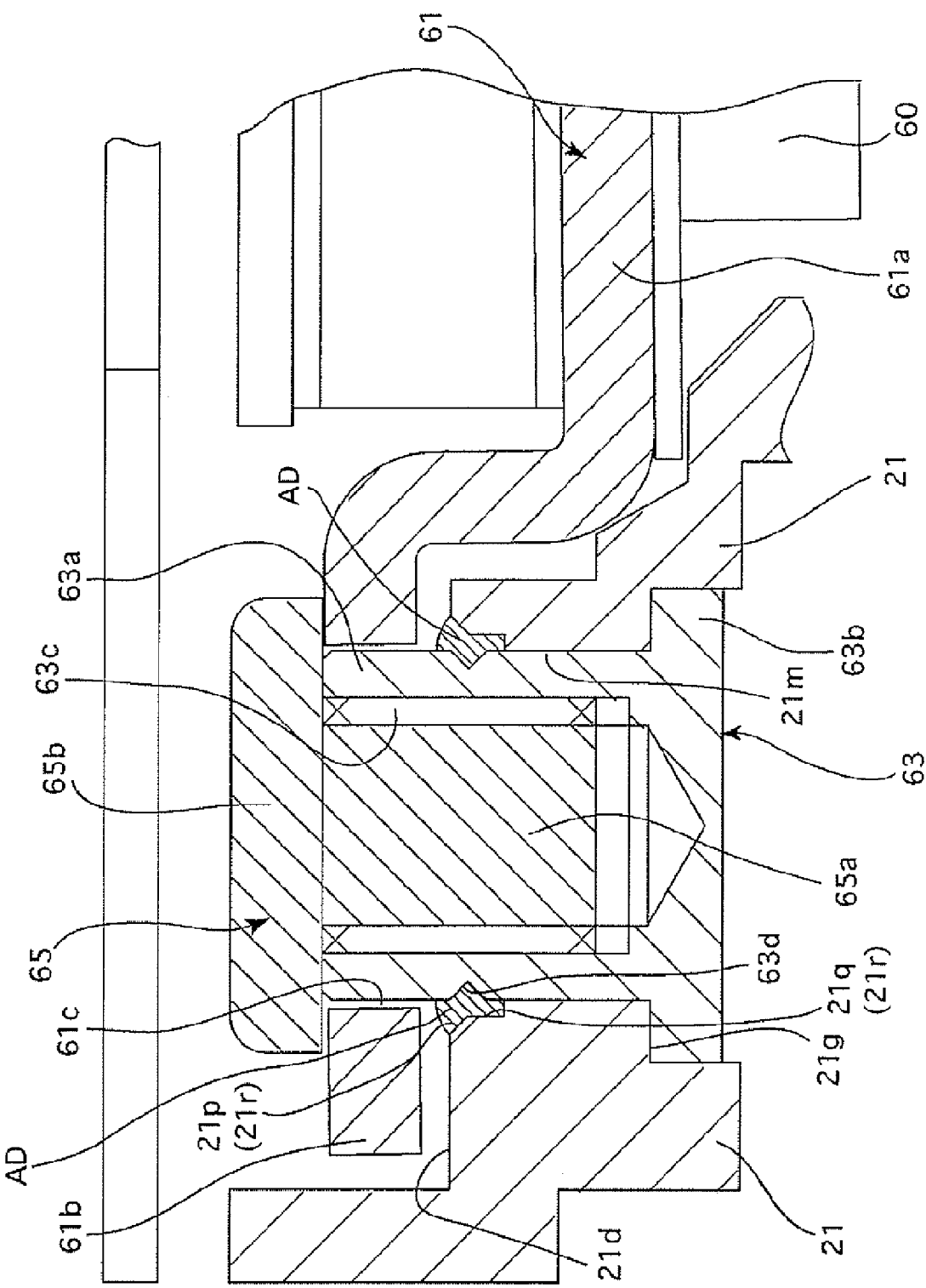
FIG. 36 is an enlarged cross sectional view of a portion of the image stabilizing unit in the vicinity of one of the two adjusting screws shown in FIG. 34.
Figure 37:
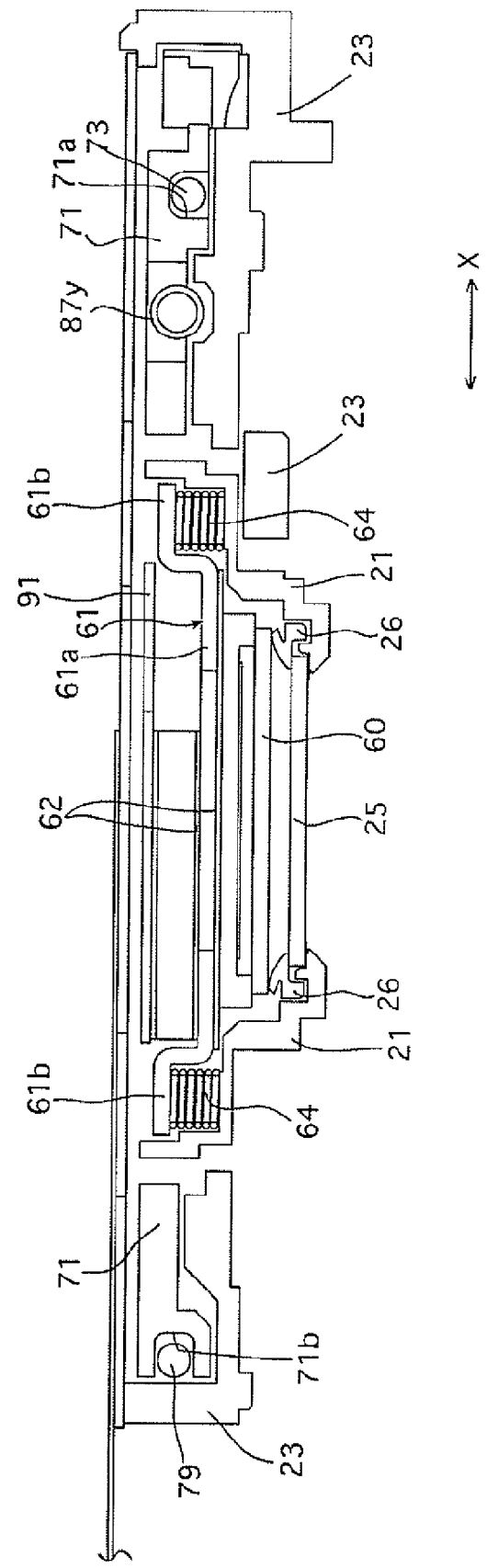
FIG. 37 is a cross sectional view of the image stabilizing unit, taken along a plane in which two compression coil springs of the CCD unit are positioned.

As shown in FIG. 12, the three nuts 63 are made of metal which is a different material from the X-direction moving stage 21. Each nut 63 is provided with a hollow cylinder portion 63*a* and is further provided at one end of the cylinder portion (cylindrical shaft portion) 63*a* with a flange portion 63*b*. The three nuts 63 are fixed to the X-direction moving stage 21 with the three flange portions 63*b* being engaged in three large-diameter holes 21*g* formed on the front of the X-direction moving stage 21, respectively. The X-direction moving stage 21 is provided with three through-holes (small-diameter holes) 21*m* which extend rearward (upward as viewed in FIG. 35) from the three large-diameter holes 21*g* to be communicatively connected to the three large-diameter holes 21*g*, respectively. The cylinder portions 63*a* of the three nuts 63 are inserted into the three large-diameter holes 21*g* and the through-holes 21*m* from the front of the X-direction moving stage 21 so that the ends of the cylinder portions 63*a* project rearward in the optical axis direction from the bottom surfaces (reference surfaces for the through-holes 21*m*) of the three recesses 21*d*, respectively. As shown in FIGS. 35 and 36, the outer diameter of the cylinder portion 63*a* of each nut 63 is predetermined to be slightly smaller than the inner diameter (opening diameter) of the associated through-hole 61*c* of the CCD retaining plate 61. Each nut 63 is provided along the axis of the cylindrical portion 63*a* thereof with a female screw hole 63*c* so that three CCD adjustment screws 65 are screwed into the three female screw holes 63*c* from the ends thereof (from the rear ends thereof in the optical axis direction) respectively. Each CCD adjustment screw 65 is provided with a shaft portion (screw shaft portion) 65*a* including a male thread portion thereon which is screw-engaged with the associated female screw hole 63*c*, and a head portion 65*b* which is greater in diameter than the shaft portion 65*a*. Unlike the cylinder portion 63*a*, the outer diameter of the head portion 65*b* is predetermined to be greater than the inner diameter (opening diameter) of the associated through-hole 61*c*.

When the CCD unit is assembled, the CCD retaining plate 61 and the X-direction moving stage 21 are brought to approach each other so that the three support lugs 61*b* enter the corresponding three recesses 21*d*, respectively, with the three compression coil springs 64 inserted into the three spring accommodation recesses 21*e* in a compressed state, respectively. Thereupon, the two positioning projections 21*f* engage in the two positioning holes 61*d*, respectively, which determines the relative position between the X-direction moving stage 21 and the CCD image sensor 60. Additionally, bringing the CCD retaining plate 61 and the X-direction moving stage 21 closer to each other to some extent causes the ends of the hollow cylinder portions 63*a* of the three nuts 63 to enter the three circular through-holes 61*c*, respectively, since the outer diameter of the cylinder portion 63*a* of each nut 63 is smaller than the inner diameter (opening diameter) of the associated through-hole 61*c* as mentioned above.

Subsequently, the shaft portions 65*a* of the three CCD adjustment screws 65 are screwed into the female screw holes 63*c* of the three nuts 63, respectively. Bringing the X-direction moving stage 21 and the CCD retaining plate 61 closer to each other causes the compressed coil springs 64, which are inserted in the three recesses 21*d*, to be compressed between the X-direction moving stage 21 and the three support lugs 61*b*. Due to the resilient force of the compressed coil springs 64 thus compressed, the CCD retaining plate 61 is biased in a direction away from the X-direction moving stage 21 (rearwards in the optical axis direction) (see FIG. 37). However, the back surfaces of the head portions 65*b* of the three CCD adjustment screws 65 prevent the CCD retaining plate 61 from moving rearward, thus defining the position of the CCD retaining plate 61 in the optical axis direction. Accordingly, the X-direction moving stage 21 and the CCD retaining plate 61 are joined together with the CCD image sensor 60 and the low-pass filter 25 held therebetween.

Figure 31:
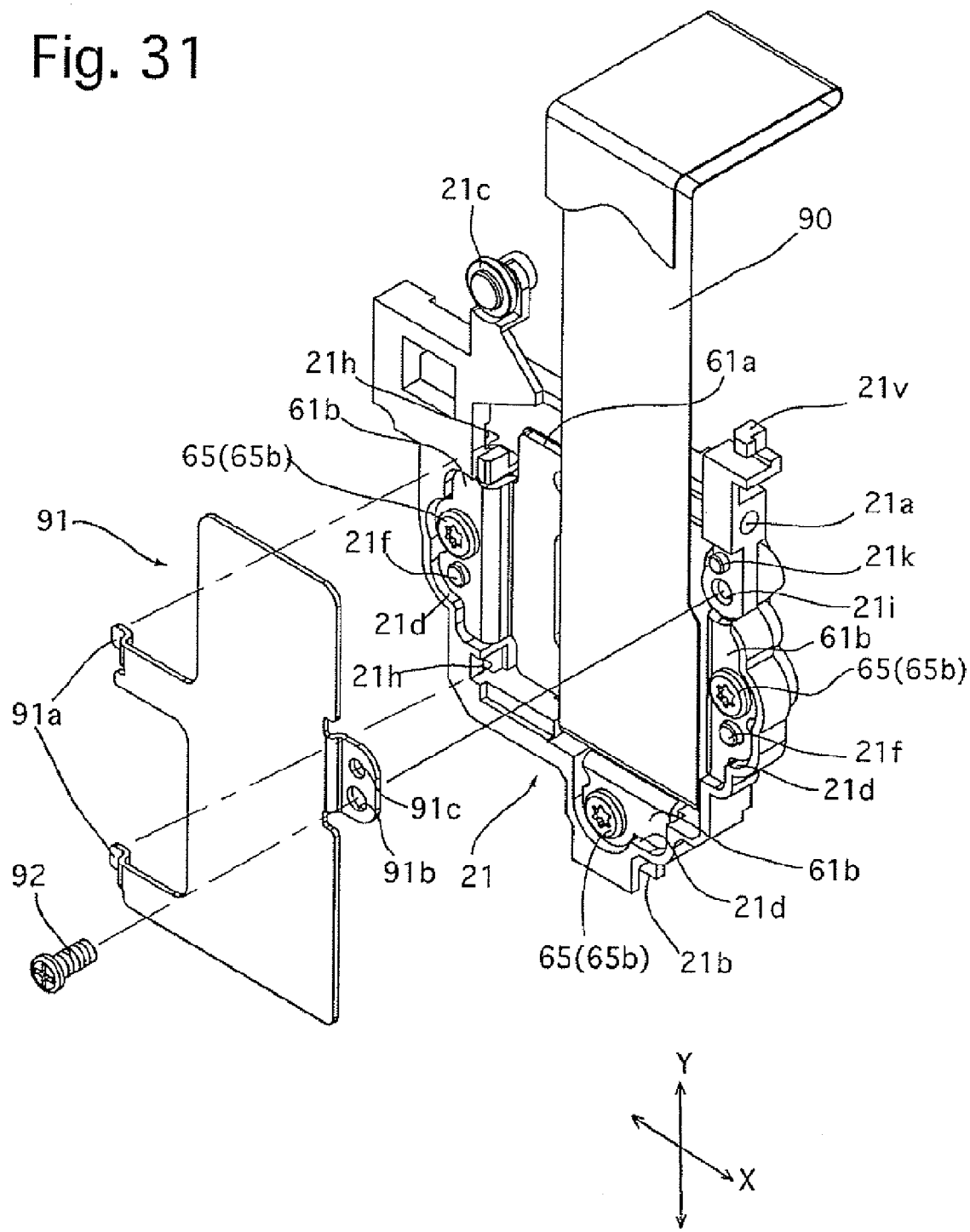
FIG. 31 is an exploded rear perspective view of the CCD unit, showing a state where the CCD retaining plate is fixed to the X-direction moving stage.
Figure 32:
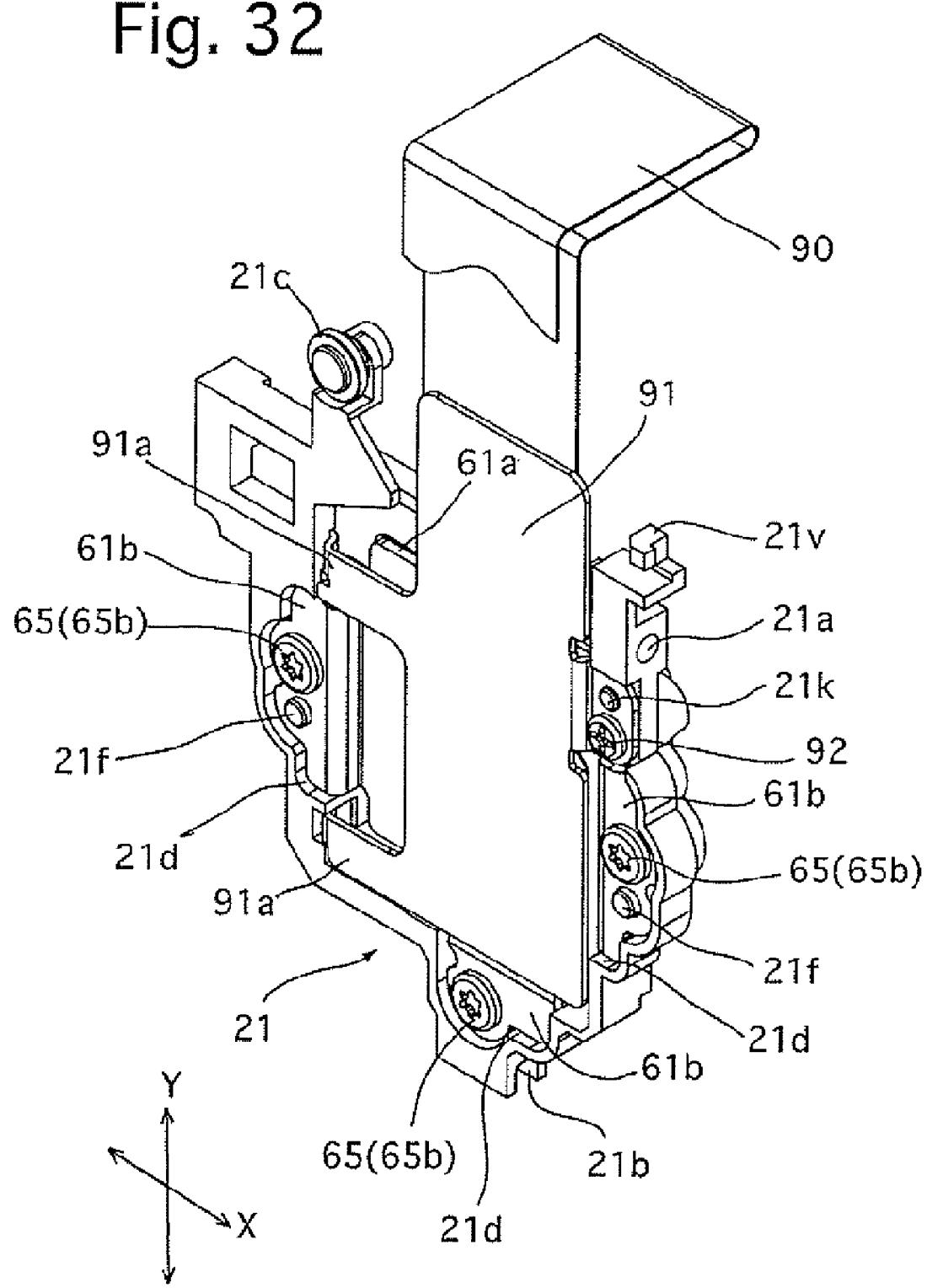
FIG. 32 is a rear perspective view of the CCD unit in an assembled state thereof.

A movable plate 91 is fixed to the back of the X-direction moving stage 21 after the X-direction moving stage 21 and the CCD retaining plate 61 are joined together (see FIGS. 31 and 32). The X-direction moving stage 21 is provided with a pair of engaging holes 21*h*, a screw hole 21*i* and a positioning projection 21*k*. The movable plate 91 is provided with a pair of locking lugs 91*a*, a through-hole 91*b* and a positioning hole 91*c* which are engaged in the pair of engaging holes 21*h*, the screw hole 21*i* and the positioning projection 21*k* of the X-direction moving stage 21, respectively. The movable plate 91 is secured to the X-direction moving stage 21 by a set screw 92 which is screwed into the screw hole 21*i* of the X-direction moving stage 21 in a state where the ends of the pair of locking lugs 91*a* have been engaged in the pair of engaging holes 21*h* and where the positioning projection 21*k* has been engaged in the positioning hole 91*c* (see FIG. 32). The movable plate 91 can stably support the flexible PWB 90. The CCD unit is completed by fixing the movable plate 91 to the back of the X-direction moving stage 21 in this manner.

In this completed CCD unit, the three CCD adjustment screws 65 are arranged dispersively at three different points about the center of the imaging surface of the CCD image sensor 60, and accordingly, the angle (inclination angle/setting angle) of the CCD retaining plate 61 relative to the photographing optical axis Z1, i.e., the angle (inclination angle/setting angle) of the imaging surface of the CCD image sensor 60 relative to the photographing optical axis Z1 can be adjusted by adjusting the tightening amount of each CCD adjustment screw 65. For instance, if the tightening amount of one CCD adjustment screw 65 is increased, the associated head portion 65*b* that defines the position of the CCD retaining plate 61 in the optical axis direction moves forward in the optical axis direction. This forward movement of the head portion 65*b* causes the associated support lug 61*b* which is in contact with the one CCD adjustment screw 65 to be pushed forward. Conversely, if the tightening amount of one CCD adjustment screw 65 is decreased, the associated head portion 65*b* moves rearward in the optical axis direction. This rearward movement of the head portion 65*b* causes the associated support lug 61*b*, which is in contact with one CCD adjustment screw 65, to be pushed rearward by the biasing force of the associated compression coil springs 64. The inclination angle of the CCD image sensor 60 relative to the photographing optical axis Z1 can be adjusted by changing the balance among the tightening amounts of the three CCD adjustment screws 65. As shown in FIG. 32, the head portions 65*b* of the three CCD adjustment screws 65 are exposed to the rear of the movable plate 91 (i.e., exposed at the back of the CCD unit) in a state where the movable plate 91 is mounted, and accordingly, the above described inclination angle adjustment operation for adjusting the angle of the CCD image sensor 60 relative to the photographing optical axis Z1 can be carried out without dismounting the movable plate 91.

Figure 33:
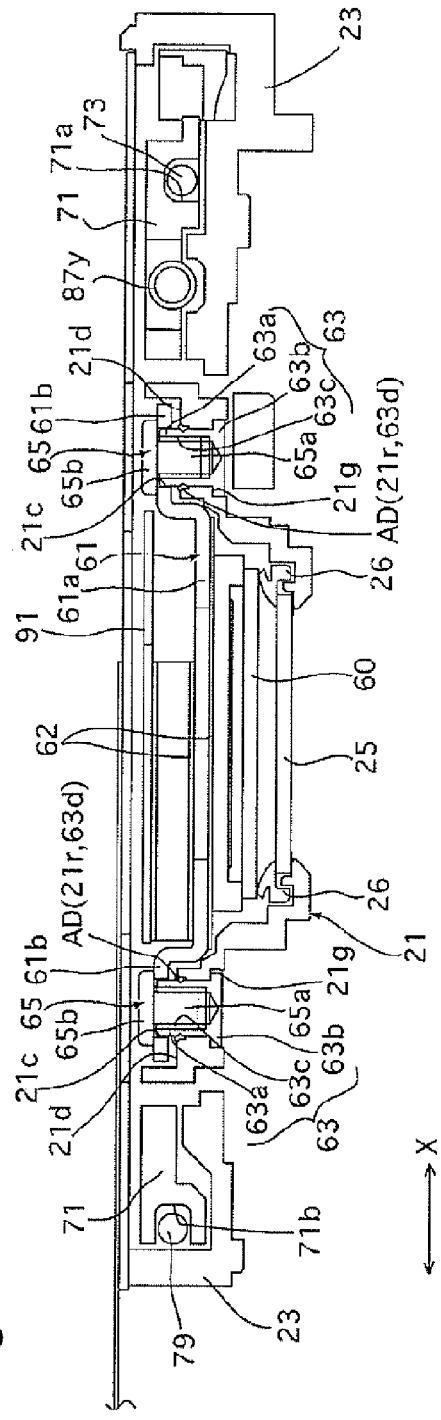
FIG. 33 is a cross sectional view of the image stabilizing unit in a state before an inclination angle adjustment is made to the CCD image sensor.
Figure 34:
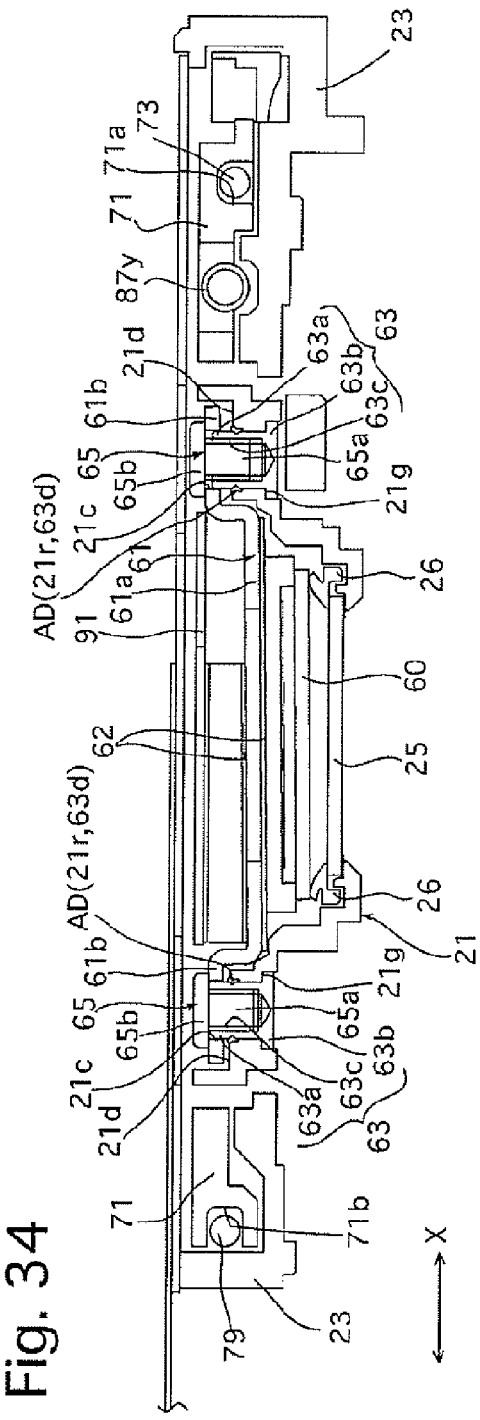
FIG. 34 is a cross sectional view of the image stabilizing unit in a state after the inclination angle adjustment has been made to the CCD image sensor.

FIGS. 33 and 34 are cross sectional views of the image stabilizing unit IS, respectively, showing two different states before and after making adjustments to specific two of the three CCD adjustment screws 65 which are positioned on the horizontally opposite sides of the front flat portion 61*a*. In the state shown in FIG. 33, the tightening amounts of these two CCD adjustment screws 65 (the right and left CCD adjustment screws 65) are substantially identical and are not tightened to the maximum tightening position (to the limit tightening position) relative to the female screw holes 63c of the associated two nuts 63. FIG. 35 is an enlarged view of one of the right and left CCD adjustment screws 65 (the left CCD adjustment screw 65 as viewed in FIG. 34) and adjacent elements thereof in the state shown in FIG. 33. As can be seen from FIG. 35, the associated support lug 61b abuts against the back surface of the head portion 65b of the CCD adjustment screw 65 by the biasing force of the associated compression coil spring 64; however, there is room for the head portion 65b and the support lug 61b to be moved forward (downwards as viewed in FIG. 35) by further tightening the CCD adjustment screw 65 since there is still a space between the end of the cylinder portion 63a and the head portion 65b.

FIG. 34 illustrates a state in which the left CCD adjustment screw 65 has been tightened to the maximum (the maximum tightening position). As can be seen in the enlarged view of the left CCD adjustment screw 65 and adjacent elements thereof in FIG. 36, the support lug 61b, which is in contact with the left CCD adjustment screw 65, has been pushed forward from the position shown in FIG. 35 against the biasing force of the compression coil spring 64 to thereby cause the CCD retaining plate 61 and the CCD image sensor 60 to tilt relative to the X-direction moving stage 21 (relative to the optical axis direction). In this state, the X-direction moving stage 21 is not tilted by the tilting of the CCD image sensor 60; however the resilient sealing member 26, which is held between the low-pass filter 25 and the CCD image sensor 60, is resiliently deformed by the tilting of the CCD image sensor 60 (see FIG. 34).

As shown in FIG. 36, each CCD adjustment screw 65 can be tightened up until the head portion 65b comes into contact with the end of the cylinder portion 63a of the associated nut 63 because the cylinder portions 63a of the three nuts 63 are inserted in the three circular through-holes 61c, respectively. In this state, the support lug 61b is not attached between the head portion 65b of the associated CCD adjustment screw 65 and the bottom of the associated recess 21d of the X-direction moving stage 21, but rather is held without making contact with the bottom of the recess 21d. Since the support lug 61b is not directly sandwiched between the head portion 65b of the associated CCD adjustment screw 65 and the bottom of the associated recess 21d, the CCD retaining plate 61 is not prevented from tilting even if the CCD adjustment screw 65 is tightened to the maximum (the maximum tightening position) when the tightening amount of either of the remaining two CCD adjustment screws 65 is changed. Accordingly, the substantially entire range of axial movement of the shaft portion 65a of each CCD adjustment screw 65 relative to the associated nut 63 (the female screw hole 63c thereof) can be used for making an adjustment (inclination angle adjustment) to the angle of the CCD retaining plate 61.

Figure 38:
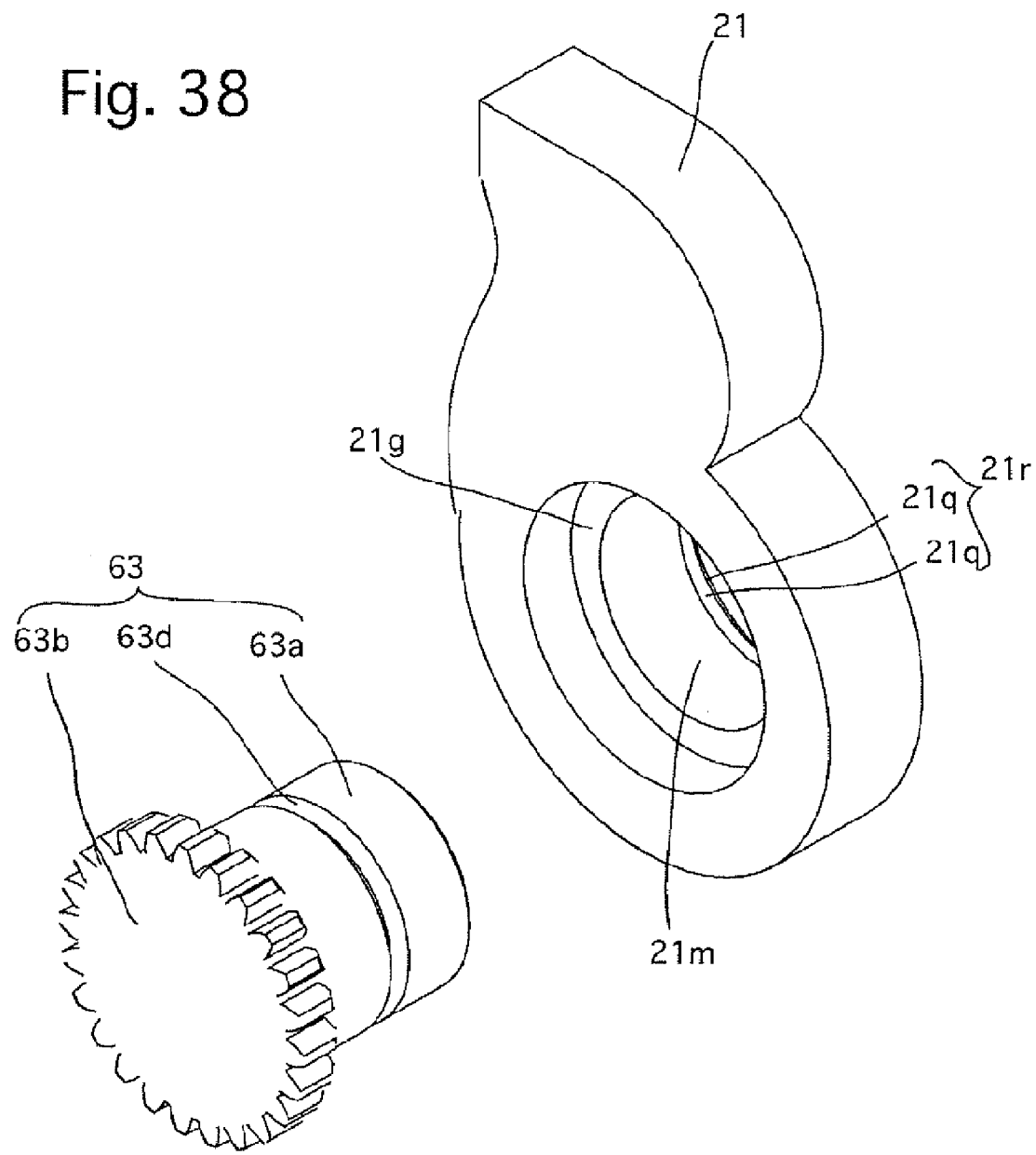
FIG. 38 is an enlarged front exploded perspective view of a portion of the X-direction moving stage (serving as a support member) that includes a through-hole and a nut (serving as an insertion member) that is inserted into the through-hole.

The through-holes (support holes) 21m that are made in the X-direction moving stage (support member) 21 are circular holes, and the hollow cylinder portions (screw bearing seats) 63a of the three nuts 63 that are inserted into the through-holes 21m have cylindrical outer peripheral surfaces, respectively (see FIG. 38). As shown in FIGS. 35, 36, 39 and 40, the X-direction moving stage 21 is provided, at the ends of the three through-holes 21m on the three recesses 21d side, with three outer adhesive-pouring recesses 21r. Each outer adhesive-pouring recess 21r includes a chamfer 21p in the shape of a countersunk hole and an annular recess 21q which is formed immediately in front of the chamfer 21p to be communicatively connected with the chamfer 21p. Each chamfer 21p is shaped like a truncated cone which is tapered in the direction toward the inside of the associated through-hole 21m (downwards as viewed in FIG. 35) from the rear end opening (the bottom of the associated recess 21d) of the associated through-hole 21m. The annular recesses 21q of the three outer adhesive-pouring recesses 21r are constant-diameter recesses that have a constant inner diameter. The three outer adhesive-pouring recesses 21r, which consist of the three chamfers 21p and the three annular recesses 21q, are formed in annular recesses centering on the axes of the three through-holes 21m, respectively. On the other hand, the hollow cylinder portions 63a of the three nuts 63 are provided, on portions of the outer peripheral surfaces of the hollow cylinder portions 63a which face the three outer adhesive-pouring recesses 21r, with three inner adhesive-pouring recesses 63d, respectively. The inner adhesive-pouring recess 63d of each nut 63 is an annular groove centering on the axis of the hollow cylinder portion 63a of the nut 63, and has an uniform V-shape in cross section.

Figure 39:
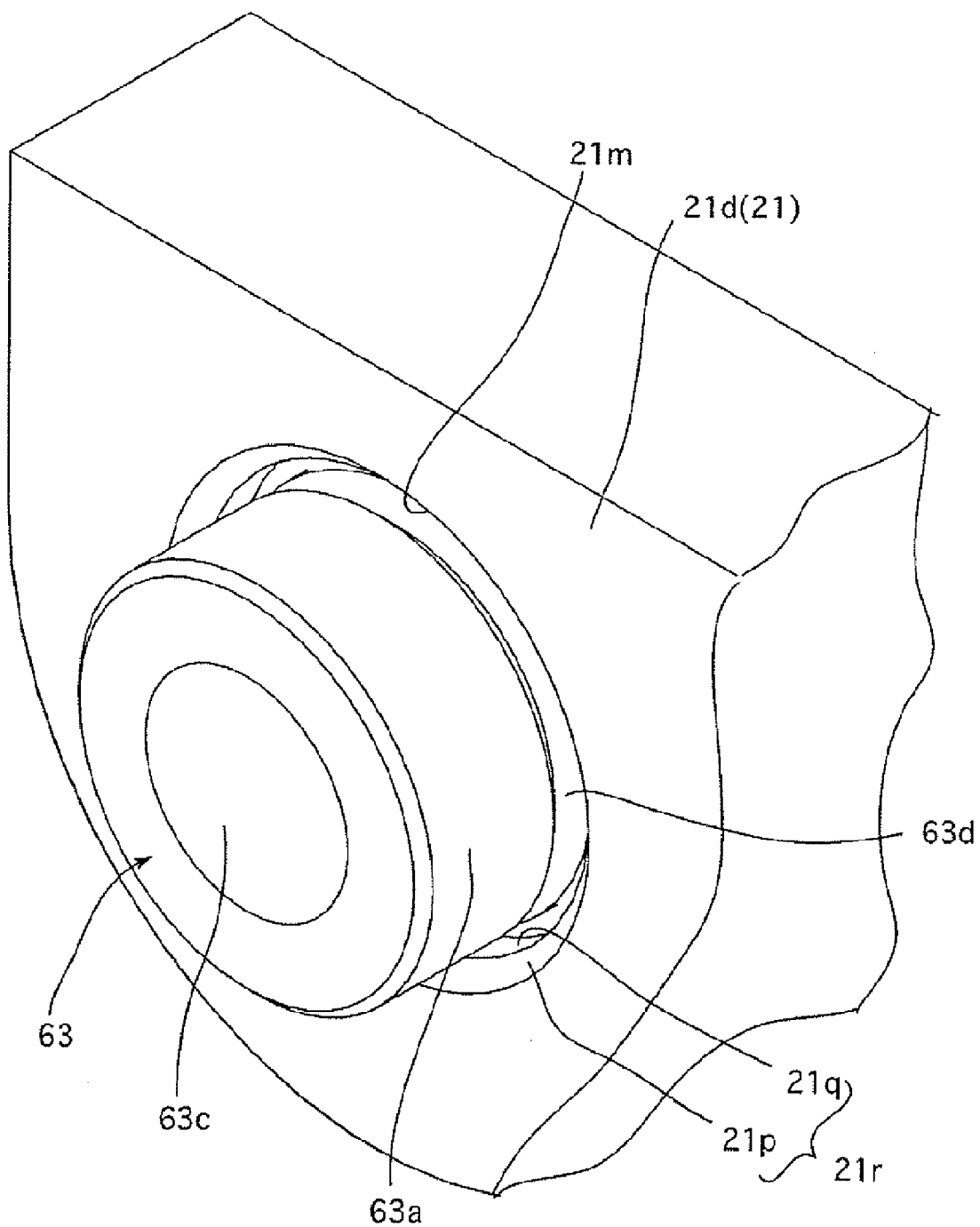
FIG. 39 is an enlarged rear perspective view of a portion of the X-direction moving stage and the nut shown in FIG. 39, showing a state where the hollow cylinder portion of the nut partly projects rearward from the through-hole of the X-direction moving stage.
Figure 40:
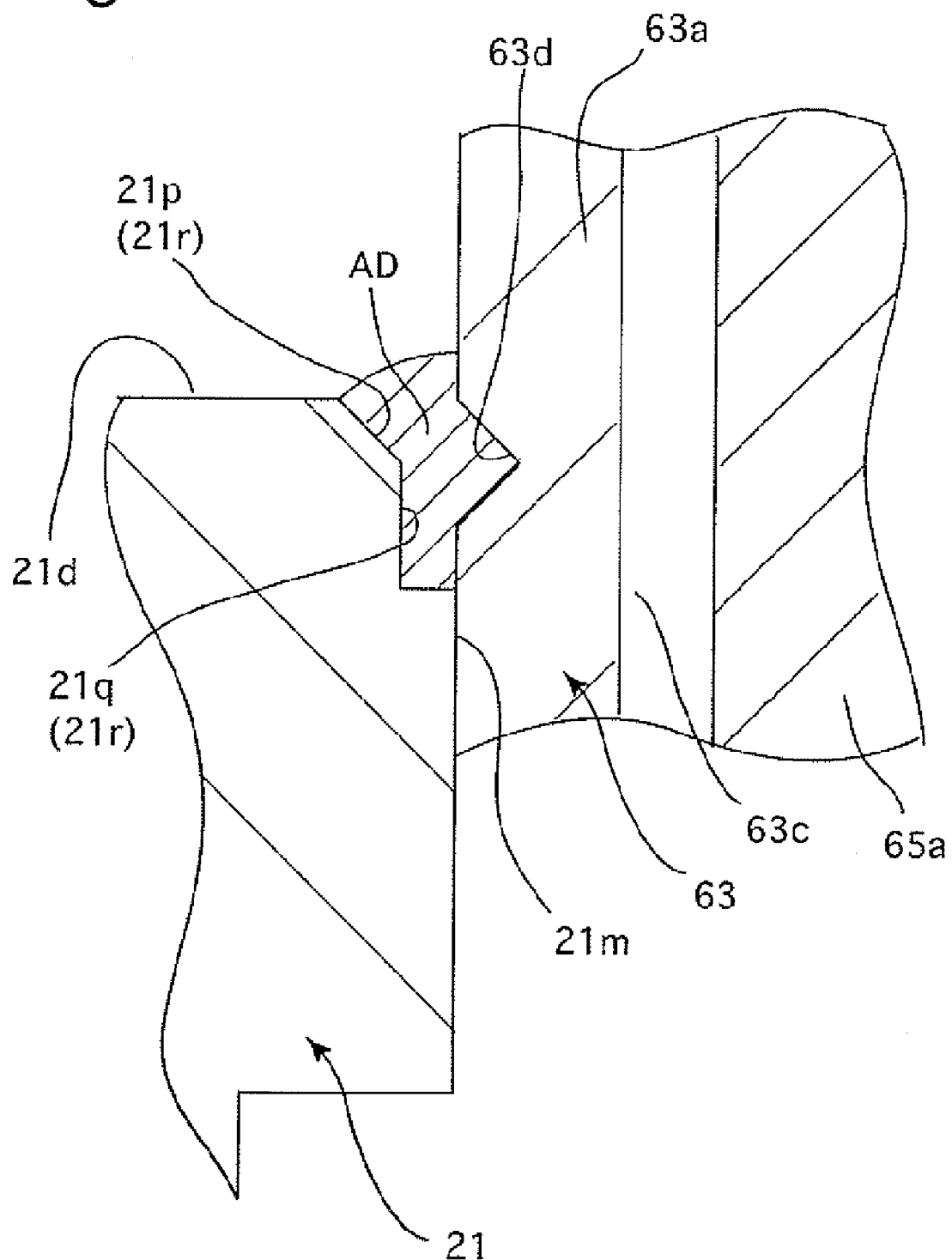
FIG. 40 is an enlarged cross sectional view of mutually fixed portions of the X-direction moving stage and one of the three nuts in the vicinity of adhesive-pouring recesses of the X-direction moving stage and the nut that are shown in FIGS. 35 and 36.

When the three nuts 63 are fixed to the X-direction moving stage 21, the hollow cylinder portions 63a are inserted into the through-holes 21m from the three large-diameter holes 21g, respectively. A further insertion of each nut into the associated through-hole 21m is prevented by the engagement of the flange portion 63b of the nut 63 with the bottom of the associated large-diameter hole 21g. In this state, the inner adhesive-pouring recess 63d is positioned further forward than the bottom of the recess 21d in the forward direction (vertical direction as viewed in FIG. 35) so as to face the outer adhesive-pouring recess 21r so that the inner adhesive-pouring recess 63d and the outer adhesive-pouring recess 21r serve as an annular adhesive-pouring recess as shown in FIGS. 39 and 40. Thereupon, an adhesive AD is poured into an annular groove (recess) formed between the outer adhesive-pouring recess 21r and the inner adhesive-pouring recess 63d to spread into the inner adhesive-pouring recess 63d and the outer adhesive-pouring recess 21r. Since the adhesive AD is poured from the chamfer 21p side that has a large diameter, the adhesive AD does not easily overflow to the perimeter of the outer adhesive-pouring recess 21r, which results in an improvement in workability of the nut fixing operation. If the adhesive AD used is a low-viscosity adhesive, it is possible for the adhesive AD to be spread into the outer adhesive-pouring recess 21r and the inner adhesive-pouring recess 63d easily with the aid of the capillary phenomenon thereof, which results in a further improvement in workability of the nut fixing operation. Upon the poured adhesive AD solidifying (curing), the hollow cylinder portion 63a of each nut 63 is prevented from moving in the axial direction thereof relative to the associated through-hole 21m, and accordingly, the nut 63 is prevented from coming off the X-direction moving stage 21. Specifically, the solidified adhesive AD prevents the nut 63 from coming off the X-direction moving stage 21 downwards as viewed in FIGS. 35 and 36.

Figure 41:
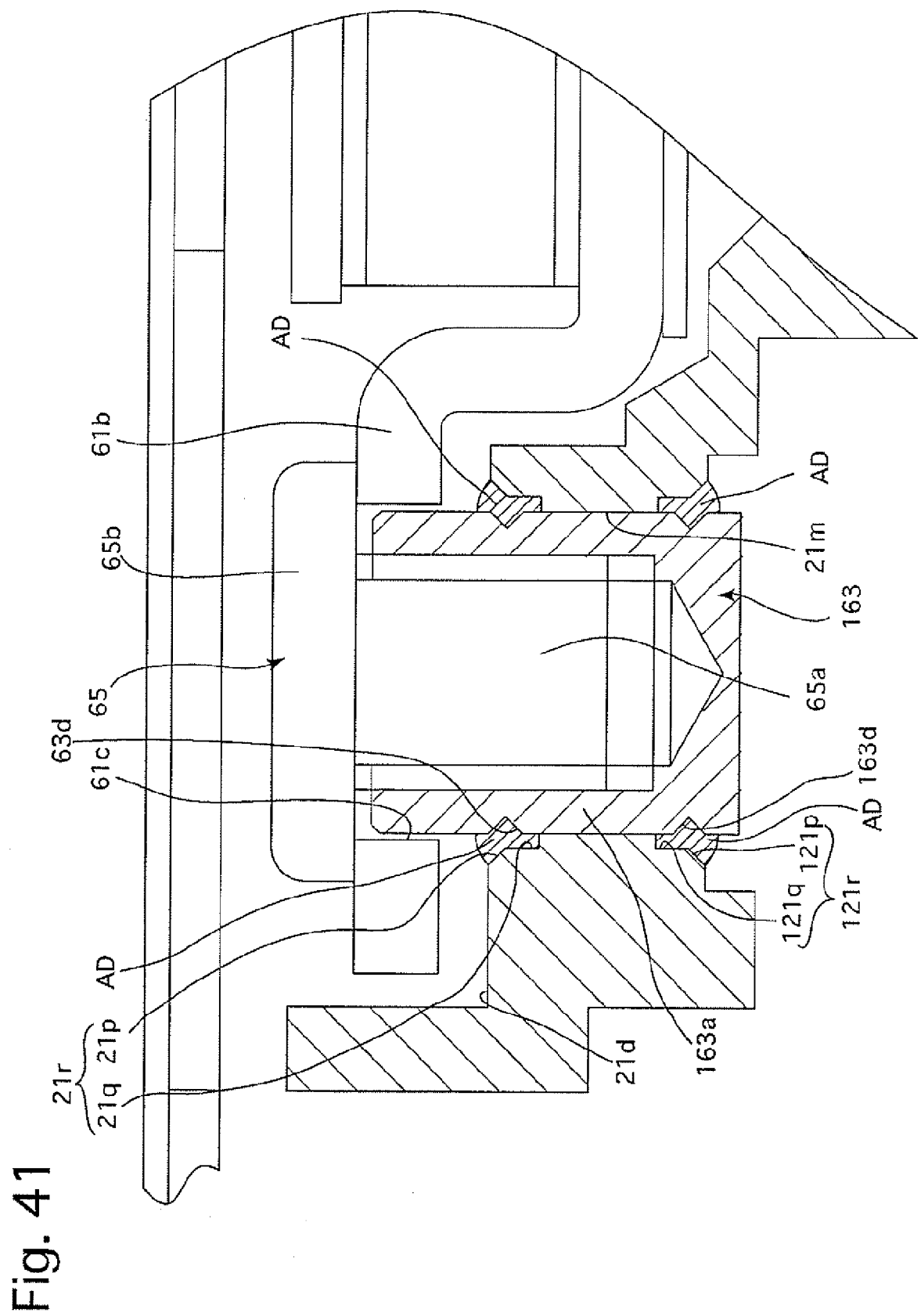
FIG. 41 is a view similar to that of FIG. 35, showing a second embodiment of the insertion member fixing structure according to the present invention.

FIG. 41 shows a second embodiment of the insertion member fixing structure according to the present invention. This embodiment is identical to the first embodiment of the insertion member fixing structure except that each of three nuts 163 which correspond to the three nuts 63 in the first embodiment of the insertion member fixing structure does not have a position limit portion corresponding to the flange portion 63b of each nut 63 in the first embodiment of the insertion member fixing structure and uses the adhesive AD as a retainer instead of the flange portion 63b in the second embodiment of the insertion member fixing structure. Specifically, the X-direction moving stage 21 in the second embodiment of the insertion member fixing structure is provided, at the ends of the three through-holes 21m on the opposite side of the X-direction moving stage 21 from the three recesses 21d, with three outer adhesive-pouring recesses 121r, respectively. Each outer adhesive-pouring recess 121r includes a chamfer 121p in the shape of a countersunk hole and an annular recess 121q which is formed immediately behind the chamfer 121p to be communicatively connected to the chamfer 121p. The three outer adhesive-pouring recesses 121r are formed as three annular recesses centering on the axes of the three through-holes 21m, respectively, so that the three outer adhesive-pouring recesses 121r and the three outer adhesive-pouring recesses 21r, which are formed at the other ends (upper ends as viewed in FIG. 41) of the three through-holes 21m, are symmetrical. On the other hand, hollow cylinder portions (shaft portions) 163a of the three nuts 163 are provided, on portions of the outer peripheral surfaces of the hollow cylinder portions 163a which face the three outer adhesive-pouring recesses 121r, with three inner adhesive-pouring recesses (outer peripheral grooves) 163d in addition to the three inner adhesive-pouring recesses 63d, respectively. Similar to each inner adhesive-pouring recess 63d, each inner adhesive-pouring recess 163d is an annular groove centering on the axis of the hollow cylinder portion 163a thereof, and has a uniform V-shape in cross section. Accordingly, the X-direction moving stage 21 is provided, at two separate positions in the axial direction of the hollow cylinder portion 163a, with two adhesive-pouring recesses (the outer adhesive-pouring recess 21r and the outer adhesive-pouring recess 121r), respectively, while the hollow cylinder portion 163a of each nut 163 is provided, at corresponding two separate positions in the axial direction of the hollow cylinder portion 163a, with two adhesive-pouring recesses (the inner adhesive-pouring recess 63d and the inner adhesive-pouring recess 163d), respectively.

When the three nuts 163 are fixed to the X-direction moving stage 21, firstly the hollow cylinder portions 163a of the three nuts 163 are inserted into the three through-holes 21m, respectively. At this time, the insertion position of each nut 163 with respect to the associated through-hole 21m in the insertion direction of the hollow cylinder portions 163a is determined by a given jig (not shown) so that the inner adhesive-pouring recess 63d and the inner adhesive-pouring recess 163d face the outer adhesive-pouring recess 21r and the outer adhesive-pouring recess 121r, respectively. Subsequently, the adhesive AD is poured into an annular groove (recess) formed between the outer adhesive-pouring recess 21r and the inner adhesive-pouring recess 63d to spread into the inner adhesive-pouring recess 63d and the outer adhesive-pouring recess 21r, and the adhesive AD is poured into an annular groove (recess) formed between the outer adhesive-pouring recess 121r and the inner adhesive-pouring recess 163d to spread into the inner adhesive-pouring recess 163d and the outer adhesive-pouring recess 121r. Upon the poured adhesive AD in each of these two annular grooves solidifying (curing), the hollow cylinder portion 163a of each nut 63 is prevented from moving in the axial direction thereof relative to the associated through-hole 21m, and accordingly, the nut 163 is prevented from coming off the X-direction moving stage 21.

According to each of the above illustrated first and second embodiments of the insertion member fixing structures, the three nuts 63 (or 163) can be prevented from coming out of the three through-holes 21m, respectively, by a compact and inexpensive fixing structure.

FIGS. 42 through 46 show first through fifth comparative examples which are to be compared with the above described first and second embodiments of the insertion member fixing structures.

Figure 42:
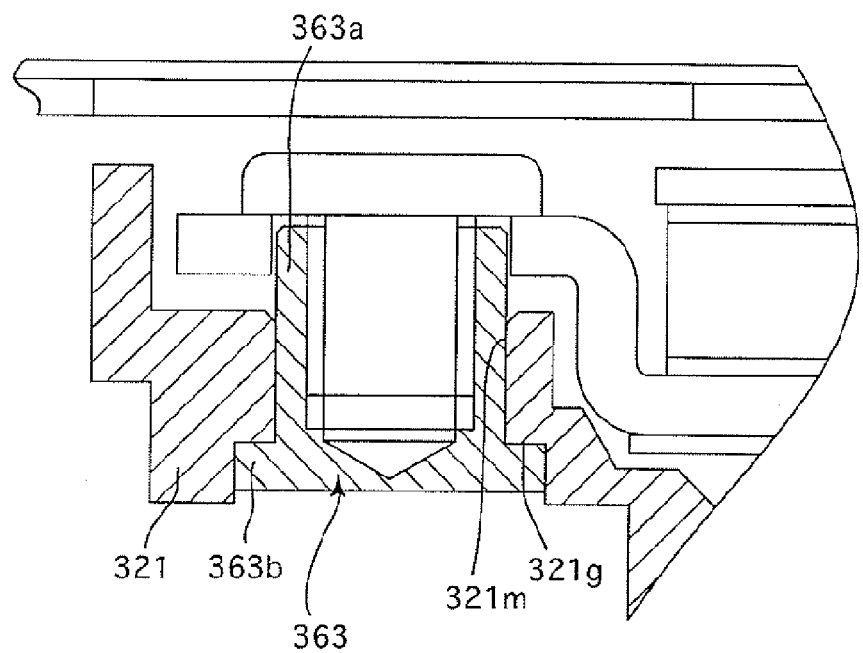
FIG. 42 is a view similar to that of FIGS. 35 and 41, showing a first comparative example which is to be compared with the first and second embodiments of the insertion member fixing structures.

FIG. 42 shows a first comparative example in which hollow cylinder portions (shaft portions) 363a of three nuts 363 (which correspond to the three nuts 63 or 163 in the first and second embodiments of the insertion member fixing structures; only one nut 363 is shown in FIG. 42) are press-fitted into three through-holes 321m (which correspond to the three through-holes 21m in the first and second embodiments of the insertion member fixing structures; only one through-hole 321m is shown in FIG. 42) which are formed in a support member 321 (which corresponds to the X-direction moving stage 21 in each of the first and second embodiments of the insertion member fixing structures), respectively. The insertion position (retaining position) of each nut 363 with respect to each associated through-hole 321m in the insertion direction of the hollow cylinder portions 363a in the nut inserting direction (upward as viewed in FIG. 42) is determined by the engagement of a flange portion 363b of the nut 363 with an associated large-diameter holes 321g of the support member 321, and each nut 363 is prevented from coming out of the associated through-hole 321m in the direction opposite to the nut inserting direction due to the tight-fit engagement between the hollow cylinder portion 363a of the nut 363 and the associated through-hole 321m. This first comparative example shown in FIG. 42 has the drawback of requiring a long range of engagement (a long insert length) between the hollow cylinder portion 363a of each nut 363 and the associated through-hole 321m in order to obtain a sufficient tight-fit engagement therebetween, which increases the size of the insertion member fixing structure.

Figure 43:
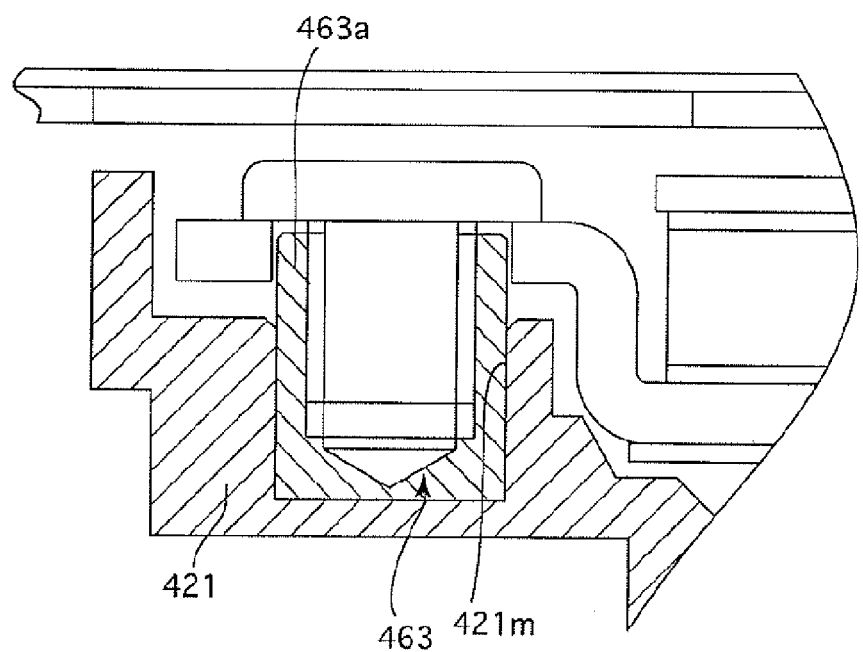
FIG. 43 is a view similar to that of FIGS. 35 and 41, showing a second comparative example which is to be compared with the first and second embodiments of the insertion member fixing structures.

FIG. 43 shows a second comparative example in which hollow cylinder portions (shaft portions) 463a of three nuts 463 (which correspond to the three nuts 63 or 163 in the first and second embodiments of the insertion member fixing structures; only one nut 463 is shown in FIG. 43) are press-fitted into three bottomed holes 421m (which correspond to the three through-holes 21m in the first and second embodiments of the insertion member fixing structures; only one bottomed hole 421m is shown in FIG. 43) which are formed in a support member 421 (which corresponds to the X-direction moving stage 21 in each of the first and second embodiments of the insertion member fixing structures), respectively. Each nut 463 is prevented from moving downward as viewed in FIG. 43 by the bottom of the associated bottomed hole 421m, and is further prevented from moving in the opposite direction (upward as viewed in FIG. 43) by the tight-fit engagement between the hollow cylinder portion 463a of the nut 463 and the associated through-hole 421m. Similar to the first comparative embodiment shown in FIG. 42, the second comparative example shown in FIG. 43 has the drawback of requiring a long range of engagement (a long insert length) between the hollow cylinder portion 463a of each nut 463 in the associated through-hole 421m in order to obtain a sufficient tight-fit engagement therebetween, which disadvantageously increases the size of the insertion member fixing structure.

Figure 44:
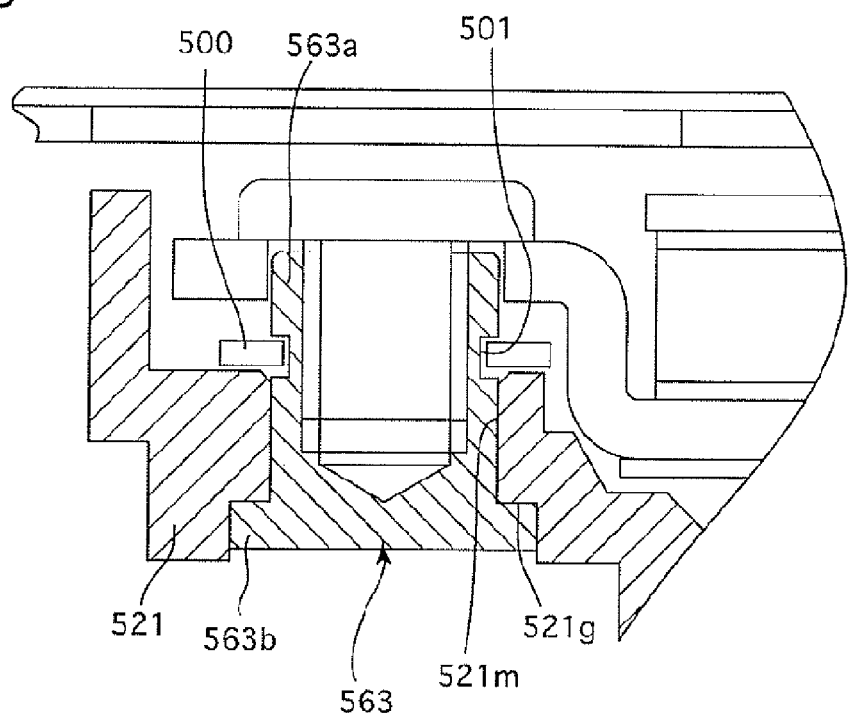
FIG. 44 is a view similar to that of FIGS. 35 and 41, showing a third comparative example which is to be compared with the first and second embodiments of the insertion member fixing structures.

FIG. 44 shows a third comparative example in which three nuts 563 (which correspond to the three nuts 63 or 163 in the first and second embodiments of the insertion member fixing structures; only one nut 563 is shown in FIG. 44) are prevented from coming out of three through-holes 521m (which correspond to the three through-holes 21m in the first and second embodiments of the insertion member fixing structures; only one through-hole 521m is shown in FIG. 44) which are formed in a support member 521 (which corresponds to the X-direction moving stage 21 in each of the first and second embodiments of the insertion member fixing structures) by three lock washers 500, respectively. After the hollow cylinder portion (shaft portion) 563a of each nut 563 is inserted into the associated through-hole 521m to the insertion limit position at which a flange portion 563b of the nut 563 is engaged with an associated large-diameter hole 521g of the support member 521, a lock washer 500 is engaged in an annular groove 501 formed on an outer peripheral surface of the hollow cylinder portion 563a. This engagement prevents the nut 563 from coming out of the associated through-hole 521m. This comparative example shown in FIG. 44 has the drawback of requiring an extra space for the installation of the three lock washers 500, which tends to increase the size of the insertion member fixing structure; and play tends to occur in the thrusting direction (the axial direction of the hollow cylinder portion 563a) between each lock washer 500 and the associated hollow cylinder portion 563a.

Figure 45:
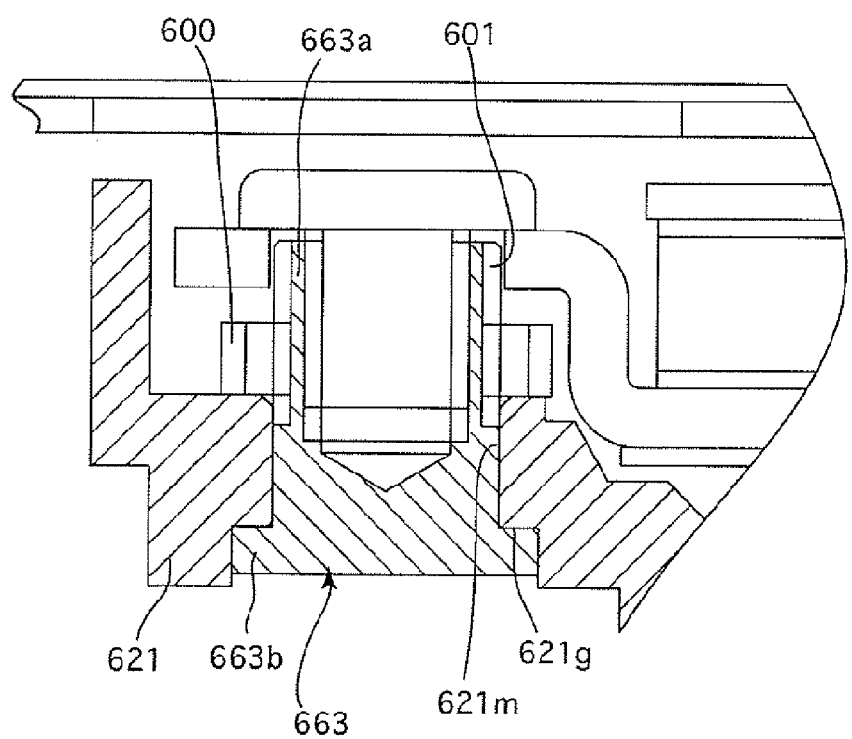
FIG. 45 is a view similar to that of FIGS. 35 and 41, showing a fourth comparative example which is to be compared with the first and second embodiments of the insertion member fixing structures.

FIG. 45 shows a fourth comparative example in which three nuts 663 (which correspond to the three nuts 63 or 163 in the first and second embodiments of the insertion member fixing structures; only one nut 663 is shown in FIG. 45) are prevented from coming out of three through-holes 621m (which correspond to the three through-holes 21m in the first and second embodiments of the insertion member fixing structures; only one through-hole 621m is shown in FIG. 45) which are formed in a support member 621 (which corresponds to the X-direction moving stage 21 in each of the first and second embodiments of the insertion member fixing structures) by three lock nuts 600, respectively. After the hollow cylinder portion (shaft portion) 663a of each nut 663 is inserted into the associated through-hole 621m to the insertion limit position at which a flange portion 663b of the nut 663 is engaged with an associated large-diameter hole 621g of the support member 621, a lock nut 600 is screw-engaged with a male thread portion 601 formed on an outer peripheral surface of the hollow cylinder portion 663a. This screw engagement prevents the nut 663 from coming out of the associated through-hole 621m. Although play between each lock nut 600 and the associated hollow cylinder portion 663a does not easily occur as compared with the engagement of the flange portion 563b of each nut 563 with the associated large-diameter hole 521g in the third comparative example shown in FIG. 44, the fourth comparative example shown in FIG. 45 is disadvantageous in regard to space saving because the lock nuts 600 being greater in thickness than the lock washers 500 are used in the fourth comparative example.

Figure 46:
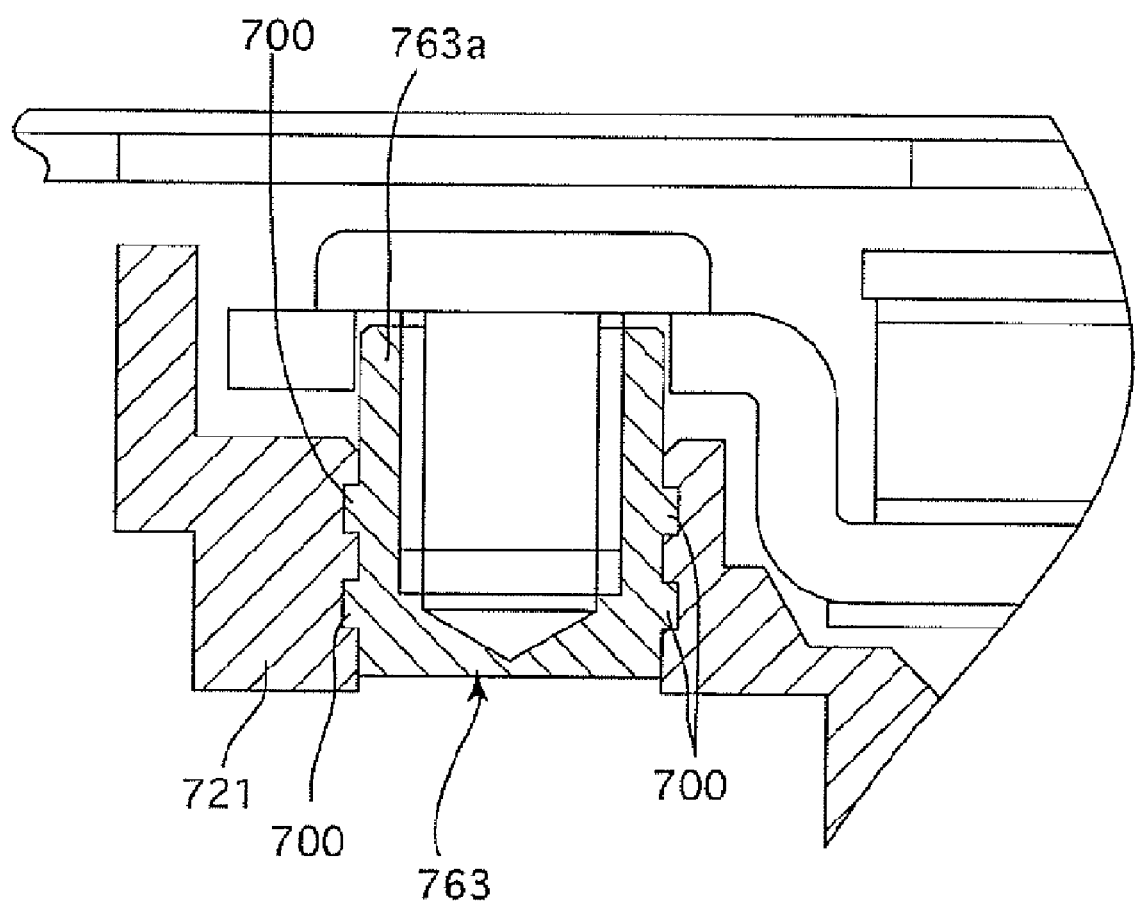
FIG. 46 is a view similar to that of FIGS. 35 and 41, showing a fifth comparative example which is to be compared with the first and second embodiments of the insertion member fixing structures.

FIG. 46 shows a fifth comparative example in which three nuts 763 (which correspond to the three nuts 63 or 163 in the first and second embodiments of the insertion member fixing structures; only one nut 663 is shown in FIG. 45) are fixed to a support member 721 (which corresponds to the X-direction moving stage 21 in each of the first and second embodiments of the insertion member fixing structures) by insertion molding. Radial projections/radial recesses 700 which are engaged with each other are formed on an outer peripheral surface of each nut 763 and an inner peripheral surface in an associated through-hole of the support member 721, respectively, so that the nut 763 does not move in the axial direction thereof relative to the support member 721. This type of insertion member fixing structure can be made as a relatively compact insertion member fixing structure; moreover, play between each nut 763 and the associated hole formed in the support member 721 does not easily occur. However, production facilities for the insertion molding are expensive and this comparative example shown in FIG. 46 has the drawback of either the support member 721 or each nut 763 not being easily formed into a complicated shape (of the radial projections/radial recesses 700).

In contrast to each of the above illustrated first through fifth comparative examples, in each of the first and second embodiments of the insertion member fixing structures according to the present invention, the above described space-saving structure wherein at least two adhesive-pouring recesses in which the adhesive AD is simply poured are respectively formed on the support member 21 at an end of each through-hole (21m), which serves as a support hole, and on the outer peripheral surface of the shaft portion of each nut (63 and 163) makes it possible for each nut (63 and 163) to be inserted into the associated through-hole and fixed; moreover, this insertion member fixing structure can be achieved at a considerable low production cost.

Although the present invention has been discussed above with reference to the specific embodiments described above, the present invention is not limited solely thereto. For instance, although the present invention is applied to an inclination angle adjusting mechanism of a digital camera for changing the inclination angle of an image pickup device, each of the above described embodiments of the insertion member fixing structures can also be applied to various other mechanisms.

Although each insertion member which is inserted into an associated support hole made in the support member (the X-direction moving stage 21) is a nut in each of the first and second embodiments of the insertion member fixing structures, each insertion member can be any insertion member other than a nut.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An insertion member fixing structure comprising:
an insertion member which is inserted into a support hole formed in a support member; and
outer and inner adhesive-pouring recesses formed on an inner peripheral surface of said support hole at one end thereof and on an outer peripheral surface of said insertion member, respectively, in a manner so as to face each other and be communicatively connected to each other in a state where said insertion member is inserted into said support hole;
wherein said insertion member is fixed to said support member by pouring an adhesive into said outer and inner adhesive-pouring recesses so that said adhesive spreads into said outer and inner adhesive-pouring recess.

2. The insertion member fixing structure according to claim 1, wherein each of said outer and inner adhesive-pouring recesses comprises an annular recess.

3. The insertion member fixing structure according to claim 1, wherein said outer adhesive-pouring recess comprises a chamfered opening formed on said one end of said support hole.

4. The insertion member fixing structure according to claim 3, wherein said outer adhesive-pouring recess further comprises an annular portion communicatively connected with said chamfered opening.

5. The insertion member fixing structure according to claim 1, wherein said insertion member comprises a flange portion which determines an insertion position of said insertion member with respect to said support hole in an insertion direction of said insertion member.

6. The insertion member fixing structure according to claim 5, wherein said flange portion is formed on an end of said insertion member which contacts said support member at the other end of said support hole.

7. The insertion member fixing structure according to claim 1, further comprising a second outer adhesive-pouring recess and a second inner adhesive-pouring recess formed on a portion of said support member at the other end of said support hole and an outer peripheral surface of said insertion member, respectively, in a manner to face each other to be communicatively connected to each other in said state where said insertion member is inserted into said support hole, and
wherein said insertion member is fixed to said support member by further pouring said adhesive into said second outer adhesive-pouring recess and said second inner adhesive-pouring recess.

8. The insertion member fixing structure according to claim 1, wherein said inner adhesive-pouring recess comprises a V-shaped cross section.

9. The insertion member fixing structure according to claim 1, wherein said support hole is formed as a cylindrical hole, and wherein said insertion member comprises a hollow cylinder portion having an outer diameter allowing said insertion member to be inserted into said cylindrical hole.

10. The insertion member fixing structure according to claim 1, wherein said support hole comprises a through-hole.

11. The insertion member fixing structure according to claim 1, wherein said insertion member comprises a female screw hole serving as a screw bearing seat.

12. The insertion member fixing structure according to claim 11, comprising:
an adjustable element which is supported by said supported member;
an adjustment screw which includes a screw shaft portion and a head portion, said screw shaft portion being inserted into a through-hole formed in said adjustable element to be screwed into said female screw hole of said insertion member, and said head portion being in contact with said adjustable element; and
a biasing device which biases said adjustable element in a direction away from said support member to bring said adjustable element into contact with a back surface of said head portion of said adjustment screw,
wherein a position of said adjustable element relative to said support member varies by a variation in tightening amount of said adjustment screw.

13. The insertion member fixing structure according to claim 12, wherein said biasing device comprises at least one compression coil spring installed between said support member and said adjustable element.

14. The insertion member fixing structure according to claim 12, wherein said adjustable element holds an image pickup device.

15. The insertion member fixing structure according to claim 14, wherein said insertion member fixing structure is incorporated in an inclination angle adjusting mechanism for changing an angle of said image pickup device.

16. A hollow cylindrical-nut fixing structure comprising:
a hollow cylindrical nut including a screw hole, said hollow cylindrical nut being inserted into a cylindrical support hole formed in a support member to be fixed thereto; and
outer and inner adhesive-pouring recesses which are formed on an inner peripheral surface of said cylindrical support hole at one end thereof and an outer peripheral surface of said hollow cylindrical nut, respectively, in a manner to be communicatively connected to each other to form a single groove in a state where said hollow cylindrical nut is inserted into said cylindrical support hole,
wherein said hollow cylindrical nut is fixed to said support member by pouring an adhesive into said single groove so that said adhesive spreads into said outer adhesive-pouring recess and said inner adhesive-pouring recess.

* * * * *